(12) United States Patent
Zhou et al.

(10) Patent No.: US 12,009,895 B2
(45) Date of Patent: Jun. 11, 2024

(54) TECHNIQUES FOR ENABLING BEAM MANAGEMENT RADIO RESOURCE CONTROL PARAMETERS

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US); Junyi Li, Fairless Hills, PA (US); Jing Sun, San Diego, CA (US); Mostafa Khoshnevisan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 19 days.

(21) Appl. No.: 17/811,261

(22) Filed: Jul. 7, 2022

(65) Prior Publication Data

US 2023/0083362 A1 Mar. 16, 2023

Related U.S. Application Data

(60) Provisional application No. 63/262,224, filed on Oct. 7, 2021, provisional application No. 63/261,093, filed on Sep. 10, 2021.

(51) Int. Cl.
*H04B 7/06* (2006.01)
*H04B 7/08* (2006.01)
*H04L 1/20* (2006.01)

(52) U.S. Cl.
CPC .......... *H04B 7/0632* (2013.01); *H04B 7/063* (2013.01); *H04B 7/0854* (2013.01); *H04B 7/0888* (2013.01); *H04L 1/203* (2013.01)

(58) Field of Classification Search
CPC .... H04B 7/0632; H04B 7/063; H04B 7/0854; H04B 7/0888; H04B 7/088; H04B 7/0695; H04L 1/203; H04L 1/08
See application file for complete search history.

(56) References Cited

U.S. PATENT DOCUMENTS

2020/0350972 A1  11/2020  Yi et al.
2021/0126690 A1  4/2021  Matsumura et al.
(Continued)

FOREIGN PATENT DOCUMENTS

WO   WO-2023020852 A1 *  2/2023

OTHER PUBLICATIONS

Machine Translation of JP-WO2020012619-A1. (Year: 2023).*
(Continued)

*Primary Examiner* — Jean B Corrielus
(74) *Attorney, Agent, or Firm* — Dalei Dong; Harrity & Harrity, LLP

(57) ABSTRACT

A method of wireless communication performed by a user equipment (UE) includes measuring a signal strength of a beam failure detection (BFD) reference signal (RS), the BFD RS being included in a BFD RS set that corresponds to a transmission reception point (TRP) of a plurality of TRPs; the method further includes identifying a BFD threshold associated with the TRP, detecting a beam failure instance associated with the TRP based at least in part on a determination that the signal strength of the BFD RS satisfies the BFD threshold and, providing an indication of the beam failure instance associated with the TRP. Numerous other aspects are described.

25 Claims, 29 Drawing Sheets

(56) References Cited

U.S. PATENT DOCUMENTS

| | | | | |
|---|---|---|---|---|
| 2021/0235426 A1* | 7/2021 | Xia | ................. | H04L 5/0094 |
| 2021/0336688 A1* | 10/2021 | Lee | ................. | H04W 4/40 |
| 2022/0103232 A1* | 3/2022 | Zhou | ................. | H04W 76/19 |
| 2022/0109489 A1* | 4/2022 | Zhu | ................. | H04L 1/1896 |
| 2022/0271822 A1* | 8/2022 | Jiao | ................. | H04W 76/19 |
| 2023/0066874 A1* | 3/2023 | Zhou | ................. | H04B 7/0695 |

OTHER PUBLICATIONS

International Search Report and Written Opinion—PCT/US2022/075015—ISA/EPO—dated Dec. 20, 2022.
Partial International Search Report—PCT/US2022/075015—ISA/EPO—dated Oct. 28, 2022.

* cited by examiner

TECHNIQUES FOR ENABLING BEAM MANAGEMENT RADIO RESOURCE CONTROL PARAMETERS

CROSS-REFERENCE TO RELATED APPLICATIONS

This Patent Application claims priority to U.S. Provisional Patent Application No. 63/261,093, filed on Sep. 10, 2021, entitled "TECHNIQUES FOR ENABLING BEAM MANAGEMENT RADIO RESOURCE CONTROL PARAMETERS," and assigned to the assignee hereof, and U.S. Provisional Patent Application No. 63/262,224, filed on Oct. 7, 2021, entitled "TECHNIQUES FOR ENABLING BEAM MANAGEMENT RADIO RESOURCE CONTROL PARAMETERS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for enabling beam management radio resource control (RRC) parameters.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/L 1E-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a radio resource control (RRC) message, the RRC message including an indication of whether group-based beam reporting is enabled for the UE. The method may include transmitting a group-based beam report based at least in part on the indication that the group-based beam reporting is enabled for the UE.

Some aspects described herein relate to a method of wireless communication performed by a base station. The method may include transmitting an RRC message, the RRC message including an indication of whether group-based beam reporting is enabled for a UE. The method may include receiving a group-based beam report based at least in part on transmitting the indication to indicate that the group-based beam reporting is enabled for the UE.

Some aspects described herein relate to a method of wireless communication performed by a UE. The method may include receiving a channel management resource (CMR) set configuration associated with group-based beam reporting, where the CMR set configuration configures at least two CMR sets. The method may include generating a group-based beam report based at least in part on the CMR set configuration. The method may include transmitting the group-based beam report.

Some aspects described herein relate to a method of wireless communication performed by a base station. The method may include transmitting a CMR set configuration associated with group-based beam reporting, where the CMR set configuration configures at least two CMR sets. The method may include receiving a group-based beam report, the group-based beam report having been generated based at least in part on the CMR set configuration.

Some aspects described herein relate to a method of wireless communication performed by a UE. The method may include measuring a signal strength of a beam failure detection (BFD) reference signal (RS), the BFD RS being included in a BFD RS set that corresponds to a transmission reception point (TRP) of a plurality of TRPs. The method may include identifying a BFD threshold associated with the TRP. The method may include detecting a beam failure instance associated with the TRP based at least in part on a determination that the signal strength of the BFD RS satisfies the BFD threshold. The method may include providing an indication of the beam failure instance associated with the TRP.

Some aspects described herein relate to a method of wireless communication performed by a base station. The method may include identifying a BFD threshold for a TRP of a plurality of TRPs of a UE. The method may include transmitting, to the UE, a configuration indicating the BFD threshold.

Some aspects described herein relate to a method of wireless communication performed by a UE. The method may include measuring a signal strength of a candidate beam RS, the candidate beam RS being included in a set of candidate beam RSs that corresponds to a TRP of a plurality of TRPs. The method may include identifying a candidate beam threshold associated with the TRP. The method may include selecting a candidate beam corresponding to the candidate beam RS for beam failure recovery based at least in part on a determination that the signal strength of the candidate beam RS satisfies the candidate beam threshold. The method may include transmitting a beam failure recovery (BFR) report including an indication of the candidate beam.

Some aspects described herein relate to a method of wireless communication performed by a base station. The method may include identifying a candidate beam threshold for a TRP of a plurality of TRPs of a UE. The method may include transmitting, to the UE, a configuration indicating the candidate beam threshold.

Some aspects described herein relate to a method of wireless communication performed by a UE. The method may include identifying a set of power control parameters for a transmission configuration indicator (TCI) state associated with an uplink transmission. The method may include transmitting the uplink transmission based at least in part on the set of power control parameters associated with the TCI state.

Some aspects described herein relate to a method of wireless communication performed by a UE. The method may include receiving an RRC message, the RRC message including an indication of whether a format for a power headroom (PHR) report to be used by the UE is either a format indicating a single power management maximum power reduction (P-MPR) per component carrier, or a format indicating multiple P-MPRs per component carrier. The method may include generating a PHR report according to the format indicated by the indication. The method may include transmitting the PHR report.

Some aspects described herein relate to a method of wireless communication performed by a base station. The method may include transmitting an RRC message, the RRC message including an indication of whether a format for a PHR report to be used by a UE is either a format indicating a single P-MPR per component carrier, or a format indicating multiple P-MPRs per component carrier. The method may include receiving a PHR report, the PHR report having the format indicated by the indication.

Some aspects described herein relate to a method of wireless communication performed by a UE. The method may include receiving an indication to transmit multiple physical downlink shared channel (PDSCH) transmissions. The method may include determining one or more quasi co-location (QCL) assumptions to be used for transmitting the multiple PDSCH transmissions. The method may include transmitting the multiple PDSCH transmissions based at least in part on the one or more QCL assumptions.

Some aspects described herein relate to a method of wireless communication performed by a base station. The method may include transmitting an indication to cause a UE to transmit multiple PDSCH transmissions. The method may include transmitting an indication of a QCL rule associated with determining one or more QCL assumptions to be used by the UE for transmitting the multiple PDSCH transmissions.

Some aspects described herein relate to a UE for wireless communication. The UE may include a memory and one or more processors coupled to the memory. The one or more processors may be configured to receive an RRC message, the RRC message including an indication of whether group-based beam reporting is enabled for the UE. The one or more processors may be configured to transmit a group-based beam report based at least in part on the indication that the group-based beam reporting is enabled for the UE.

Some aspects described herein relate to a base station for wireless communication. The base station may include a memory and one or more processors coupled to the memory. The one or more processors may be configured to transmit an RRC message, the RRC message including an indication of whether group-based beam reporting is enabled for a UE. The one or more processors may be configured to receive a group-based beam report based at least in part on transmitting the indication to indicate that the group-based beam reporting is enabled for the UE.

Some aspects described herein relate to a UE for wireless communication. The UE may include a memory and one or more processors coupled to the memory. The one or more processors may be configured to receive a CMR set configuration associated with group-based beam reporting. The one or more processors may be configured to generate a group-based beam report based at least in part on the CMR set configuration. The one or more processors may be configured to transmit the group-based beam report.

Some aspects described herein relate to a base station for wireless communication. The base station may include a memory and one or more processors coupled to the memory. The one or more processors may be configured to transmit a CMR set configuration associated with group-based beam reporting. The one or more processors may be configured to receive a group-based beam report, the group-based beam report having been generated based at least in part on the CMR set configuration.

Some aspects described herein relate to a UE for wireless communication. The UE may include a memory and one or more processors coupled to the memory. The one or more processors may be configured to measure a signal strength of a BFD RS, the BFD RS being included in a BFD RS set that corresponds to a TRP of a plurality of TRPs. The one or more processors may be configured to identify a BFD threshold associated with the TRP. The one or more processors may be configured to detect a beam failure instance associated with the TRP based at least in part on a determination that the signal strength of the BFD RS satisfies the BFD threshold. The one or more processors may be configured to provide an indication of the beam failure instance associated with the TRP.

Some aspects described herein relate to a base station for wireless communication. The base station may include a memory and one or more processors coupled to the memory. The one or more processors may be configured to identify a BFD threshold for a TRP of a plurality of TRPs of a UE. The one or more processors may be configured to transmit, to the UE, a configuration indicating the BFD threshold.

Some aspects described herein relate to a UE for wireless communication. The UE may include a memory and one or more processors coupled to the memory. The one or more processors may be configured to measure a signal strength of a candidate beam RS, the candidate beam RS being included in a set of candidate beam RSs that corresponds to a TRP of a plurality of TRPs. The one or more processors may be configured to identify a candidate beam threshold associated with the TRP. The one or more processors may be configured to select a candidate beam corresponding to the candidate beam RS for beam failure recovery based at least in part on a determination that the signal strength of the candidate beam RS satisfies the candidate beam threshold. The one or more processors may be configured to transmit a BFR report including an indication of the candidate beam.

Some aspects described herein relate to a base station for wireless communication. The base station may include a memory and one or more processors coupled to the memory. The one or more processors may be configured to identify a candidate beam threshold for a TRP of a plurality of TRPs of a UE. The one or more processors may be configured to transmit, to the UE, a configuration indicating the candidate beam threshold.

Some aspects described herein relate to a UE for wireless communication. The UE may include a memory and one or more processors coupled to the memory. The one or more processors may be configured to identify a set of power control parameters for a TCI state associated with an uplink transmission. The one or more processors may be configured to transmit the uplink transmission based at least in part on the set of power control parameters associated with the TCI state.

Some aspects described herein relate to a UE for wireless communication. The UE may include a memory and one or more processors coupled to the memory. The one or more processors may be configured to receive an RRC message, the RRC message including an indication of whether a format for a PHR report to be used by the UE is either a format indicating a single P-MPR per component carrier, or a format indicating multiple P-MPRs per component carrier. The one or more processors may be configured to generate a PHR report according to the format indicated by the indication. The one or more processors may be configured to transmit the PHR report.

Some aspects described herein relate to a base station for wireless communication. The base station may include a memory and one or more processors coupled to the memory. The one or more processors may be configured to transmit an RRC message, the RRC message including an indication of whether a format for a PHR report to be used by a UE is either a format indicating a single P-MPR per component carrier, or a format indicating multiple P-MPRs per component carrier. The one or more processors may be configured to receive a PHR report, the PHR report having the format indicated by the indication.

Some aspects described herein relate to a UE for wireless communication. The UE may include a memory and one or more processors coupled to the memory. The one or more processors may be configured to receive an indication to transmit multiple PDSCH transmissions. The one or more processors may be configured to determine one or more QCL assumptions to be used for transmitting the multiple PDSCH transmissions. The one or more processors may be configured to transmit the multiple PDSCH transmissions based at least in part on the one or more QCL assumptions.

Some aspects described herein relate to a base station for wireless communication. The base station may include a memory and one or more processors coupled to the memory. The one or more processors may be configured to transmit an indication to cause a UE to transmit multiple PDSCH transmissions. The one or more processors may be configured to transmit an indication of a QCL rule associated with determining one or more QCL assumptions to be used by the UE for transmitting the multiple PDSCH transmissions.

Some aspects described herein relate to a non-transitory computer-readable medium that stores a set of instructions for wireless communication by a UE. The set of instructions, when executed by one or more processors of the UE, may cause the UE to receive an RRC message, the RRC message including an indication of whether group-based beam reporting is enabled for the UE. The set of instructions, when executed by one or more processors of the UE, may cause the UE to transmit a group-based beam report based at least in part on the indication that the group-based beam reporting is enabled for the UE.

Some aspects described herein relate to a non-transitory computer-readable medium that stores a set of instructions for wireless communication by a base station. The set of instructions, when executed by one or more processors of the base station, may cause the base station to transmit an RRC message, the RRC message including an indication of whether group-based beam reporting is enabled for a UE. The set of instructions, when executed by one or more processors of the base station, may cause the base station to receive a group-based beam report based at least in part on transmitting the indication to indicate that the group-based beam reporting is enabled for the UE.

Some aspects described herein relate to a non-transitory computer-readable medium that stores a set of instructions for wireless communication by a UE. The set of instructions, when executed by one or more processors of the UE, may cause the UE to receive a CMR set configuration associated with group-based beam reporting. The set of instructions, when executed by one or more processors of the UE, may cause the UE to generate a group-based beam report based at least in part on the CMR set configuration. The set of instructions, when executed by one or more processors of the UE, may cause the UE to transmit the group-based beam report.

Some aspects described herein relate to a non-transitory computer-readable medium that stores a set of instructions for wireless communication by a base station. The set of instructions, when executed by one or more processors of the base station, may cause the base station to transmit a CMR set configuration associated with group-based beam reporting. The set of instructions, when executed by one or more processors of the base station, may cause the base station to receive a group-based beam report, the group-based beam report having been generated based at least in part on the CMR set configuration.

Some aspects described herein relate to a non-transitory computer-readable medium that stores a set of instructions for wireless communication by a UE. The set of instructions, when executed by one or more processors of the UE, may cause the UE to measure a signal strength of a BFD RS, the BFD RS being included in a BFD RS set that corresponds to a TRP of a plurality of TRPs. The set of instructions, when executed by one or more processors of the UE, may cause the UE to identify a BFD threshold associated with the TRP. The set of instructions, when executed by one or more processors of the UE, may cause the UE to detect a beam failure instance associated with the TRP based at least in part on a determination that the signal strength of the BFD RS satisfies the BFD threshold. The set of instructions, when executed by one or more processors of the UE, may cause the UE to provide an indication of the beam failure instance associated with the TRP.

Some aspects described herein relate to a non-transitory computer-readable medium that stores a set of instructions for wireless communication by a base station. The set of instructions, when executed by one or more processors of the base station, may cause the base station to identify a BFD threshold for a TRP of a plurality of TRPs of a UE. The set of instructions, when executed by one or more processors of the base station, may cause the base station to transmit, to the UE, a configuration indicating the BFD threshold.

Some aspects described herein relate to a non-transitory computer-readable medium that stores a set of instructions for wireless communication by a UE. The set of instructions, when executed by one or more processors of the UE, may cause the UE to measure a signal strength of a candidate beam RS, the candidate beam RS being included in a set of candidate beam RSs that corresponds to a TRP of a plurality of TRPs. The set of instructions, when executed by one or more processors of the UE, may cause the UE to identify a candidate beam threshold associated with the TRP. The set of instructions, when executed by one or more processors of the UE, may cause the UE to select a candidate beam corresponding to the candidate beam RS for beam failure recovery based at least in part on a determination that the signal strength of the candidate beam RS satisfies the candidate beam threshold. The set of instructions, when executed by one or more processors of the UE, may cause the UE to transmit a BFR report including an indication of the candidate beam.

Some aspects described herein relate to a non-transitory computer-readable medium that stores a set of instructions for wireless communication by a base station. The set of instructions, when executed by one or more processors of the base station, may cause the base station to identify a candidate beam threshold for a TRP of a plurality of TRPs of a UE. The set of instructions, when executed by one or more processors of the base station, may cause the base station to transmit, to the UE, a configuration indicating the candidate beam threshold.

Some aspects described herein relate to a non-transitory computer-readable medium that stores a set of instructions for wireless communication by a UE. The set of instructions, when executed by one or more processors of the UE, may cause the UE to identify a set of power control parameters for a TCI state associated with an uplink transmission. The set of instructions, when executed by one or more processors of the UE, may cause the UE to transmit the uplink transmission based at least in part on the set of power control parameters associated with the TCI state.

Some aspects described herein relate to a non-transitory computer-readable medium that stores a set of instructions for wireless communication by a UE. The set of instructions, when executed by one or more processors of the UE, may cause the UE to receive an RRC message, the RRC message including an indication of whether a format for a PHR report to be used by the UE is either a format indicating a single P-MPR per component carrier, or a format indicating multiple P-MPRs per component carrier. The set of instructions, when executed by one or more processors of the UE, may cause the UE to generate a PHR report according to the format indicated by the indication. The set of instructions, when executed by one or more processors of the UE, may cause the UE to transmit the PHR report.

Some aspects described herein relate to a non-transitory computer-readable medium that stores a set of instructions for wireless communication by a base station. The set of instructions, when executed by one or more processors of the base station, may cause the base station to transmit an RRC message, the RRC message including an indication of whether a format for a PHR report to be used by a UE is either a format indicating a single P-MPR per component carrier, or a format indicating multiple P-MPRs per component carrier. The set of instructions, when executed by one or more processors of the base station, may cause the base station to receive a PHR report, the PHR report having the format indicated by the indication.

Some aspects described herein relate to a non-transitory computer-readable medium that stores a set of instructions for wireless communication by a UE. The set of instructions, when executed by one or more processors of the UE, may cause the UE to receive an indication to transmit multiple PDSCH transmissions. The set of instructions, when executed by one or more processors of the UE, may cause the UE to determine one or more QCL assumptions to be used for transmitting the multiple PDSCH transmissions. The set of instructions, when executed by one or more processors of the UE, may cause the UE to transmit the multiple PDSCH transmissions based at least in part on the one or more QCL assumptions.

Some aspects described herein relate to a non-transitory computer-readable medium that stores a set of instructions for wireless communication by a base station. The set of instructions, when executed by one or more processors of the base station, may cause the base station to transmit an indication to cause a UE to transmit multiple PDSCH transmissions. The set of instructions, when executed by one or more processors of the base station, may cause the base station to transmit an indication of a QCL rule associated with determining one or more QCL assumptions to be used by the UE for transmitting the multiple PDSCH transmissions.

Some aspects described herein relate to an apparatus for wireless communication. The apparatus may include means for receiving an RRC message, the RRC message including an indication of whether group-based beam reporting is enabled for the apparatus. The apparatus may include means for transmitting a group-based beam report based at least in part on the indication that the group-based beam reporting is enabled for the apparatus.

Some aspects described herein relate to an apparatus for wireless communication. The apparatus may include means for transmitting an RRC message, the RRC message including an indication of whether group-based beam reporting is enabled for a UE. The apparatus may include means for receiving a group-based beam report based at least in part on transmitting the indication to indicate that the group-based beam reporting is enabled for the UE.

Some aspects described herein relate to an apparatus for wireless communication. The apparatus may include means for receiving a CMR set configuration associated with group-based beam reporting, where the CMR set configuration configures at least two CMR sets. The apparatus may include means for generating a group-based beam report based at least in part on the CMR set configuration. The apparatus may include means for transmitting the group-based beam report.

Some aspects described herein relate to an apparatus for wireless communication. The apparatus may include means for transmitting a CMR set configuration associated with group-based beam reporting, where the CMR set configuration configures at least two CMR sets. The apparatus may include means for receiving a group-based beam report, the group-based beam report having been generated based at least in part on the CMR set configuration.

Some aspects described herein relate to an apparatus for wireless communication. The apparatus may include means for measuring a signal strength of a BFD RS, the BFD RS being included in a BFD RS set that corresponds to a TRP of a plurality of TRPs. The apparatus may include means for identifying a BFD threshold associated with the TRP. The apparatus may include means for detecting a beam failure instance associated with the TRP based at least in part on a determination that the signal strength of the BFD RS satisfies the BFD threshold. The apparatus may include means for providing an indication of the beam failure instance associated with the TRP.

Some aspects described herein relate to an apparatus for wireless communication. The apparatus may include means for identifying a BFD threshold for a TRP of a plurality of TRPs of a UE. The apparatus may include means for transmitting, to the UE, a configuration indicating the BFD threshold.

Some aspects described herein relate to an apparatus for wireless communication. The apparatus may include means for measuring a signal strength of a candidate beam RS, the candidate beam RS being included in a set of candidate beam RSs that corresponds to a TRP of a plurality of TRPs. The apparatus may include means for identifying a candidate beam threshold associated with the TRP. The apparatus may include means for selecting a candidate beam corresponding to the candidate beam RS for beam failure recovery based at least in part on a determination that the signal strength of the candidate beam RS satisfies the candidate beam threshold. The apparatus may include means for transmitting a BFR report including an indication of the candidate beam.

Some aspects described herein relate to an apparatus for wireless communication. The apparatus may include means for identifying a candidate beam threshold for a TRP of a plurality of TRPs of a UE. The apparatus may include means for transmitting, to the UE, a configuration indicating the candidate beam threshold.

Some aspects described herein relate to an apparatus for wireless communication. The apparatus may include means for identifying a set of power control parameters for a TCI state associated with an uplink transmission. The apparatus may include means for transmitting the uplink transmission based at least in part on the set of power control parameters associated with the TCI state.

Some aspects described herein relate to an apparatus for wireless communication. The apparatus may include means for receiving an RRC message, the RRC message including an indication of whether a format for a PHR report to be used by the apparatus is either a format indicating a single P-MPR per component carrier, or a format indicating multiple P-MPRs per component carrier. The apparatus may include means for generating a PHR report according to the format indicated by the indication. The apparatus may include means for transmitting the PHR report.

Some aspects described herein relate to an apparatus for wireless communication. The apparatus may include means for transmitting an RRC message, the RRC message including an indication of whether a format for a PHR report to be used by a UE is either a format indicating a single P-MPR per component carrier, or a format indicating multiple P-MPRs per component carrier. The apparatus may include means for receiving a PHR report, the PHR report having the format indicated by the indication.

Some aspects described herein relate to an apparatus for wireless communication. The apparatus may include means for receiving an indication to transmit multiple PDSCH transmissions. The apparatus may include means for determining one or more QCL assumptions to be used for transmitting the multiple PDSCH transmissions. The apparatus may include means for transmitting the multiple PDSCH transmissions based at least in part on the one or more QCL assumptions.

Some aspects described herein relate to an apparatus for wireless communication. The apparatus may include means for transmitting an indication to cause a UE to transmit multiple PDSCH transmissions. The apparatus may include means for transmitting an indication of a QCL rule associated with determining one or more QCL assumptions to be used by the UE for transmitting the multiple PDSCH transmissions.

Some aspects described herein relate to a method of wireless communication performed by a UE. The method may include receiving at least one RRC message, the at least one RRC message including an indication of whether beam-report-based implicit beam updating is enabled for the UE. The method may include performing an implicit beam update based at least in part on the indication indicating that the beam-report-based implicit beam updating is enabled for the UE.

Some aspects described herein relate to a method of wireless communication performed by a base station. The method may include transmitting at least one RRC message, the at least one RRC message including an indication of whether beam-report-based implicit beam updating is enabled for a UE. The method may include performing an implicit beam update based at least in part on transmitting the indication to indicate that the beam-report-based implicit beam updating is enabled for the UE.

Some aspects described herein relate to a UE for wireless communication. The user equipment may include a memory and one or more processors coupled to the memory. The one or more processors may be configured to receive at least one RRC message, the at least one RRC message including an indication of whether beam-report-based implicit beam updating is enabled for the UE. The one or more processors may be configured to perform an implicit beam update based at least in part on the indication indicating that the beam-report-based implicit beam updating is enabled for the UE.

Some aspects described herein relate to a base station for wireless communication. The base station may include a memory and one or more processors coupled to the memory. The one or more processors may be configured to transmit at least one RRC message, the at least one RRC message including an indication of whether beam-report-based implicit beam updating is enabled for a UE. The one or more processors may be configured to perform an implicit beam update based at least in part on transmitting the indication to indicate that the beam-report-based implicit beam updating is enabled for the UE.

Some aspects described herein relate to a non-transitory computer-readable medium that stores a set of instructions for wireless communication by a UE. The set of instructions, when executed by one or more processors of the UE, may cause the UE to receive at least one RRC message, the at least one RRC message including an indication of whether beam-report-based implicit beam updating is enabled for the UE. The set of instructions, when executed by one or more processors of the UE, may cause the UE to perform an implicit beam update based at least in part on the indication indicating that the beam-report-based implicit beam updating is enabled for the UE.

Some aspects described herein relate to a non-transitory computer-readable medium that stores a set of instructions for wireless communication by a base station. The set of instructions, when executed by one or more processors of the base station, may cause the base station to transmit at least one RRC message, the at least one RRC message including an indication of whether beam-report-based implicit beam updating is enabled for a UE. The set of instructions, when executed by one or more processors of the base station, may cause the base station to perform an implicit beam update based at least in part on transmitting the indication to indicate that the beam-report-based implicit beam updating is enabled for the UE.

Some aspects described herein relate to an apparatus for wireless communication. The apparatus may include means for receiving at least one RRC message, the at least one RRC message including an indication of whether beam-report-based implicit beam updating is enabled for the apparatus. The apparatus may include means for performing an implicit beam update based at least in part on the indication indicating that the beam-report-based implicit beam updating is enabled for the apparatus.

Some aspects described herein relate to an apparatus for wireless communication. The apparatus may include means for transmitting at least one RRC message, the at least one RRC message including an indication of whether beam-report-based implicit beam updating is enabled for a UE. The apparatus may include means for performing an implicit beam update based at least in part on transmitting the indication to indicate that the beam-report-based implicit beam updating is enabled for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
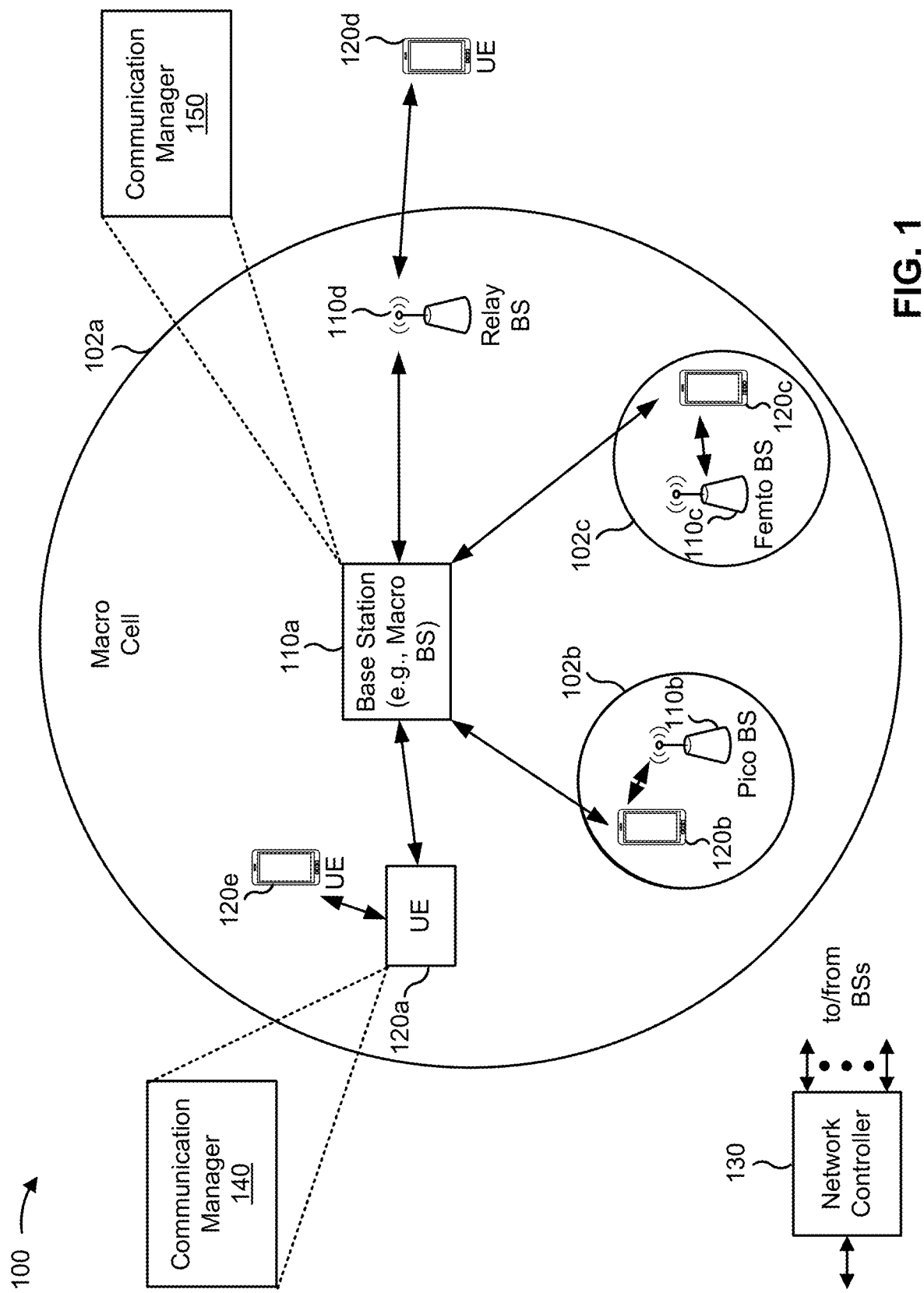
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an RRC message, the RRC message including an indication of whether group-based beam reporting is enabled for the UE; and transmit a group-based beam report based at least in part on the indication that the group-based beam reporting is enabled for the UE. Additionally, or alternatively, the communication manager 140 may perform one or more other operations described herein.

In some aspects, the base station 110 may include a communication manager 150. As described in more detail elsewhere herein, the communication manager 150 may transmit an RRC message, the RRC message including an indication of whether group-based beam reporting is enabled for a UE; and receive a group-based beam report based at least in part on transmitting the indication to indicate that the group-based beam reporting is enabled for the UE. Additionally, or alternatively, the communication manager 150 may perform one or more other operations described herein.

In some aspects, the UE 120 may include a communication manager 140. As described in more detail elsewhere herein, the communication manager 140 may receive a CMR set configuration associated with group-based beam reporting, wherein the CMR set configuration configures at least two CMR sets; generate a group-based beam report based at least in part on the CMR set configuration; and transmit the group-based beam report. Additionally, or alternatively, the communication manager 140 may perform one or more other operations described herein.

In some aspects, the base station 110 may include a communication manager 150. As described in more detail elsewhere herein, the communication manager 150 may transmit a CMR set configuration associated with group-based beam reporting, wherein the CMR set configuration configures at least two CMR sets; and receive a group-based beam report, the group-based beam report having been generated based at least in part on the CMR set configuration. Additionally, or alternatively, the communication manager 150 may perform one or more other operations described herein.

In some aspects, the UE 120 may include a communication manager 140. As described in more detail elsewhere herein, the communication manager 140 may measure a signal strength of a BFD RS, the BFD RS being included in a BFD RS set that corresponds to a TRP of a plurality of TRPs; identify a BFD threshold associated with the TRP; detect a beam failure instance associated with the TRP based at least in part on a determination that the signal strength of the BFD RS satisfies the BFD threshold; and provide an indication of the beam failure instance associated with the TRP. Additionally, or alternatively, the communication manager 140 may perform one or more other operations described herein.

In some aspects, the base station 110 may include a communication manager 150. As described in more detail elsewhere herein, the communication manager 150 may identify a BFD threshold for a TRP of a plurality of TRPs of a UE; and transmit, to the UE, a configuration indicating the BFD threshold. Additionally, or alternatively, the communication manager 150 may perform one or more other operations described herein.

In some aspects, the UE 120 may include a communication manager 140. As described in more detail elsewhere herein, the communication manager 140 may measure a signal strength of a candidate beam reference signal (RS), the candidate beam RS being included in a set of candidate beam RSs that corresponds to a TRP of a plurality of TRPs; identify a candidate beam threshold associated with the TRP; select a candidate beam corresponding to the candidate beam RS for beam failure recovery based at least in part on a determination that the signal strength of the candidate beam RS satisfies the candidate beam threshold; and transmit a beam failure recovery (BFR) report including an indication of the candidate beam. Additionally, or alternatively, the communication manager 140 may perform one or more other operations described herein.

In some aspects, the base station 110 may include a communication manager 150. As described in more detail elsewhere herein, the communication manager 150 may identify a candidate beam threshold for a TRP of a plurality of TRPs of a UE; and transmit, to the UE, a configuration indicating the candidate beam threshold. Additionally, or alternatively, the communication manager 150 may perform one or more other operations described herein.

In some aspects, the UE 120 may include a communication manager 140. As described in more detail elsewhere herein, the communication manager 140 may identify a set of power control parameters for a transmission configuration indicator (TCI) state associated with an uplink transmission; and transmit the uplink transmission based at least in part on the set of power control parameters associated with the TCI state. Additionally, or alternatively, the communication manager 140 may perform one or more other operations described herein.

In some aspects, the UE 120 may include a communication manager 140. As described in more detail elsewhere herein, the communication manager 140 may receive an RRC message, the RRC message including an indication of whether a format for a PHR report to be used by the UE is either: a format indicating a single P-MPR per component carrier, or a format indicating multiple P-MPRs per component carrier; generate a PHR report according to the format indicated by the indication; and transmit the PHR report. Additionally, or alternatively, the communication manager 140 may perform one or more other operations described herein.

In some aspects, the base station 110 may include a communication manager 150. As described in more detail elsewhere herein, the communication manager 150 may transmit an RRC message, the RRC message including an indication of whether a format for a PHR report to be used by a UE is either: a format indicating a single P-MPR per component carrier, or a format indicating multiple P-MPRs per component carrier; receive a PHR report, the PHR report having the format indicated by the indication. Additionally, or alternatively, the communication manager 150 may perform one or more other operations described herein.

In some aspects, the UE 120 may include a communication manager 140. As described in more detail elsewhere herein, the communication manager 140 may receive an indication to transmit multiple PDSCH transmissions; determine one or more QCL assumptions to be used for transmitting the multiple PDSCH transmissions; and transmit the multiple PDSCH transmissions based at least in part on the one or more QCL assumptions. Additionally, or alternatively, the communication manager 140 may perform one or more other operations described herein.

In some aspects, the base station 110 may include a communication manager 150. As described in more detail elsewhere herein, the communication manager 150 may transmit an indication to cause a UE 120 to transmit multiple PDSCH transmissions; and transmit an indication of a QCL rule associated with determining one or more QCL assumptions to be used by the UE for transmitting the multiple PDSCH transmissions. Additionally, or alternatively, the communication manager 150 may perform one or more other operations described herein.

In some aspects, the UE 120 may include a communication manager 140. As described in more detail elsewhere herein, the communication manager 140 may receive at least one RRC message, the at least one RRC message including an indication of whether beam-report-based implicit beam updating is enabled for the UE 120; and perform an implicit beam update based at least in part on the indication indicating that the beam-report-based implicit beam updating is enabled for the UE 120. Additionally, or alternatively, the communication manager 140 may perform one or more other operations described herein.

In some aspect s, the base station 110 may include a communication manager 150. As described in more detail elsewhere herein, the communication manager 150 may transmit at least one RRC message, the at least one RRC message including an indication of whether beam-report-based implicit beam updating is enabled for a UE 120; and perform an implicit beam update based at least in part on transmitting the indication to indicate that the beam-report-based implicit beam updating is enabled for the UE 120. Additionally, or alternatively, the communication manager 150 may perform one or more other operations described herein.

As indicated above, FIG. 1 is provided as an example. Other examples may differ from what is described with regard to FIG. 1.

Figure 2:
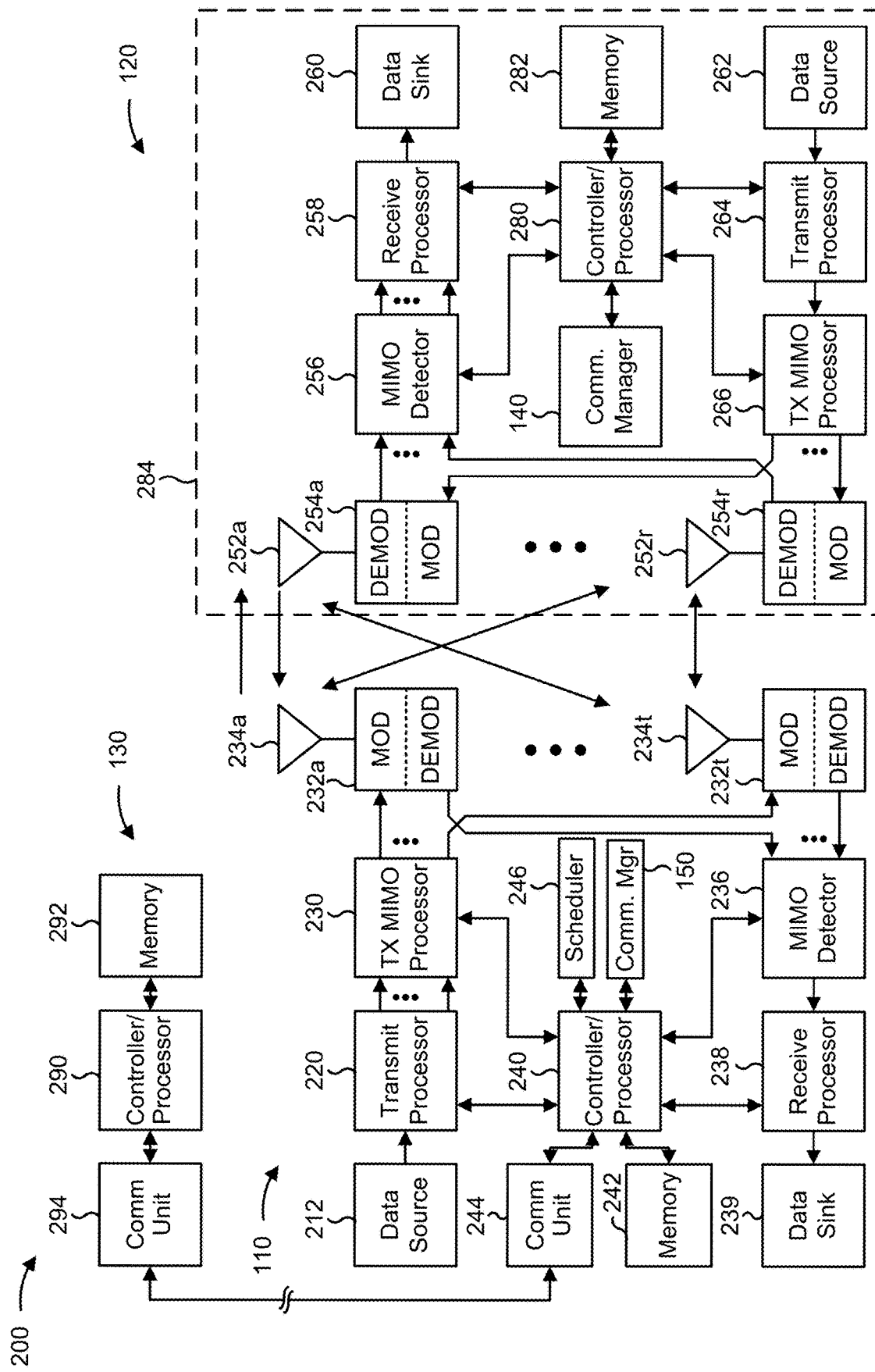
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-29).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-29).

The controller/processor 240 of the base station 110, the controller/processor 280 of the UE 120, and/or any other component(s) of FIG. 2 may perform one or more techniques associated with enabling beam management RRC parameters, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, process 2400 of FIG. 24, process 2800 of FIG. 28, process 2900 of FIG. 29, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, process 2400 of FIG. 24, process 2800 of FIG. 28, process 2900 of FIG. 29, and/or other processes as described herein. In some examples, executing instructions may include running the instructions, converting the instructions, compiling the instructions, and/or interpreting the instructions, among other examples.

In some aspects, the UE includes means for receiving an RRC message, the RRC message including an indication of whether group-based beam reporting is enabled for the UE; and/or means for transmitting a group-based beam report based at least in part on the indication that the group-based beam reporting is enabled for the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an RRC message, the RRC message including an indication of whether group-based beam reporting is enabled for a UE; and/or means for receiving a group-based beam report based at least in part on transmitting the indication to indicate that the group-based beam reporting is enabled for the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving a CMR set configuration associated with group-based beam reporting, wherein the CMR set configuration configures at least two CMR sets; means for generating a group-based beam report based at least in part on the CMR set configuration; and/or means for transmitting the group-based beam report. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a CMR set configuration associated with group-based beam reporting, wherein the CMR set configuration configures at least two CMR sets; and/or means for receiving a group-based beam report, the group-based beam report having been generated based at least in part on the CMR set configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for measuring a signal strength of a BFD RS, the BFD RS being included in a BFD RS set that corresponds to a TRP of a plurality of TRPs; means for identifying a BFD threshold associated with the TRP; means for detecting a beam failure instance associated with the TRP based at least in part on a determination that the signal strength of the BFD RS satisfies the BFD threshold; and/or means for providing an indication of the beam failure instance associated with the TRP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for identifying a BFD threshold for a TRP of a plurality of TRPs of a UE; and/or means for transmitting, to the UE, a configuration indicating the BFD threshold. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for measuring a signal strength of a candidate beam RS, the candidate beam RS being included in a set of candidate beam RSs that corresponds to a TRP of a plurality of TRPs; means for identifying a candidate beam threshold associated with the TRP; means for selecting a candidate beam corresponding to the candidate beam RS for beam failure recovery based at least in part on a determination that the signal strength of the candidate beam RS satisfies the candidate beam threshold; and/or means for transmitting a BFR report including an indication of the candidate beam. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for identifying a candidate beam threshold for a TRP of a plurality of TRPs of a UE; and/or means for transmitting, to the UE, a configuration indicating the candidate beam threshold. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for identifying a set of power control parameters for a TCI state associated with an uplink transmission; and/or means for transmitting the uplink transmission based at least in part on the set of power control parameters associated with the TCI state. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving an RRC message, the RRC message including an indication of whether a format for a PHR report to be used by the UE is either: a format indicating a single P-MPR per component carrier, or a format indicating multiple P-MPRs per component carrier; means for generating a PHR report according to the format indicated by the indication; and/or means for transmitting the PHR report. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an RRC message, the RRC message including an indication of whether a format for a PHR report to be used by a UE is either: a format indicating a single P-MPR per component carrier, or a format indicating multiple P-MPRs per component carrier; means for receiving a PHR report, the PHR report having the format indicated by the indication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving an indication to transmit multiple PDSCH transmissions; means for determining one or more QCL assumptions to be used for transmitting the multiple PDSCH transmissions; and/or means for transmitting the multiple PDSCH transmissions based at least in part on the one or more QCL assumptions. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an indication to cause a UE to transmit multiple PDSCH transmissions; and/or means for transmitting an indication of a QCL rule associated with determining one or more QCL assumptions to be used by the UE for transmitting the multiple PDSCH transmissions. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving at least one RRC message, the at least one RRC message including an indication of whether beam-report-based implicit beam updating is enabled for the UE; and/or means for performing an implicit beam update based at least in part on the indication indicating that the beam-report-based implicit beam updating is enabled for the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting at least one RRC message, the at least one RRC message including an indication of whether beam-report-based implicit beam updating is enabled for a UE; and/or means for performing an implicit beam update based at least in part on transmitting the indication to indicate that the beam-report-based implicit beam updating is enabled for the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
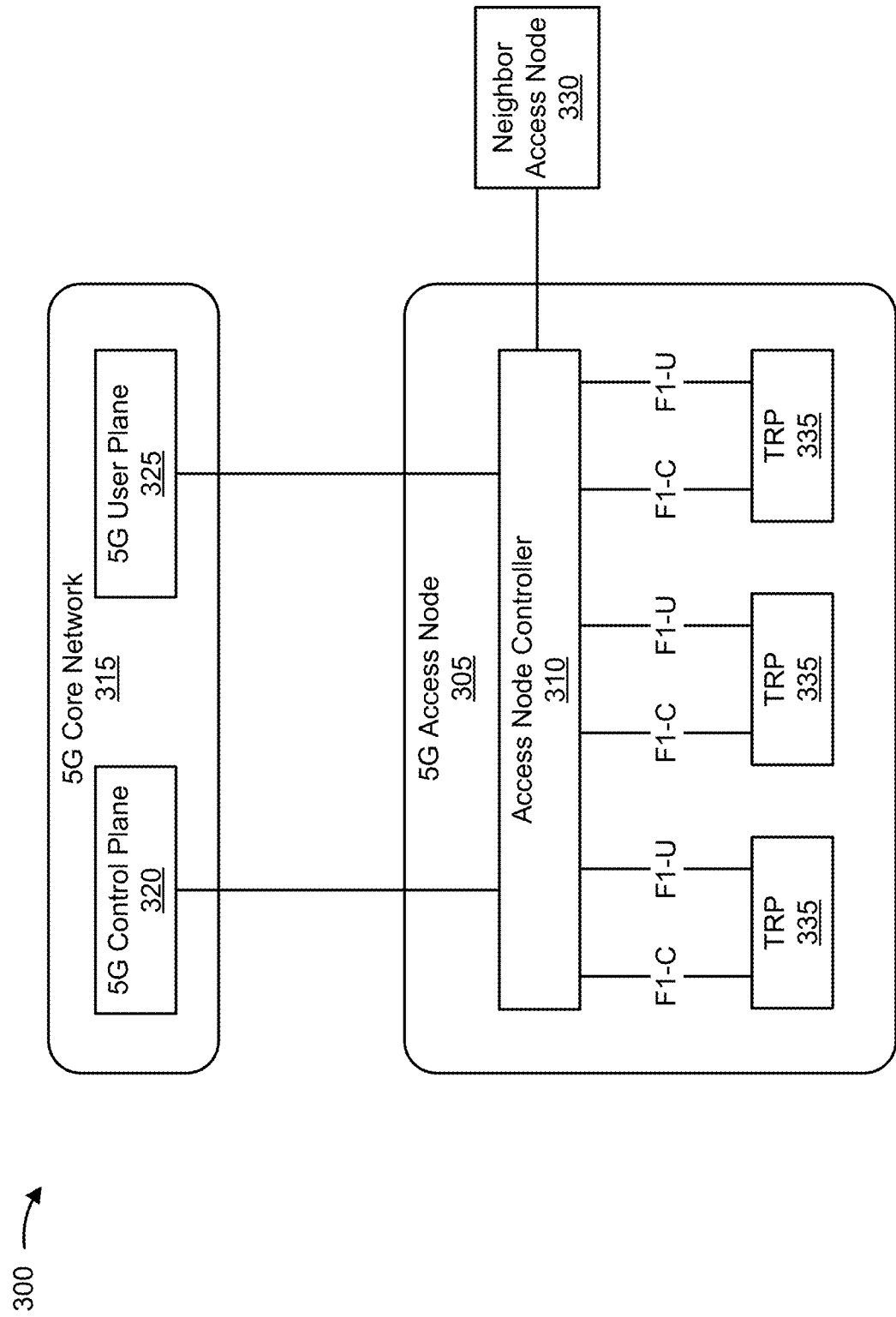
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different QCL relationships (e.g., different spatial parameters, different TCI states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

In some aspects, the techniques and apparatuses enabling beam management RRC parameters described herein may be implemented in a logical architecture of the distributed RAN 300.

As indicated above, FIG. 3 is provided as an example. Other examples may differ from what was described with regard to FIG. 3.

Figure 4:
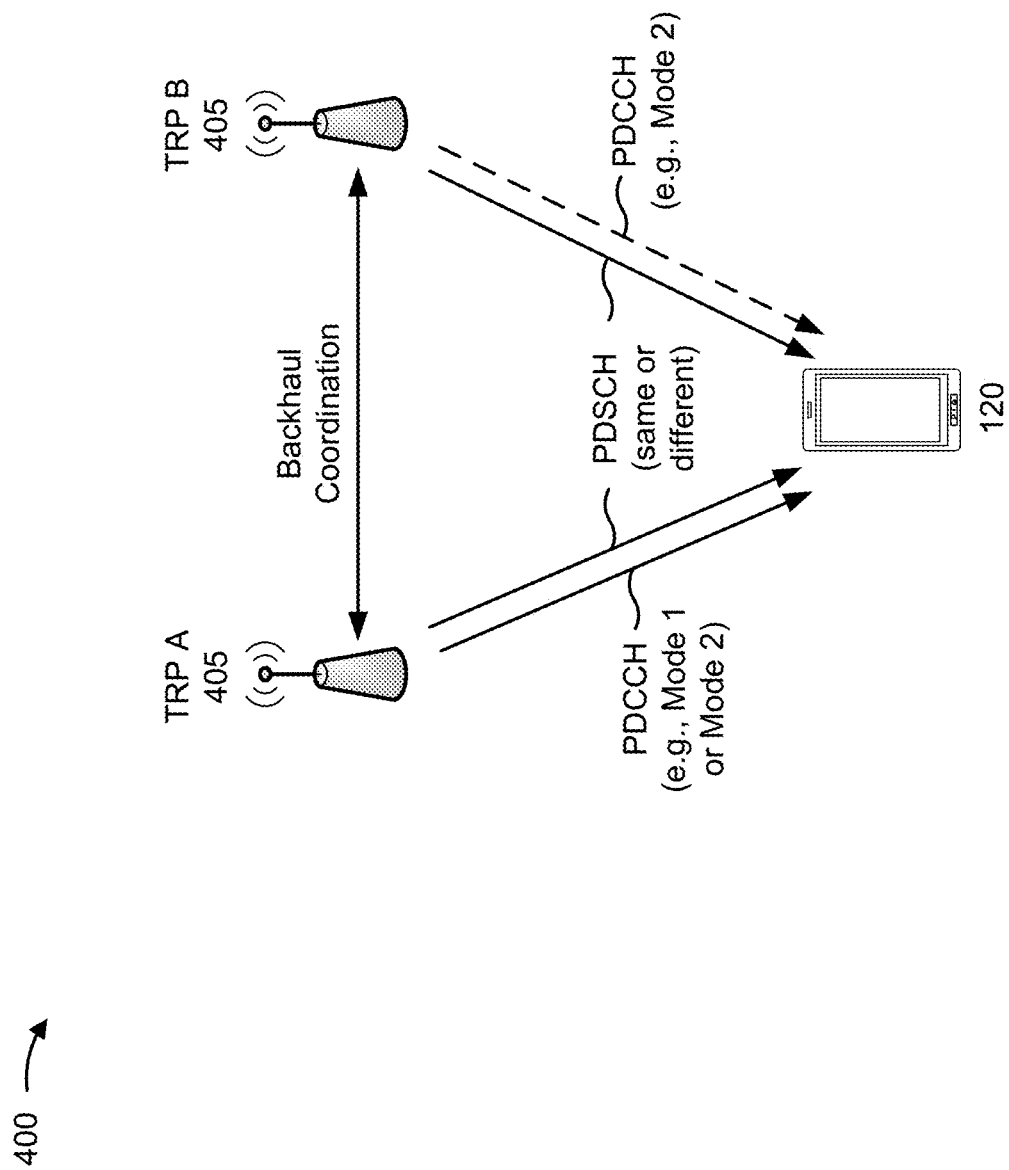
FIG. 4 is a diagram illustrating an example of multiple transmit receive point (multi-TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

In some aspects, the techniques and apparatuses enabling beam management RRC parameters described herein may be implemented in a multi-TRP communication scenario such as that illustrated in example 400.

As indicated above, FIG. 4 is provided as an example. Other examples may differ from what is described with respect to FIG. 4.

A wireless communication system may support a variety of beam management related features. The beam management related features may include, for example, one or more features related to multi-beam transmission, one or more features related to multi-TRP beam management, or one or more features related to BFR, among other examples. Signaling (e.g., radio resource control (RRC) signaling) associated with such beam management related features should be defined in order to ensure effective support of the beam management related features in the wireless communication system.

Techniques and apparatuses described herein are associated with enabling beam management RRC parameters that support a variety of beam related features.

FIGS. 5-11 are diagrams illustrating examples associated with enabling beam management RRC parameters, in accordance with the present disclosure. In the examples shown in FIGS. 5-11, a UE 120 communicates with a base station 110. In some aspects, the base station 110 and the UE 120 may be included in a wireless network, such as wireless network 100. The base station 110 and the UE 120 may communicate via a wireless access link, which may include an uplink and a downlink.

Figure 5:
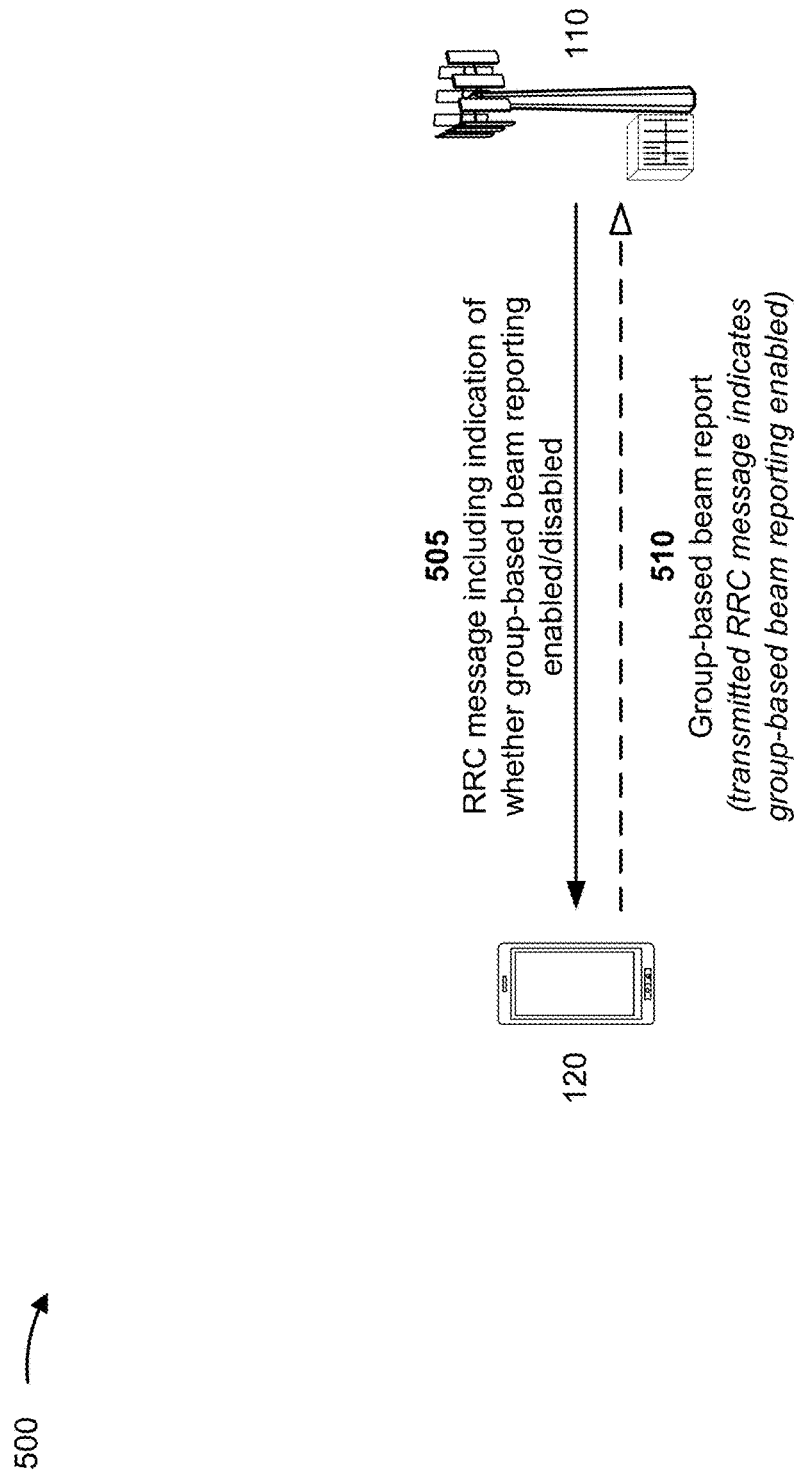
FIGS. 5-11 are diagrams illustrating examples associated with enabling beam management radio resource control (RRC) parameters, in accordance with the present disclosure.

FIG. 5 is a diagram illustrating an example 500 associated with an RRC message for enabling or disabling group-based beam reporting (e.g., enhance group-based beam reporting).

As shown by reference 505, the base station 110 may transmit, and the UE 120 may receive, an RRC message, the RRC message including an indication of whether group-based beam reporting (e.g., enhanced group-based beam reporting) is enabled for the UE 120. For example, the RRC message may include an indication that may indicate that group-based beam reporting is enabled for the UE 120, or may indicate that group-based beam reporting is disabled (i.e., not enabled) for the UE 120.

As shown by reference 510, the UE may in some aspects transmit a group-based beam report. For example, the UE 120 may transmit a group-based beam report based at least in part on the indication in the RRC message indicating that the group-based beam reporting is enabled for the UE. Alternatively, the UE 120 may refrain from transmitting a group-based beam report based at least in part on the indication in the RRC message indicating that the group-based beam reporting is disabled for the UE 120.

In some aspects, the group-based beam report includes information that identifies at least one group of beams that can be received simultaneously at the UE 120. In some aspects, a given group of beams indicated in the group-based beam report includes a first beam associated with a first channel management resource (CMR) set that corresponds to a first TRP of the UE 120, and includes a second beam associated with a second CMR set that corresponds to a second TRP of the UE 120.

In some aspects, the base station 110 may transmit, and the UE 120 may receive, a configuration indicating a quantity of beam groups (e.g., 1, 2, 3, or 4) to be reported by the UE 120 in the group-based beam report. In some aspects, the group-based beam report transmitted by the UE 120 includes a quantity of beam groups indicated in the configuration.

In some aspects, the UE 120 may transmit, and the base station 110 may receive, UE capability information indicating a maximum quantity of beam groups that can be reported by the UE 120 in the group-based beam report. In some aspects, the configuration indicating the quantity of beam groups to be reported by the UE 120 may indicate a quantity of beam groups that is less than or equal to the maximum quantity of beam groups that can be reported by the UE 120 in the group-based beam report.

As indicated above, FIG. 5 is provided as an example. Other examples may differ from what is described with respect to FIG. 5.

Figure 6:
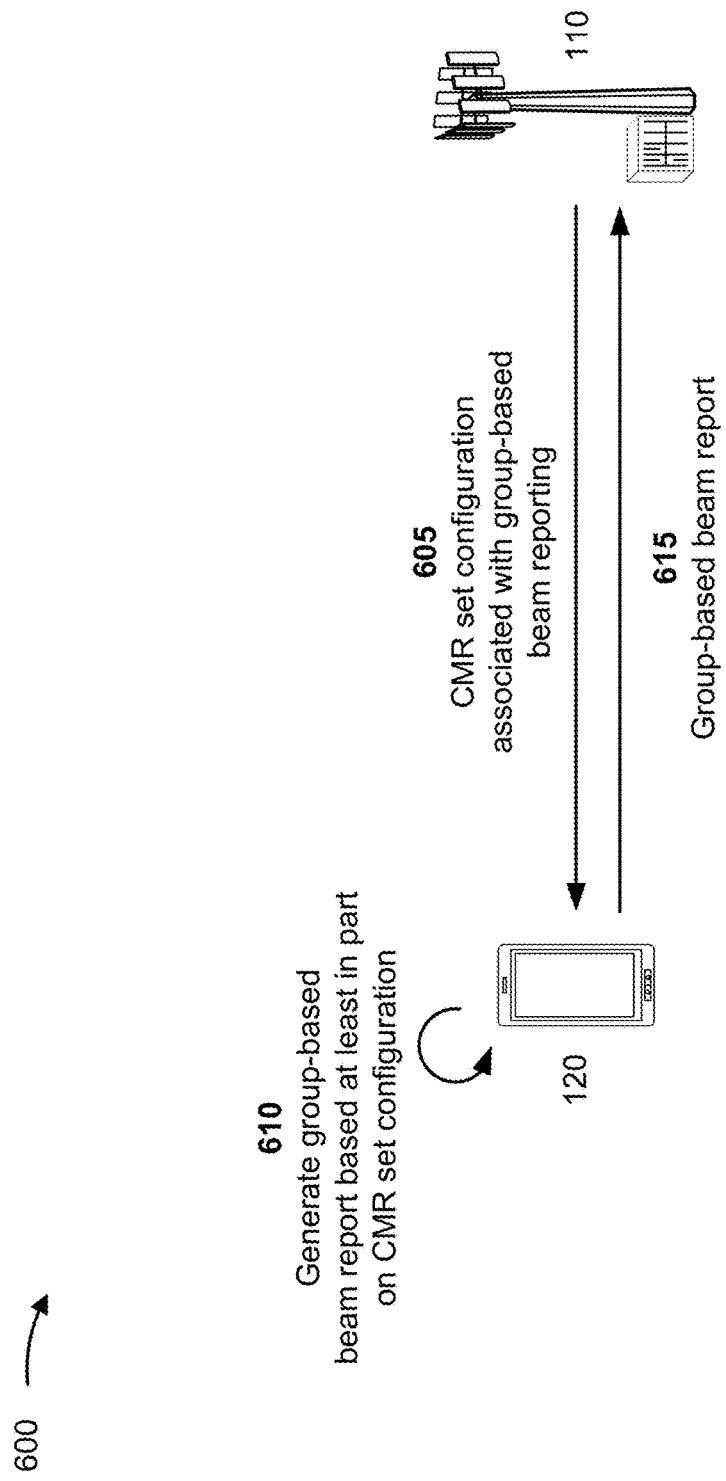

FIG. 6 is a diagram illustrating an example 600 associated with configuration of a CMR set associated with group-based beam reporting.

As shown by reference 605, the base station 110 may transmit, and the UE 120 may receive, a CMR set configuration associated with group-based beam reporting. In some aspects, the CMR set configuration configures at least two CMR sets. In some aspects, a resource type associated with the CMR set configuration is semi-persistent or periodic.

In some aspects, the CMR set configuration identifies a channel state information (CSI) resource configuration associated with a CMR set list that includes the at least two resource sets. For example, the CMR set configuration may identify a CSI resource configuration (e.g., CSI-ResourceConfig) that defines a CMR set list (e.g., nzp-CSI-RS-ResourceSetList) that contains two resource sets. In this example, a first resource set in the CMR set list corresponds to a first CMR set and a second resource set corresponds to a second CMR set based on an order of the resource sets in the CMR set list or based at least in part on identifiers of the resource sets (e.g., a resource set with a lower identifier corresponds to the first CMR set, a resource set with a higher identifier corresponds to the second CMR set).

In some aspects, the CMR set configuration identifies a first CSI resource configuration associated with a first CMR set and identifies a second CSI resource configuration associated with a second CMR set. For example, when a reported beam metric is a Layer 1 reference signal received power (L1-RSRP), the CMR set configuration may identify a first CSI resource configuration associated with a first CMR set (e.g., resourcesForChannelMeasurement) and may identify a second CSI resource configuration associated with a second CMR set (e.g., additionalresourcesForChannelMeasurement). In some aspects, such as when the reported beam metric is a Layer 1 signal-to-interference-plus-noise ratio (L1-SINR), the first CSI resource configuration is associated with a first zero power interference management resource (ZP-IMR) set and a first non-zero power interference management resource (NZP-IMR) set, and the second CSI resource configuration is associated with a second ZP-IMR set and a second NZP-IMR set.

As shown by reference 610, the UE 120 may generate a group-based beam report based at least in part on the CMR set configuration. For example, the UE 120 may perform one or more measurements based at least in part on the at least two CMR sets indicated in the CMR set configuration, and may generate the group-based beam report based at least in part on the one or more measurements.

As shown by reference 615, the UE 120 may transmit, and the base station 110 may receive, the group-based beam report generated based at least in part on the CMR set configuration.

As indicated above, FIG. 6 is provided as an example. Other examples may differ from what is described with respect to FIG. 6.

Figure 7:
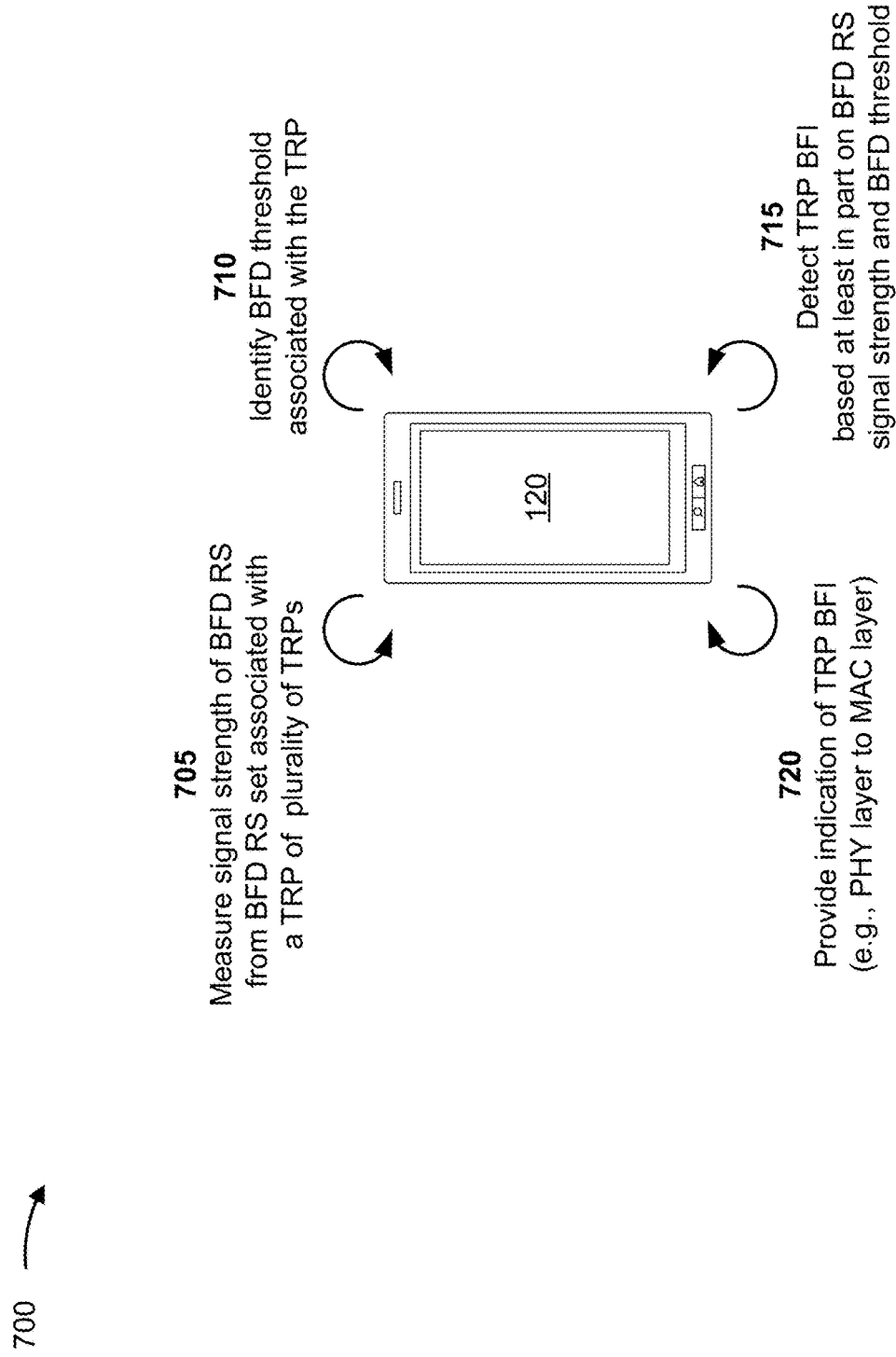

FIG. 7 is a diagram illustrating an example 700 related to a beam failure detection (BFD) threshold associated with a TRP specific BFR.

As shown by reference 705, the UE 120 may measure a signal strength of a BFD RS. In some aspects, the BFD RS is included in a BFD RS set that corresponds to a TRP of a plurality of TRPs of the UE 120.

As shown by reference 710, the UE 120 may identify a BFD threshold associated with the TRP. In some aspects, the BFD threshold is a block error rate (BLER) threshold.

In some aspects, the UE 120 may identify the BFD threshold based at least in part on a default value for the BFD threshold. For example, in some aspects, the BFD threshold may be identified as a value of a BLER threshold configured on the UE 120 (e.g., rlmInSyncOutOfSyncThreshold).

In some aspects, the UE 120 may identify the BFD threshold based at least in part on a TRP-specific BFR value for the BFD threshold. That is, in some aspects, the value of the BFD threshold may be defined (e.g., in an applicable wireless communication standard) and configured specifically for the purpose of use for a TRP-specific BFR.

In some aspects, the UE 120 may identify the BFD threshold based at least in part on receiving RRC signaling that indicates a value for the BFD threshold. For example, in some aspects, the base station 110 may identify a BFD threshold for the TRP (e.g., in a manner similar to that of the UE 120 as described above), and may transmit, to the UE 120, a configuration indicating the BFD threshold.

In some aspects, the BFD threshold is a common BFD threshold associated with the plurality of TRPs. Alternatively, in some aspects, the BFD threshold is a TRP-specific threshold associated with the TRP (e.g., the BFD threshold may be specific to the TRP). In some aspects, the BFD threshold is associated with a particular component carrier. In some aspects, BFD thresholds may be configured on the UE 120 on a per component carrier basis.

In some aspects, the BFD threshold may be configured on the UE 120 (e.g., by the base station 110) based at least in part on TRP-specific beam failure reporting being configured for a component carrier associated with the TRP. That is, in some aspects, the BFD threshold can be (e.g., as required, or as optional) configured if TRP-specific BFR is configured for a component carrier associated with the TRP.

As shown by reference 715, the UE 120 may detect a beam failure instance (BFI) associated with the TRP based at least in part on a determination that the signal strength of the BFD RS satisfies the BFD threshold. For example, the UE 120 may measure the signal strength of the BFD RS, as described above, and may compare the signal strength of the BFD RS to the BFD threshold. Here, if the signal strength satisfies the BFD threshold (e.g., if the signal strength is less than a signal strength corresponding to the BFD threshold), then the UE 120 may detect a BFI associated with the TRP. Conversely, if the signal strength does not satisfy the BFD threshold (e.g., if the signal strength is greater than or equal to the signal strength corresponding to the BFD threshold), then the UE 120 may determine that no BFI associated with the TRP has occurred.

As shown by reference 720, the UE 120 may provide an indication of the BFI associated with the TRP. For example, the BFI may be detected at a physical (PHY) layer of the UE 120, and the PHY layer may provide an indication of the BFI to a MAC layer of the UE 120. In some aspects, the MAC layer of the UE 120 may maintain a count of BFIs detected by the PHY layer. Here, if the count of BFIs satisfies a BFI threshold (e.g., if a quantity of BFIs detected during a particular amount of time is greater than or equal to a threshold quantity of BFIs), then the MAC layer may detect a beam failure associated with the TRP.

As indicated above, FIG. 7 is provided as an example. Other examples may differ from what is described with respect to FIG. 7.

Figure 8:
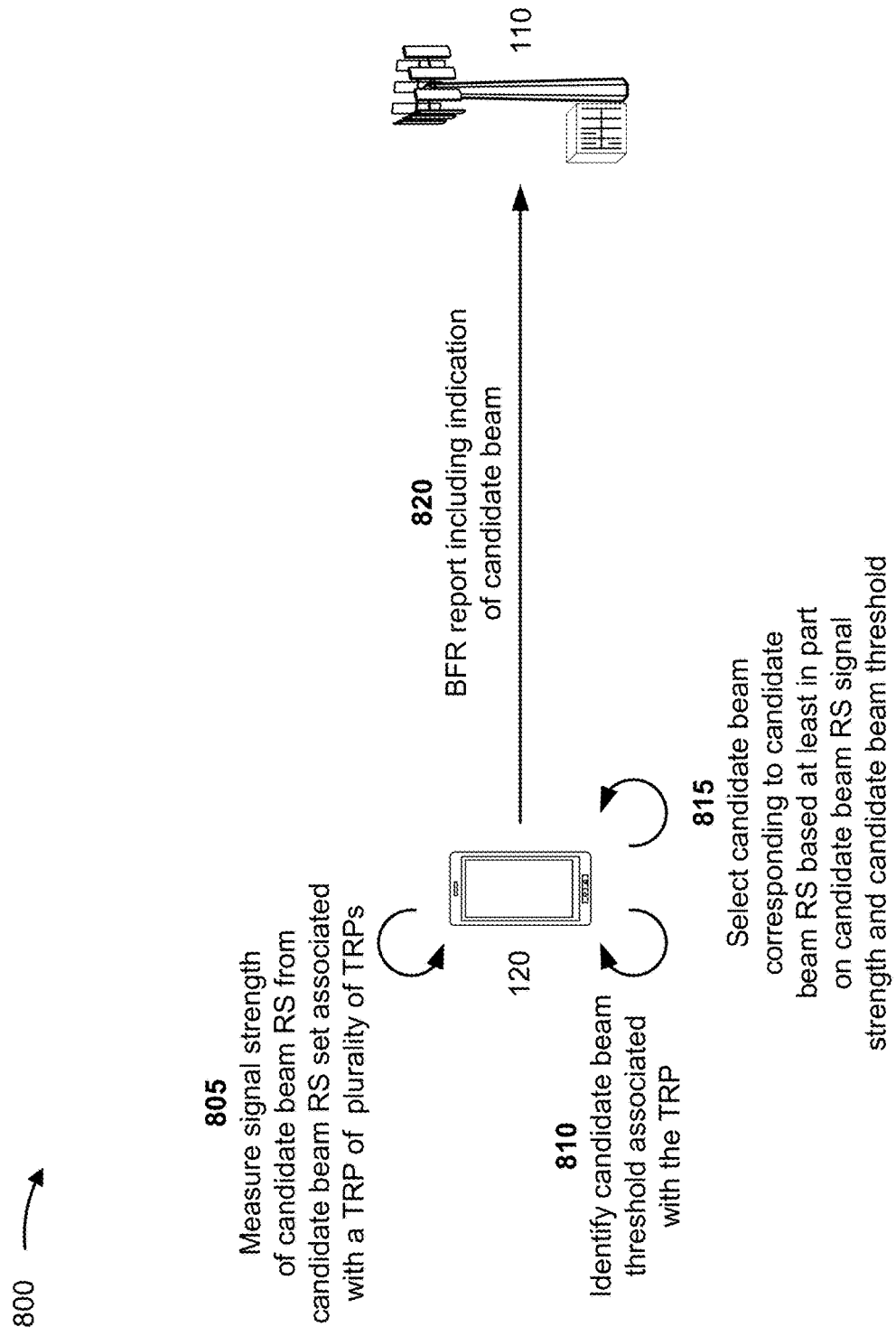

FIG. 8 is a diagram illustrating an example 800 related to a candidate beam threshold associated with a TRP specific BFR.

As shown by reference 805, the UE 120 may measure a signal strength of a candidate beam RS. In some aspects, the candidate beam RS may be included in a set of candidate beam RSs that corresponds to a TRP of a plurality of TRPs of the UE 120.

As shown by reference 810, the UE 120 may identify a candidate beam threshold associated with the TRP.

In some aspects, the UE 120 may identify the candidate beam threshold based at least in part on a default value for a synchronization signal block (SSB) threshold or a default value for a BFR threshold. For example, in some aspects, the candidate beam threshold may be identified as a value of an SSB threshold (e.g., rsrp-ThresholdSSB) configured on the UE 120 or a value of a BFR threshold (e.g., rsrp-ThresholdBFR) configured on the UE 120.

In some aspects, the UE 120 may identify the candidate beam threshold based at least in part on a TRP-specific BFR reporting value for an SSB threshold or a TRP-specific BFR reporting value for a BFR threshold. That is, in some aspects, the value of the candidate beam threshold may be a value of an SSB threshold (e.g., rsrp-ThresholdSSB_r17) or a BFR threshold (e.g., rsrp-ThresholdSSB_r17) that is defined (e.g., in an applicable wireless communication standard) and configured specifically for the purpose of use for a TRP-specific BFR.

In some aspects, the UE 120 may identify the candidate beam threshold based at least in part on an SSB threshold based at least in part on a cell associated with the TRP being a secondary primary cell (SpCell). For example, the UE 120 may be configured to identify the candidate beam threshold based at least in part on an SSB threshold when the TRP is on an SpCell.

In some aspects, the UE 120 may identify the candidate beam threshold based at least in part on a BFR threshold based at least in part on a cell associated with the TRP being a secondary cell (Scell). For example, the UE 120 may be configured to identify the candidate beam threshold based at least in part on a BFR threshold when the TRP is on an Scell.

In some aspects, the UE 120 may identify the candidate beam threshold based at least in part on a BFR threshold regardless of a type of a cell associated with the TRP. For example, the UE 120 may be configured to identify the candidate beam threshold based at least in part on a BFR threshold (e.g., rsrp-ThresholdBFR, rsrp-ThresholdBFR_r17, or the like) regardless of whether the TRP is on an SpCell or an Scell.

In some aspects, the UE 120 may identify the candidate beam threshold based at least in part on an SSB threshold regardless of a type of a cell associated with the TRP. For example, the UE 120 may be configured to identify the candidate beam threshold based at least in part on an SSB threshold (e.g., rsrp-ThresholdSSB, rsrp-ThresholdSSB_r17, or the like) regardless of whether the TRP is on an SpCell or an Scell.

In some aspects, the UE 120 may identify the candidate beam threshold based at least in part on receiving RRC signaling that indicates a value for the candidate beam threshold. For example, in some aspects, the base station 110 may identify a candidate beam threshold for the TRP (e.g., in a manner similar to that of the UE 120 as described above), and may transmit, to the UE 120, a configuration indicating the candidate beam threshold.

In some aspects, the candidate beam threshold is a common candidate beam threshold associated with the plurality of TRPs. Alternatively, in some aspects, the candidate beam threshold is a TRP-specific threshold associated with the TRP (e.g., the candidate beam threshold may be specific to the TRP). In some aspects, the candidate beam threshold is associated with a particular component carrier. In some aspects, candidate beam thresholds may be configured on the UE 120 on a per component carrier basis.

In some aspects, the candidate beam threshold may be configured on the UE 120 (e.g., by the base station 110) based at least in part on TRP-specific beam failure reporting being configured for a component carrier associated with the TRP. That is, in some aspects, the candidate beam threshold can be (e.g., as required, or as optional) configured if TRP-specific BFR is configured for a component carrier associated with the TRP.

As shown by reference 815, the UE 120 may select a candidate beam corresponding to the candidate beam RS for beam failure recovery based at least in part on a determination that the signal strength of the candidate beam RS satisfies the candidate beam threshold. For example, the UE 120 may measure the signal strength of the candidate beam RS, as described above, and may compare the signal strength of the candidate beam RS to the candidate beam threshold. Here, if the signal strength satisfies the candidate beam threshold (e.g., if the signal strength is greater than or equal to a signal strength corresponding to the candidate beam threshold), then the UE 120 may select a candidate beam corresponding to the candidate beam RS for BFR. Conversely, if the signal strength does not satisfy the candidate beam threshold (e.g., if the signal strength is less than the signal strength corresponding to the candidate beam threshold), then the UE 120 may not select the candidate beam for BFR. In some aspects, the UE 120 may perform this procedure for one or more candidate beam RSs in in order to select one or more candidate beams for BFR.

As shown by reference 820, the UE 120 may transmit a BFR report including an indication of the candidate beam. For example, the UE 120 may transmit a BFR report including an indication of the candidate beam as a candidate beam selected by the UE 120 for BFR.

In some aspects, the UE 120 may transmit the BFR report in a set of physical uplink control channel (PUCCH) resources corresponding to a scheduling request (SR). In some aspects, the SR may be one of a plurality of SRs configured for requesting TRP-specific BFRs for a cell group. In some aspects, one or more SR identifiers per master/secondary cell group can be configured on the UE 120 for TRP-specific BFR. In some aspects, at least two sets of PUCCH resources, of a plurality of sets of PUCCH resources associated with the plurality of SRs, are in a same PUCCH cell of the cell group. In some aspects, at least two sets PUCCH resources, of the plurality of sets of PUCCH resources associated with the plurality of SRs, are in different PUCCH cells of the cell group.

In some aspects, the base station 110 may transmit, and the UE 120 may receive, a configuration associated with a plurality of sets of candidate beam RSs. In some aspects, each set of candidate beam RSs of the plurality of sets of candidate beam RSs corresponds to a different TRP of the plurality of TRPs. In some aspects, a given candidate beam RS may be an SSB or a CSI-RS.

As indicated above, FIG. 8 is provided as an example. Other examples may differ from what is described with respect to FIG. 8.

Figure 9:
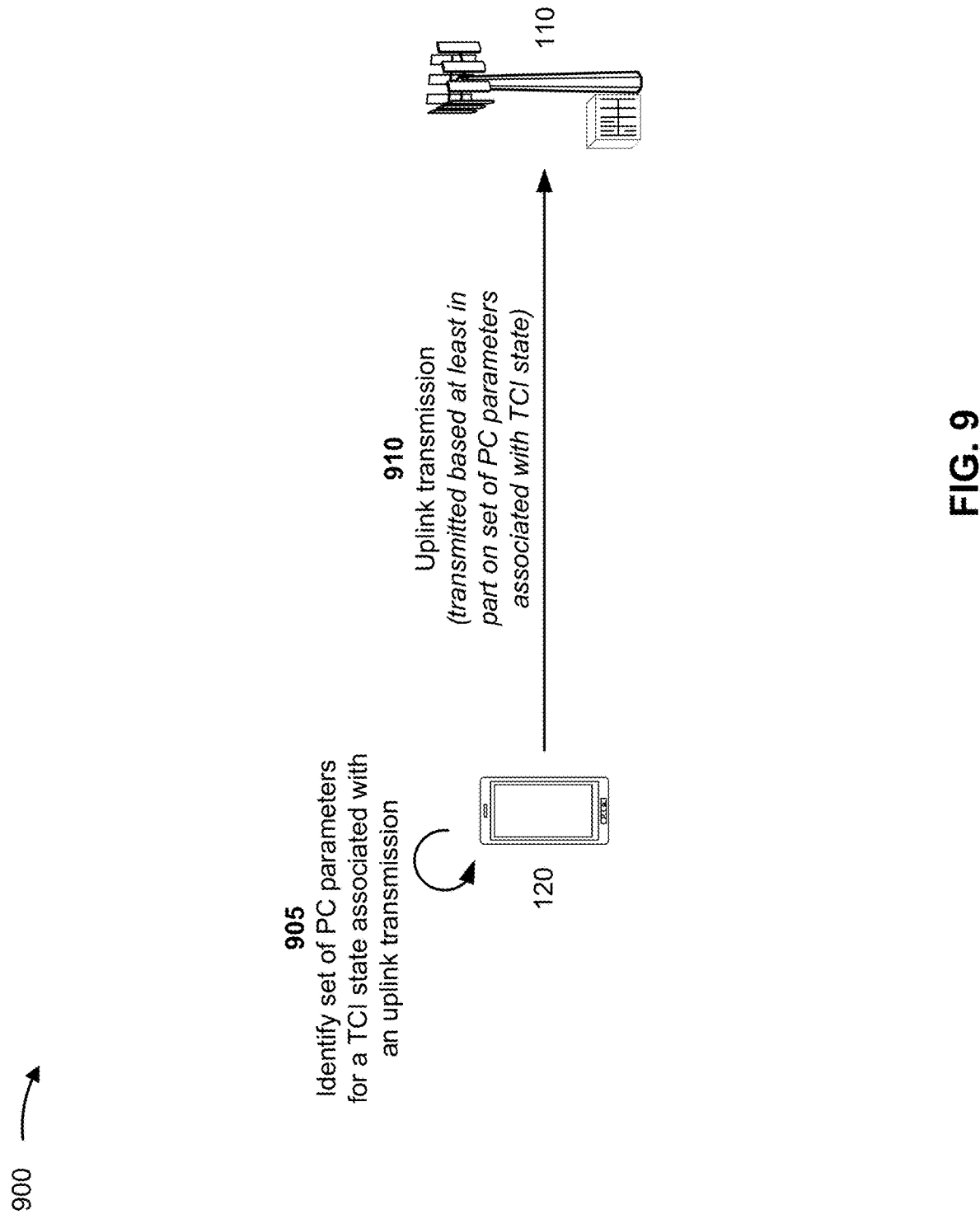

FIG. 9 is a diagram illustrating an example 900 associated with identification of a set of power control parameters for a TCI state associated with an uplink transmission.

As shown by reference 905, the UE 120 may identify a set of power control parameters for a TCI state associated with an uplink transmission. In some aspects, the TCI state may be an uplink TCI state or may be a joint TCI state. In some aspects, the uplink transmission may be a PUCCH transmission, a sounding reference signal (SRS), a physical uplink shared channel (PUSCH) transmission, or the like.

In some aspects, the UE 120 may identify the set of power control parameters based at least in part on a configuration in an information element associated with the TCI state. That is, in some aspects, the set of power control parameters may be configured in an information element associated with the TCI state.

In some aspects, the UE 120 may identify the set of power control parameters based at least in part on an association with a TCI state identifier, corresponding to the TCI state, in a dedicated information element linking the set of power control parameters to the TCI state identifier. For example, in some aspects, the dedicated information element includes a group of TCI state identifiers and one or more groups of power control parameter set identifiers, where each group of power control parameter set identifiers of the one or more groups of power control parameter set identifiers is associated with a different uplink channel type (e.g., PUCCH, SRS, PUSCH, or the like). Here, a TCI state identifier and an associated power control parameter set identifier per channel type is one-to-one mapped based on an order in the corresponding groups. As another example, in some aspects, the dedicated information element includes a group of entries, where each entry includes a TCI state identifier and associated power control parameter set identifiers for an uplink channel type. Here, each entry in the dedicated information element may have multiple parameters including a TCI state identifier and an associated power control parameter set identifier per channel type.

In some aspects, the set of power control parameters may include, for example, a target received power (P0), a pathloss compensation factor (α), a closed loop index, a pathloss RS, or the like. In some aspects, an identifier of the set of power control parameters may have a separate identifier space per channel type or may have a common identifier space for all or two or more channel types.

In some aspects, the set of power control parameters is a TCI state independent set of power control parameters for an uplink channel type (e.g., PUCCH, SRS, PUSCH, or the like) associated with the uplink transmission. In some aspects, all TCI states, of a plurality of TCI states including the TCI state, are associated with a respective set of power control parameters. Alternatively, in some aspects, all TCI states, of a plurality of TCI states including the TCI state, are not associated with a set of power control power control parameters. In some aspects, if a TCI state is not associated with a set of power control parameters, then at least one set of power control parameters should be configured per channel type as a TCI independent PC parameter set.

In some aspects, if the set of power control parameters is a TCI state independent set of power control parameters, then the UE 120 may identify the TCI state independent set of power control parameter based at least in part on the TCI state independent set of power control parameters being configured as a default set of power control parameters for TCI states that are not associated with any set of power control parameters (e.g., default_p0_Alpha_CLIdPUSCHSet).

In some aspects, if the set of power control parameters is a TCI state independent set of power control parameters, then the UE 120 may identify the TCI state independent set of power control parameter based at least in part on a particular power control parameter set identifier being associated with the TCI state. For example, if a separate power control parameter set identifier per channel type is used, then a TCI independent power control parameter set identifier can be 0. As another example, if common power control parameter set identifiers for all channel types are used, then a TCI independent power control parameter set identifier can be 0 for PUCCH, 1 for PUSCH, and 2 for SRS.

As shown by reference 910, the UE 120 may transmit the uplink transmission based at least in part on the set of power control parameters associated with the TCI state. That is, the UE 120 may transmit the uplink transmission at a power level determined according to the set of power control parameters associated with the TCI state.

As indicated above, FIG. 9 is provided as an example. Other examples may differ from what is described with respect to FIG. 9.

Figure 10:
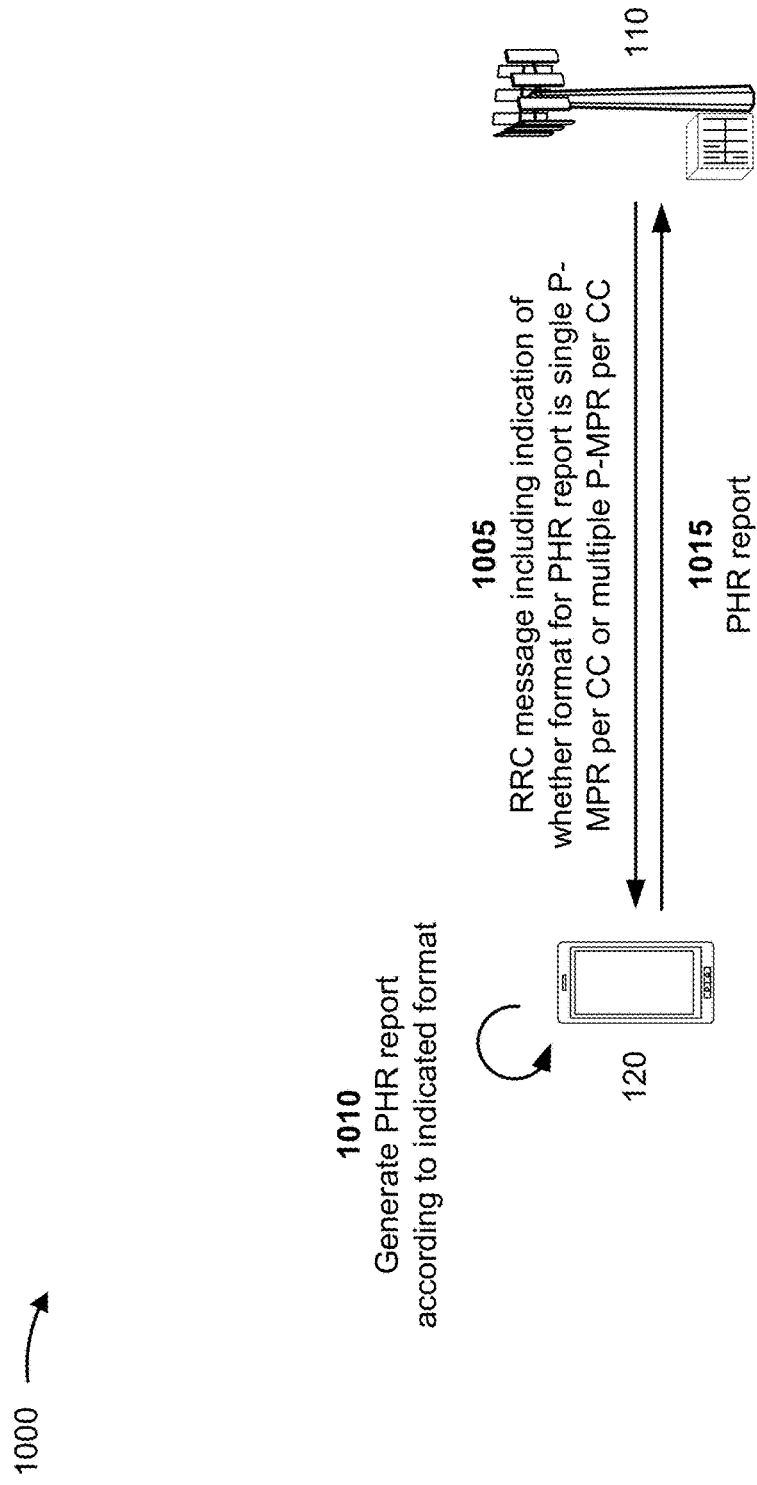

FIG. 10 is a diagram illustrating an example 1000 associated with an RRC message for indicating a format of a power headroom (PHR) report.

As shown by reference 1005, the base station 110 may transmit, and the UE 120 may receive, an RRC message, the RRC message including an indication of whether a format for a PHR report to be used by the UE 120 is either a format indicating a single power management maximum power reduction (P-MPR) per component carrier, or a format indicating multiple P-MPRs per component carrier. In some aspects, the RRC message may include an RRC message indicating whether a format for a PHR report to be used by the UE 120 is either the format indicating a single P-MPR per component carrier, or the format indicating multiple P-MPRs per component carrier.

In some aspects, one or more parameters associated with the format indicating multiple P-MPRs per component carrier are configured in an information element dedicated to configuring the format indicating multiple P-MPRs per component carrier. In some aspects, the one or more parameters configured in the information element dedicated to configuring the format indicating multiple P-MPRs per component carrier may include, for example, a timer associated with prohibiting maximum permissible exposure (MPE) reporting (e.g., mpe-ProhibitTimer-r17), a threshold associated with MPE reporting (e.g., mpe-Threshold-r17), a quantity of P-MPRs per component carrier (e.g., numberOfN, where N defines a quantity of reported P-MPRs per component carrier), a quantity of beam identifiers per reported P-MPR (e.g., numberOfM, where M defines a quantity of beam identifiers per reported P-MPR).

In some aspects, one or more parameters associated with the format indicating multiple P-MPRs per component carrier are identified based at least in part on a configuration for the format indicating the single P-MPR per component carrier. In some aspects, the one or more parameters identified based at least in part on the configuration for the format indicating the single P-MPR per component carrier may include, for example, a timer associated with prohibiting MPE reporting (e.g., mpe-ProhibitTimer-r16) or the threshold associated with MPE reporting (e.g., mpe-Threshold-r16).

As shown by reference 1010, the UE 120 may generate a PHR report according to the format indicated by the indication in the RRC message. For example, the UE 120 may generate the PHR report such that a single P-MPR is indicated per component carrier when the format indicated by the indication in the RRC message is the format that uses a single P-MPR per component carrier. As another example, the UE 120 may generate the PHR report such that multiple P-MPRs are indicated per component carrier when the format indicated by the indication in the RRC message is the format that uses multiple P-MPRs per component carrier.

As shown by reference 1015, the UE 120 may transmit, and the base station 110 may receive, the PHR having the format indicated by the indication in the RRC message.

As indicated above, FIG. 10 is provided as an example. Other examples may differ from what is described with respect to FIG. 10.

Figure 11:
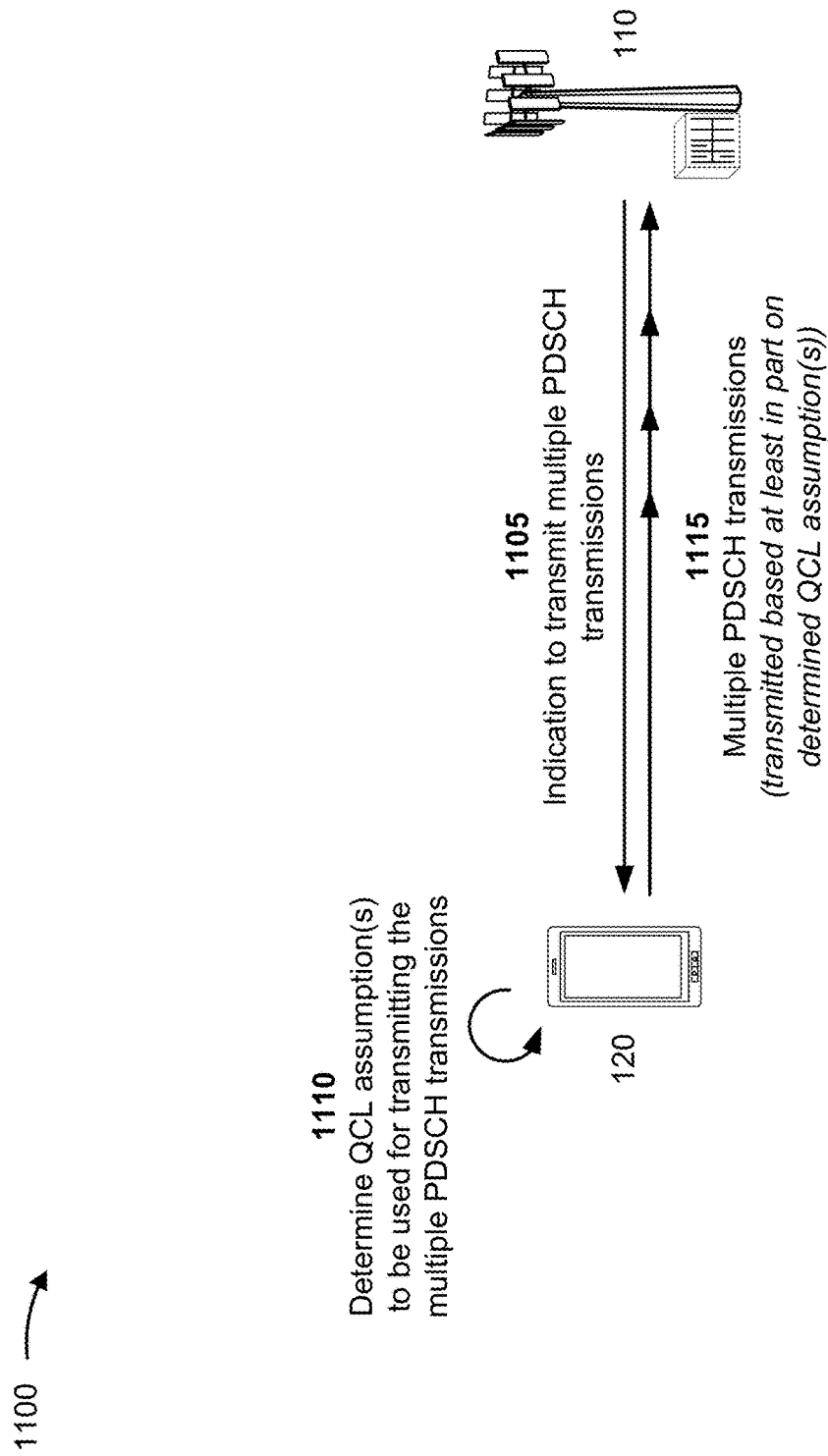

FIG. 11 is a diagram illustrating an example 1100 associated with determining one or more quasi co-location (QCL) assumptions to be used for transmitting multiple PDSCH transmissions.

As shown by reference 1105, the base station 110 may transmit, and the UE 120 may receive, an indication to cause the UE 120 to transmit multiple PDSCH transmissions. In some aspects, the indication includes DCI scheduling the multiple PDSCH transmissions. That is, in some aspects, the indication that the UE 120 is to transmit the multiple PDSCH transmissions may take the form of DCI scheduling multiple PDSCH transmissions for the UE 120.

In some aspects, the multiple PDSCH transmissions include a plurality of repetitions of a particular PDSCH transmission. That is, in some aspects, the indication that the UE 120 is to transmit the multiple PDSCH transmissions may take the form of an indication meant to cause the UE 120 to transmit multiple repetitions of a PDSCH transmission. In some aspects, the plurality of repetitions is a plurality of slot-based repetitions (e.g., when the UE 120 is indicated or configured to utilize PDSCH repetition Type A). In some aspects, the plurality of repetitions is a plurality of mini-slot-based repetitions (e.g., when the UE 120 is indicated or configured to utilize PDSCH repetition Type B).

As shown by reference 1110, the UE 120 may determine one or more QCL assumptions to be used for transmitting the multiple PDSCH transmissions.

In some aspects, the UE 120 may determine the one or more QCL assumptions based at least in part on a QCL rule indicating that a single QCL assumption is to be used for transmitting the multiple PDSCH transmissions. In some aspects, the UE 120 may determine the single QCL assumption based at least in part on a QCL assumption for a particular control resource set (CORESET) (e.g., a CORESET with a lowest identifier). In some aspects, the UE 120 may determine the single QCL assumption based at least in part on a QCL assumption for a particular activated PDSCH TCI state (e.g., a TCI state with a lowest identifier). In some aspects, the UE 120 may determine the single QCL assumption based at least in part on a QCL assumption for a TCI state indicated by a MAC control element.

In some aspects, the UE 120 may determine the one or more QCL assumptions based at least in part on a QCL rule indicating that multiple QCL assumptions are to be used for transmitting the multiple PDSCH transmissions. For example, in some aspects, the UE 120 may be configured to determine a given QCL assumption of the multiple QCL assumptions based on a default PDSCH beam rule. The default PDSCH beam rule may dictate that a QCL assumption for a PDSCH with a scheduling offset that is less than a time threshold (e.g., timeDurationForQCL) is to be determined based on a QCL assumption for a CORESET with a lowest identifier in the latest PDCCH monitoring slot and, conversely, that a QCL assumption for a PDSCH with a scheduling offset that is greater than the time threshold is to be determined based on a QCL assumption indicated in a TCI field, if available, or otherwise based on a QCL assumption for a scheduling CORESET.

In some aspects, the UE 120 may determine the one or more QCL assumptions based at least in part on a QCL rule indicated by a base station. For example, the base station 110 may transmit an indication of the QCL rule associated with determining the one or more QCL assumptions to be used by the UE 120 for transmitting the multiple PDSCH transmissions, and the UE 120 may determine the one or more QCL assumptions based at least in part on the indicated QCL rule. In some aspects, the base station 110 may transmit, and the UE 120 may receive, the indication of the QCL rule via an RRC message (e.g., an RRC flag indicating whether the single QCL rule or the multiple QCL rule should be used by the UE 120).

In some aspects, the QCL rule can be fixed or can be dynamically selected. Further the QCL rule can be common or separate for various TRP and MIMO schemes, including single TRP, single DCI based multi-TRP, multi-DCI based multi-TRP, inter-cell based multi-TRP, or inter-cell beam management, among other examples.

As shown by reference 1115, the UE 120 may transmit, and the base station 110 may receive, the multiple PDSCH transmissions based at least in part on the one or more QCL assumptions.

As indicated above, FIG. 11 is provided as an example. Other examples may differ from what is described with respect to FIG. 11.

Figure 12:
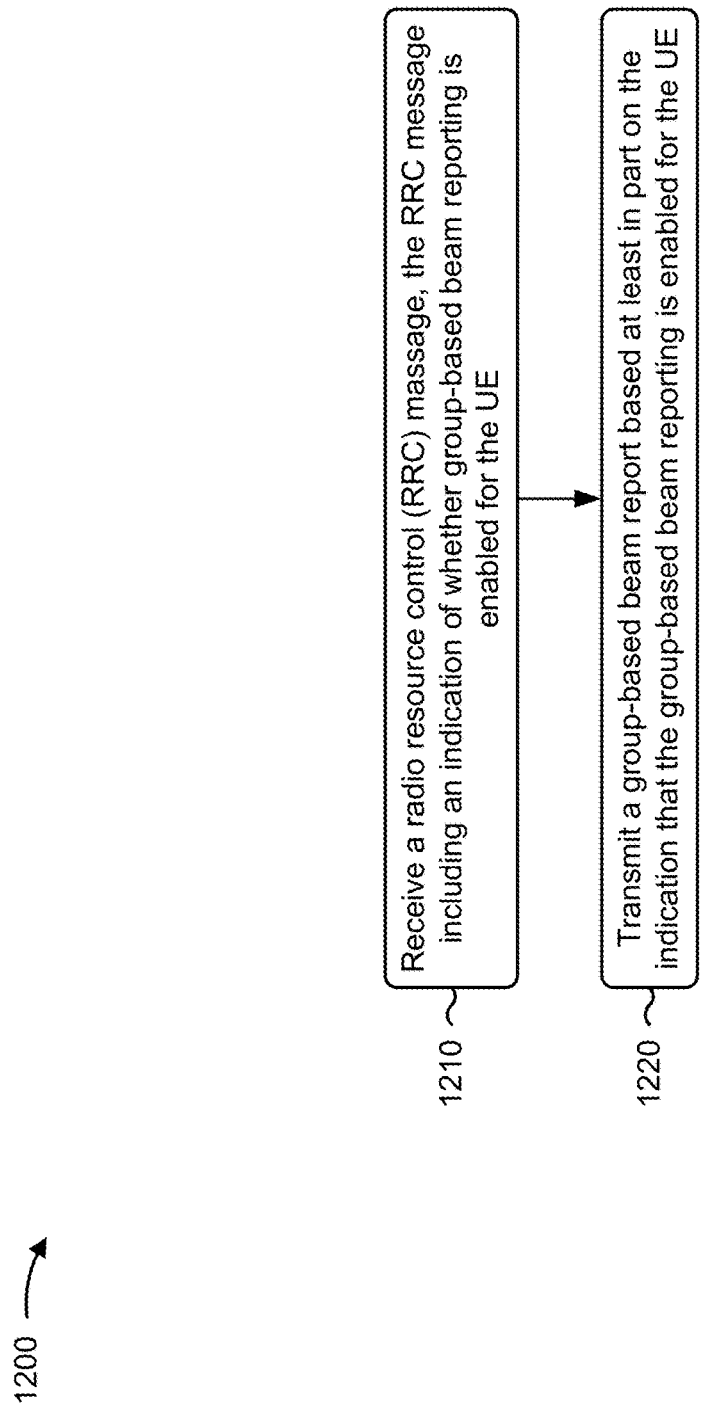
FIGS. 12-24 are diagrams illustrating example processes associated with enabling beam management RRC parameters, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with techniques for enabling beam management radio resource control parameters.

As shown in FIG. 12, in some aspects, process 1200 may include receiving an RRC message, the RRC message including an indication of whether group-based beam reporting is enabled for the UE (block 1210). For example, the UE (e.g., using communication manager 140 and/or reception component 2502, depicted in FIG. 25) may receive an RRC message, the RRC message including an indication of whether group-based beam reporting is enabled for the UE, as described above.

As further shown in FIG. 12, in some aspects, process 1200 may include transmitting a group-based beam report based at least in part on the indication that the group-based beam reporting is enabled for the UE (block 1220). For example, the UE (e.g., using communication manager 140 and/or transmission component 2504, depicted in FIG. 25) may transmit a group-based beam report based at least in part on the indication that the group-based beam reporting is enabled for the UE, as described above.

Process 1200 may include additional aspects, such as any single aspect or any combination of aspects described below and/or in connection with one or more other processes described elsewhere herein.

In a first aspect, the group-based beam report comprises information that identifies at least one group of beams that can be received simultaneously at the UE, wherein the at least one group of beams includes a first beam associated with a first CMR set that corresponds to a first TRP and includes a second beam associated with a second CMR set that corresponds to a second TRP.

In a second aspect, alone or in combination with the first aspect, process 1200 includes receiving a configuration indicating a quantity of beam groups to be reported by the UE in the group-based beam report.

In a third aspect, alone or in combination with one or more of the first and second aspects, process 1200 includes transmitting UE capability information indicating a maximum quantity of beam groups that can be reported by the UE in the group-based beam report.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
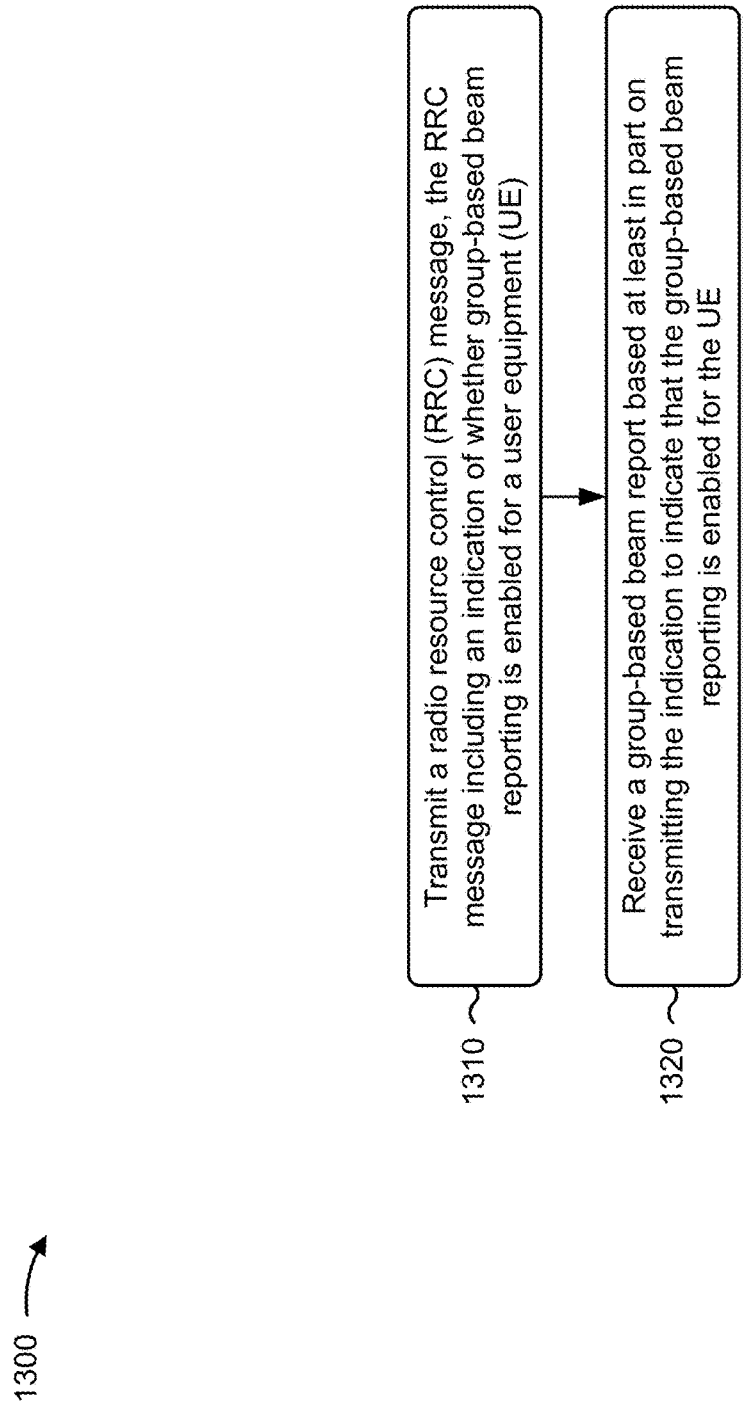

FIG. 13 is a diagram illustrating an example process 1300 performed, for example, by a base station, in accordance with the present disclosure. Example process 1300 is an example where the base station (e.g., base station 110)

performs operations associated with techniques for enabling beam management radio resource control parameters.

As shown in FIG. 13, in some aspects, process 1300 may include transmitting an RRC message, the RRC message including an indication of whether group-based beam reporting is enabled for a UE (block 1310). For example, the base station (e.g., using communication manager 150 and/or transmission component 2604, depicted in FIG. 26) may transmit an RRC message, the RRC message including an indication of whether group-based beam reporting is enabled for a UE, as described above.

As further shown in FIG. 13, in some aspects, process 1300 may include receiving a group-based beam report based at least in part on transmitting the indication to indicate that the group-based beam reporting is enabled for the UE (block 1320). For example, the base station (e.g., using communication manager 150 and/or reception component 2602, depicted in FIG. 26) may receive a group-based beam report based at least in part on transmitting the indication to indicate that the group-based beam reporting is enabled for the UE, as described above.

Process 1300 may include additional aspects, such as any single aspect or any combination of aspects described below and/or in connection with one or more other processes described elsewhere herein.

In a first aspect, the group-based beam report comprises information that identifies at least one group of beams that can be received simultaneously at the UE, wherein the at least one group of beams includes a first beam associated with a first CMR set that corresponds to a first TRP and includes a second beam associated with a second CMR set that corresponds to a second TRP.

In a second aspect, alone or in combination with the first aspect, process 1300 includes transmitting a configuration indicating a quantity of beam groups to be reported by the UE in the group-based beam report.

In a third aspect, alone or in combination with one or more of the first and second aspects, process 1300 includes receiving UE capability information indicating a maximum quantity of beam groups that can be reported by the UE in the group-based beam report.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
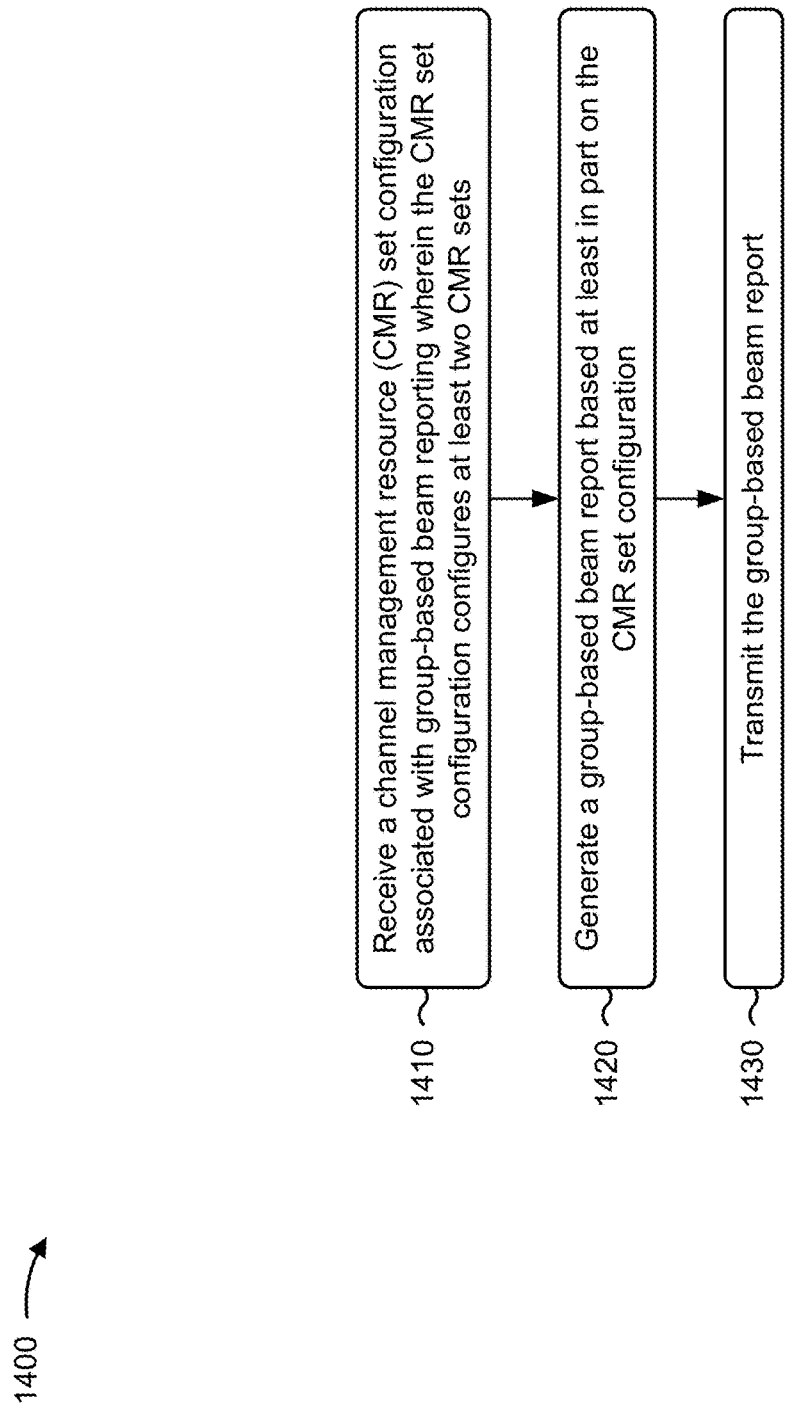

FIG. 14 is a diagram illustrating an example process 1400 performed, for example, by a UE, in accordance with the present disclosure. Example process 1400 is an example where the UE (e.g., UE 120) performs operations associated with techniques for enabling beam management radio resource control parameters.

As shown in FIG. 14, in some aspects, process 1400 may include receiving a CMR set configuration associated with group-based beam reporting, wherein the CMR set configuration configures at least two CMR sets (block 1410). For example, the UE (e.g., using communication manager 140 and/or reception component 2502, depicted in FIG. 25) may receive a CMR set configuration associated with group-based beam reporting, wherein the CMR set configuration configures at least two CMR sets, as described above. In some aspects, the CMR set configuration configures at least two CMR sets.

As further shown in FIG. 14, in some aspects, process 1400 may include generating a group-based beam report based at least in part on the CMR set configuration (block 1420). For example, the UE (e.g., using communication manager 140 and/or beam management component 2508, depicted in FIG. 25) may generate a group-based beam report based at least in part on the CMR set configuration, as described above.

As further shown in FIG. 14, in some aspects, process 1400 may include transmitting the group-based beam report (block 1430). For example, the UE (e.g., using communication manager 140 and/or transmission component 2504, depicted in FIG. 25) may transmit the group-based beam report, as described above.

Process 1400 may include additional aspects, such as any single aspect or any combination of aspects described below and/or in connection with one or more other processes described elsewhere herein.

In a first aspect, a resource type associated with the CMR set configuration is semi-persistent or periodic.

In a second aspect, alone or in combination with the first aspect, the CMR set configuration identifies a CSI resource configuration associated with a CMR set list that includes the at least two resource sets.

In a third aspect, alone or in combination with one or more of the first and second aspects, the CMR set configuration identifies a first CSI resource configuration associated with a first CMR set of the least two CMR sets and identifies a second CSI resource configuration associated with a second CMR set of the at least two CMR sets.

In a fourth aspect, alone or in combination with one or more of the first through third aspects, the first CSI resource configuration is associated with a first ZP-IMR set and a first NZP-IMR set, and the second CSI resource configuration is associated with a second ZP-IMR set and a second NZP-IMR set.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
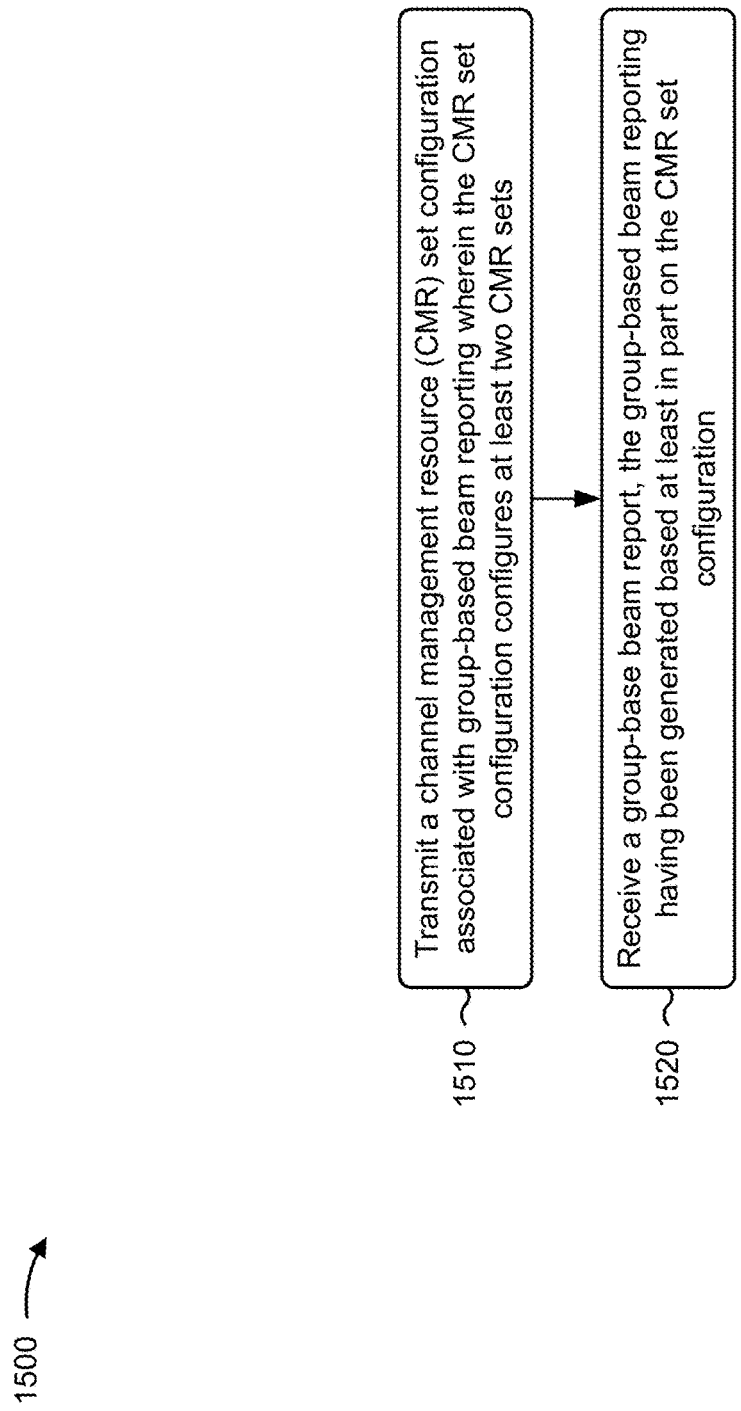

FIG. 15 is a diagram illustrating an example process 1500 performed, for example, by a base station, in accordance with the present disclosure. Example process 1500 is an example where the base station (e.g., base station 110) performs operations associated with techniques for enabling beam management radio resource control parameters.

As shown in FIG. 15, in some aspects, process 1500 may include transmitting a CMR set configuration associated with group-based beam reporting, wherein the CMR set configuration configures at least two CMR sets (block 1510). For example, the base station (e.g., using communication manager 150 and/or transmission component 2604, depicted in FIG. 26) may transmit a CMR set configuration associated with group-based beam reporting, wherein the CMR set configuration configures at least two CMR sets, as described above. In some aspects, the CMR set configuration configures at least two CMR sets.

As further shown in FIG. 15, in some aspects, process 1500 may include receiving a group-based beam report, the group-based beam report having been generated based at least in part on the CMR set configuration (block 1520). For example, the base station (e.g., using communication manager 150 and/or reception component 2602, depicted in FIG. 26) may receive a group-based beam report, the group-based beam report having been generated based at least in part on the CMR set configuration, as described above.

Process 1500 may include additional aspects, such as any single aspect or any combination of aspects described below and/or in connection with one or more other processes described elsewhere herein.

In a first aspect, a resource type associated with the CMR set configuration is semi-persistent or periodic.

In a second aspect, alone or in combination with the first aspect, the CMR set configuration identifies a CSI resource configuration associated with a CMR set list that includes the at least two resource sets.

In a third aspect, alone or in combination with one or more of the first and second aspects, the CMR set configuration identifies a first CSI resource configuration associated with a first CMR set of the least two CMR sets and identifies a second CSI resource configuration associated with a second CMR set of the at least two CMR sets.

In a fourth aspect, alone or in combination with one or more of the first through third aspects, the first CSI resource configuration is associated with a first ZP-IMR set and a first NZP-IMR set, and the second CSI resource configuration is associated with a second ZP-IMR set and a second NZP-IMR set.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
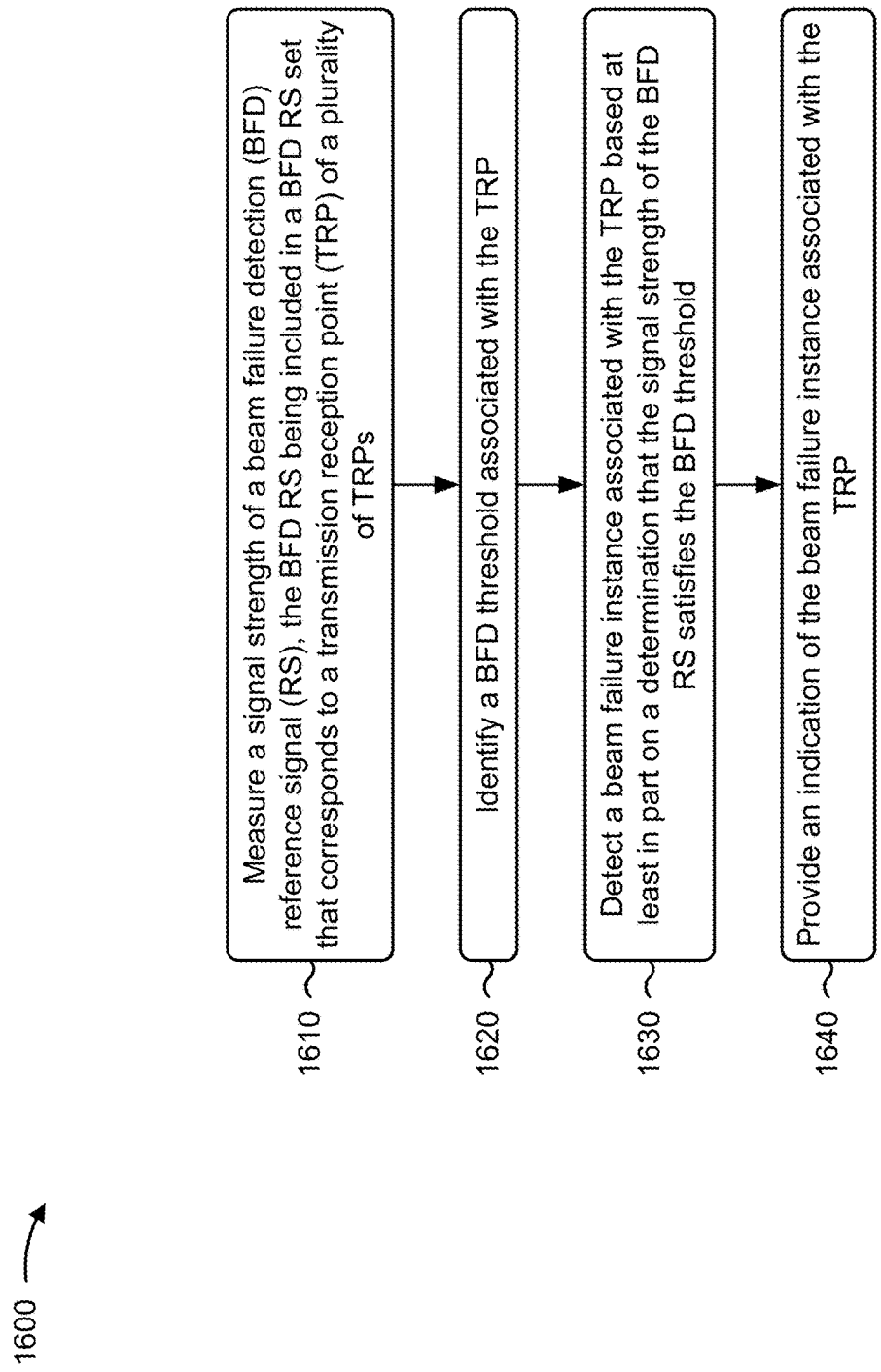

FIG. 16 is a diagram illustrating an example process 1600 performed, for example, by a UE, in accordance with the present disclosure. Example process 1600 is an example where the UE (e.g., UE 120) performs operations associated with techniques for enabling beam management radio resource control parameters.

As shown in FIG. 16, in some aspects, process 1600 may include measuring a signal strength of a BFD RS, the BFD RS being included in a BFD RS set that corresponds to a TRP of a plurality of TRPs (block 1610). For example, the UE (e.g., using communication manager 140 and/or beam management component 2508, depicted in FIG. 25) may measure a signal strength of a BFD RS, the BFD RS being included in a BFD RS set that corresponds to a TRP of a plurality of TRPs, as described above.

As further shown in FIG. 16, in some aspects, process 1600 may include identifying a BFD threshold associated with the TRP (block 1620). For example, the UE (e.g., using communication manager 140 and/or beam management component 2508, depicted in FIG. 25) may identify a BFD threshold associated with the TRP, as described above.

As further shown in FIG. 16, in some aspects, process 1600 may include detecting a beam failure instance associated with the TRP based at least in part on a determination that the signal strength of the BFD RS satisfies the BFD threshold (block 1630). For example, the UE (e.g., using communication manager 140 and/or beam management component 2508, depicted in FIG. 25) may detect a beam failure instance associated with the TRP based at least in part on a determination that the signal strength of the BFD RS satisfies the BFD threshold, as described above.

As further shown in FIG. 16, in some aspects, process 1600 may include providing an indication of the beam failure instance associated with the TRP (block 1640). For example, the UE (e.g., using communication manager 140 and/or beam management component 2508, depicted in FIG. 25) may provide an indication of the beam failure instance associated with the TRP, as described above.

Process 1600 may include additional aspects, such as any single aspect or any combination of aspects described below and/or in connection with one or more other processes described elsewhere herein.

In a first aspect, the BFD threshold is a BLER threshold.

In a second aspect, alone or in combination with the first aspect, the BFD threshold is identified based at least in part on a default value for the BFD threshold.

In a third aspect, alone or in combination with one or more of the first and second aspects, the BFD threshold is identified based at least in part on a TRP-specific BFR value for the BFD threshold.

In a fourth aspect, alone or in combination with one or more of the first through third aspects, the BFD threshold is identified based at least in part on receiving RRC signaling that indicates a value for the BFD threshold.

In a fifth aspect, alone or in combination with one or more of the first through fourth aspects, the BFD threshold is a common BFD threshold associated with the plurality of TRPs.

In a sixth aspect, alone or in combination with one or more of the first through fifth aspects, the BFD threshold is a TRP-specific threshold associated with the TRP.

In a seventh aspect, alone or in combination with one or more of the first through sixth aspects, the BFD threshold is associated with a particular component carrier.

In an eighth aspect, alone or in combination with one or more of the first through seventh aspects, the BFD threshold is configured on the UE based at least in part on TRP-specific beam failure reporting being configured for a component carrier associated with the TRP.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
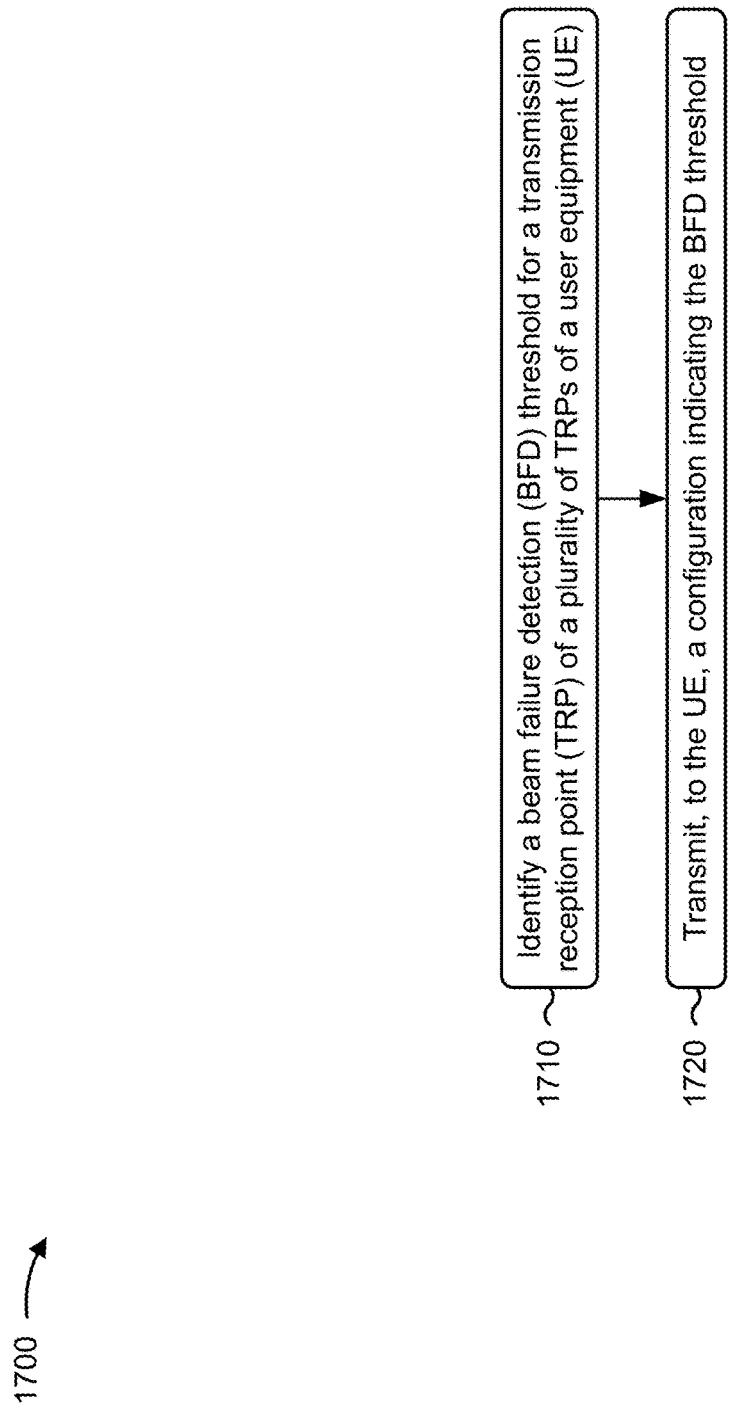

FIG. 17 is a diagram illustrating an example process 1700 performed, for example, by a base station, in accordance with the present disclosure. Example process 1700 is an example where the base station (e.g., base station 110) performs operations associated with techniques for enabling beam management radio resource control parameters.

As shown in FIG. 17, in some aspects, process 1700 may include identifying a BFD threshold for a TRP of a plurality of TRPs of a UE (block 1710). For example, the base station (e.g., using communication manager 150 and/or beam management component 2608, depicted in FIG. 26) may identify a BFD threshold for a TRP of a plurality of TRPs of a UE, as described above.

As further shown in FIG. 17, in some aspects, process 1700 may include transmitting, to the UE, a configuration indicating the BFD threshold (block 1720). For example, the base station (e.g., using communication manager 150 and/or transmission component 2604, depicted in FIG. 26) may transmit, to the UE, a configuration indicating the BFD threshold, as described above.

Process 1700 may include additional aspects, such as any single aspect or any combination of aspects described below and/or in connection with one or more other processes described elsewhere herein.

In a first aspect, the BFD threshold is a BLER threshold.

In a second aspect, alone or in combination with the first aspect, the BFD threshold is identified based at least in part on a default value for the BFD threshold.

In a third aspect, alone or in combination with one or more of the first and second aspects, the BFD threshold is identified based at least in part on a TRP-specific BFR value for the BFD threshold.

In a fourth aspect, alone or in combination with one or more of the first through third aspects, the BFD threshold is identified via RRC signaling that indicates a value for the BFD threshold.

In a fifth aspect, alone or in combination with one or more of the first through fourth aspects, the BFD threshold is a common BFD threshold associated with the plurality of TRPs.

In a sixth aspect, alone or in combination with one or more of the first through fifth aspects, the BFD threshold is a TRP-specific threshold associated with the TRP.

In a seventh aspect, alone or in combination with one or more of the first through sixth aspects, the BFD threshold is associated with a particular component carrier.

In an eighth aspect, alone or in combination with one or more of the first through seventh aspects, the BFD threshold is configured on the UE based at least in part on TRP-specific beam failure reporting being configured for a component carrier associated with the TRP.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
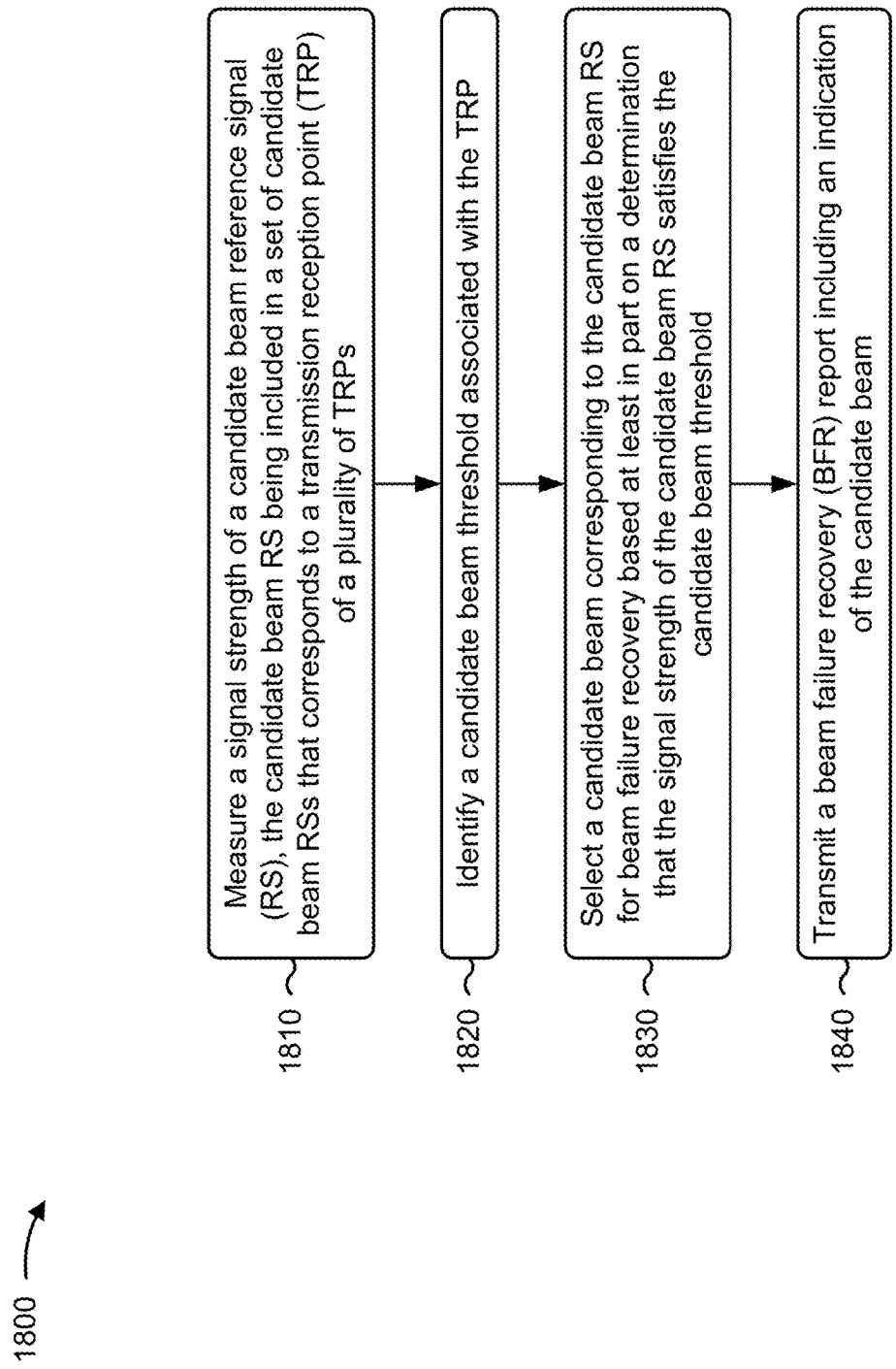

FIG. 18 is a diagram illustrating an example process 1800 performed, for example, by a UE, in accordance with the present disclosure. Example process 1800 is an example where the UE (e.g., UE 120) performs operations associated with techniques for enabling beam management radio resource control parameters.

As shown in FIG. 18, in some aspects, process 1800 may include measuring a signal strength of a candidate beam RS, the candidate beam RS being included in a set of candidate beam RSs that corresponds to a TRP of a plurality of TRPs (block 1810). For example, the UE (e.g., using communication manager 140 and/or beam management component 2508, depicted in FIG. 25) may measure a signal strength of a candidate beam RS, the candidate beam RS being included in a set of candidate beam RSs that corresponds to a TRP of a plurality of TRPs, as described above.

As further shown in FIG. 18, in some aspects, process 1800 may include identifying a candidate beam threshold associated with the TRP (block 1820). For example, the UE (e.g., using communication manager 140 and/or beam management component 2508, depicted in FIG. 25) may identify a candidate beam threshold associated with the TRP, as described above.

As further shown in FIG. 18, in some aspects, process 1800 may include selecting a candidate beam corresponding to the candidate beam RS for beam failure recovery based at least in part on a determination that the signal strength of the candidate beam RS satisfies the candidate beam threshold (block 1830). For example, the UE (e.g., using communication manager 140 and/or beam management component 2508, depicted in FIG. 25) may select a candidate beam corresponding to the candidate beam RS for beam failure recovery based at least in part on a determination that the signal strength of the candidate beam RS satisfies the candidate beam threshold, as described above.

As further shown in FIG. 18, in some aspects, process 1800 may include transmitting a BFR report including an indication of the candidate beam (block 1840). For example, the UE (e.g., using communication manager 140 and/or transmission component 2504, depicted in FIG. 25) may transmit a BFR report including an indication of the candidate beam, as described above.

Process 1800 may include additional aspects, such as any single aspect or any combination of aspects described below and/or in connection with one or more other processes described elsewhere herein.

In a first aspect, the candidate beam threshold is identified based at least in part on a default value for an SSB threshold or a default value for a BFR threshold.

In a second aspect, alone or in combination with the first aspect, the candidate beam threshold is identified based at least in part on a TRP-specific BFR reporting value for an SSB threshold or a TRP-specific BFR reporting value for a BFR threshold.

In a third aspect, alone or in combination with one or more of the first and second aspects, the candidate beam threshold is identified based at least in part on an SSB threshold based at least in part on a cell associated with the TRP being a secondary primary cell.

In a fourth aspect, alone or in combination with one or more of the first through third aspects, the candidate beam threshold is identified based at least in part on a BFR threshold based at least in part on a cell associated with the TRP being a secondary cell.

In a fifth aspect, alone or in combination with one or more of the first through fourth aspects, the candidate beam threshold is identified based at least in part on a BFR threshold regardless of a type of a cell associated with the TRP.

In a sixth aspect, alone or in combination with one or more of the first through fifth aspects, the candidate beam threshold is identified based at least in part on an SSB threshold regardless of a type of a cell associated with the TRP.

In a seventh aspect, alone or in combination with one or more of the first through sixth aspects, the candidate beam threshold is a common candidate beam threshold associated with the plurality of TRPs.

In an eighth aspect, alone or in combination with one or more of the first through seventh aspects, the candidate beam threshold is a TRP-specific threshold associated with the TRP.

In a ninth aspect, alone or in combination with one or more of the first through eighth aspects, the candidate beam threshold is associated with a particular component carrier.

In a tenth aspect, alone or in combination with one or more of the first through ninth aspects, the candidate beam threshold is configured on the UE based at least in part on TRP-specific beam failure reporting being configured for a component carrier associated with the TRP.

In an eleventh aspect, alone or in combination with one or more of the first through tenth aspects, the BFR report is transmitted in a set of PUCCH resources corresponding to an SR, the SR being one of a plurality of SRs configured for requesting TRP-specific BFRs for a cell group.

In a twelfth aspect, alone or in combination with one or more of the first through eleventh aspects, at least two sets of PUCCH resources, of a plurality of sets of PUCCH resources associated with the plurality of SRs, are in a same PUCCH cell of the cell group.

In a thirteenth aspect, alone or in combination with one or more of the first through twelfth aspects, at least two sets PUCCH resources, of a plurality of sets of PUCCH resources associated with the plurality of SRs, are in different PUCCH cells of the cell group.

In a fourteenth aspect, alone or in combination with one or more of the first through thirteenth aspects, process 1800 includes receiving a configuration associated with a plurality of sets of candidate beam RSs, wherein each set of candidate beam RSs of the plurality of sets of candidate beam RSs corresponds to a different TRP of the plurality of TRPs.

In a fifteenth aspect, alone or in combination with one or more of the first through fourteenth aspects, the candidate beam RS is an SSB or a CSI-RS.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
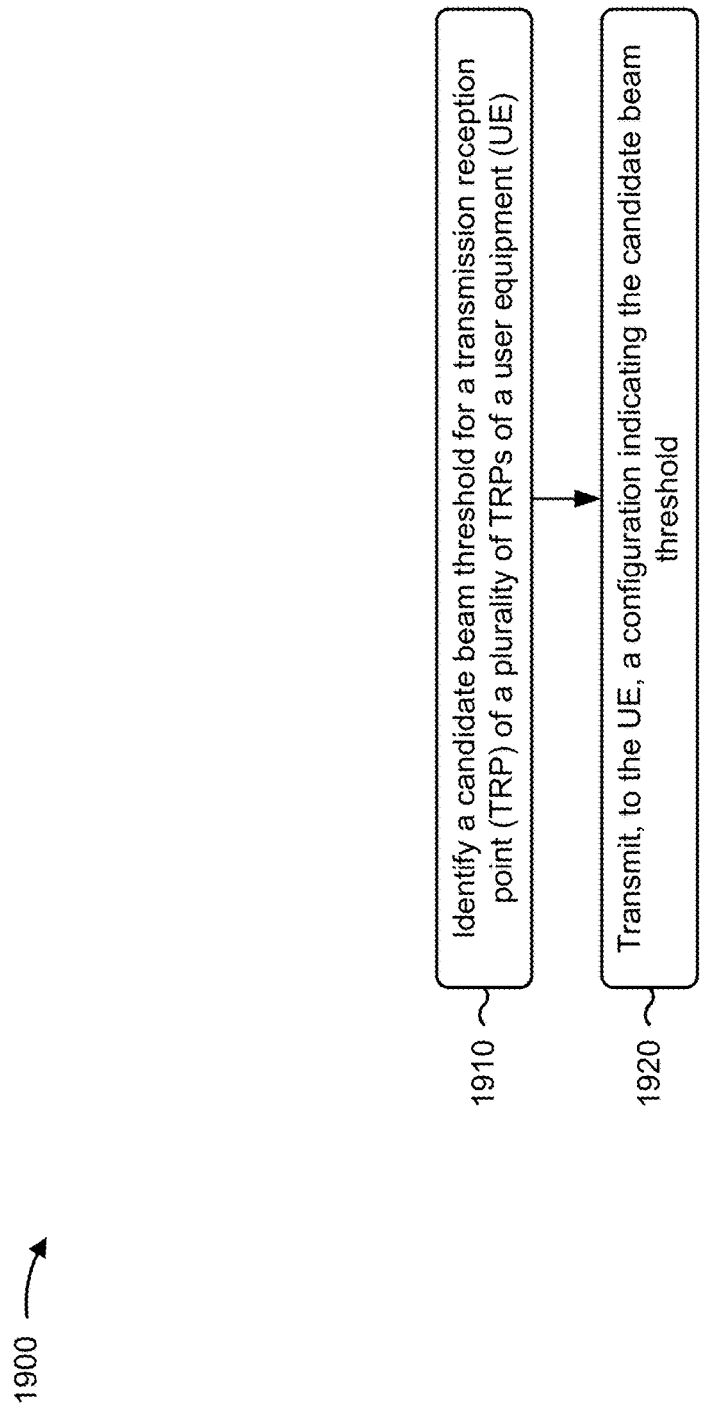

FIG. 19 is a diagram illustrating an example process 1900 performed, for example, by a base station, in accordance with the present disclosure. Example process 1900 is an example where the base station (e.g., base station 110) performs operations associated with techniques for enabling beam management radio resource control parameters.

As shown in FIG. 19, in some aspects, process 1900 may include identifying a candidate beam threshold for a TRP of a plurality of TRPs of a UE (block 1910). For example, the base station (e.g., using communication manager 150 and/or beam management component 2608, depicted in FIG. 26) may identify a candidate beam threshold for a TRP of a plurality of TRPs of a UE, as described above.

As further shown in FIG. 19, in some aspects, process 1900 may include transmitting, to the UE, a configuration indicating the candidate beam threshold (block 1920). For example, the base station (e.g., using communication manager 150 and/or transmission component 2604, depicted in FIG. 26) may transmit, to the UE, a configuration indicating the candidate beam threshold, as described above.

Process 1900 may include additional aspects, such as any single aspect or any combination of aspects described below and/or in connection with one or more other processes described elsewhere herein.

In a first aspect, the candidate beam threshold is identified based at least in part on a default value for an SSB threshold or default value for a BFR threshold.

In a second aspect, alone or in combination with the first aspect, the candidate beam threshold is identified based at least in part on a TRP-specific BFR reporting value for an SSB threshold or a TRP-specific BFR reporting value for a BFR threshold.

In a third aspect, alone or in combination with one or more of the first and second aspects, the candidate beam threshold is identified based at least in part on an SSB threshold based at least in part on a cell associated with the TRP being a secondary primary cell.

In a fourth aspect, alone or in combination with one or more of the first through third aspects, the candidate beam threshold is identified based at least in part on a BFR threshold based at least in part on a cell associated with the TRP being a secondary cell.

In a fifth aspect, alone or in combination with one or more of the first through fourth aspects, the candidate beam threshold is identified based at least in part on a BFR threshold regardless of a type of a cell associated with the TRP.

In a sixth aspect, alone or in combination with one or more of the first through fifth aspects, the candidate beam threshold is identified based at least in part on an SSB threshold regardless of a type of a cell associated with the TRP.

In a seventh aspect, alone or in combination with one or more of the first through sixth aspects, the candidate beam threshold is a common candidate beam threshold associated with the plurality of TRPs.

In an eighth aspect, alone or in combination with one or more of the first through seventh aspects, the candidate beam threshold is a TRP-specific threshold associated with the TRP.

In a ninth aspect, alone or in combination with one or more of the first through eighth aspects, the candidate beam threshold is associated with a particular component carrier.

In a tenth aspect, alone or in combination with one or more of the first through ninth aspects, the candidate beam threshold is configured on the UE based at least in part on TRP-specific beam failure reporting being configured for a component carrier associated with the TRP.

In an eleventh aspect, alone or in combination with one or more of the first through tenth aspects, the BFR report is received in a set of PUCCH resources corresponding to an SR, the SR being one of a plurality of SRs configured for requesting TRP-specific BFRs for a cell group.

In a twelfth aspect, alone or in combination with one or more of the first through eleventh aspects, at least two sets of PUCCH resources, of a plurality of sets of PUCCH resources associated with the plurality of SRs, are in a same PUCCH cell of the cell group.

In a thirteenth aspect, alone or in combination with one or more of the first through twelfth aspects, at least two sets PUCCH resources, of a plurality of sets of PUCCH resources associated with the plurality of SRs, are in different PUCCH cells of the cell group.

In a fourteenth aspect, alone or in combination with one or more of the first through thirteenth aspects, process 1900 includes transmitting a configuration associated with a plurality of sets of candidate beam RSs, wherein each set of candidate beam RSs of the plurality of sets of candidate beam RSs corresponds to a different TRP of the plurality of TRPs.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
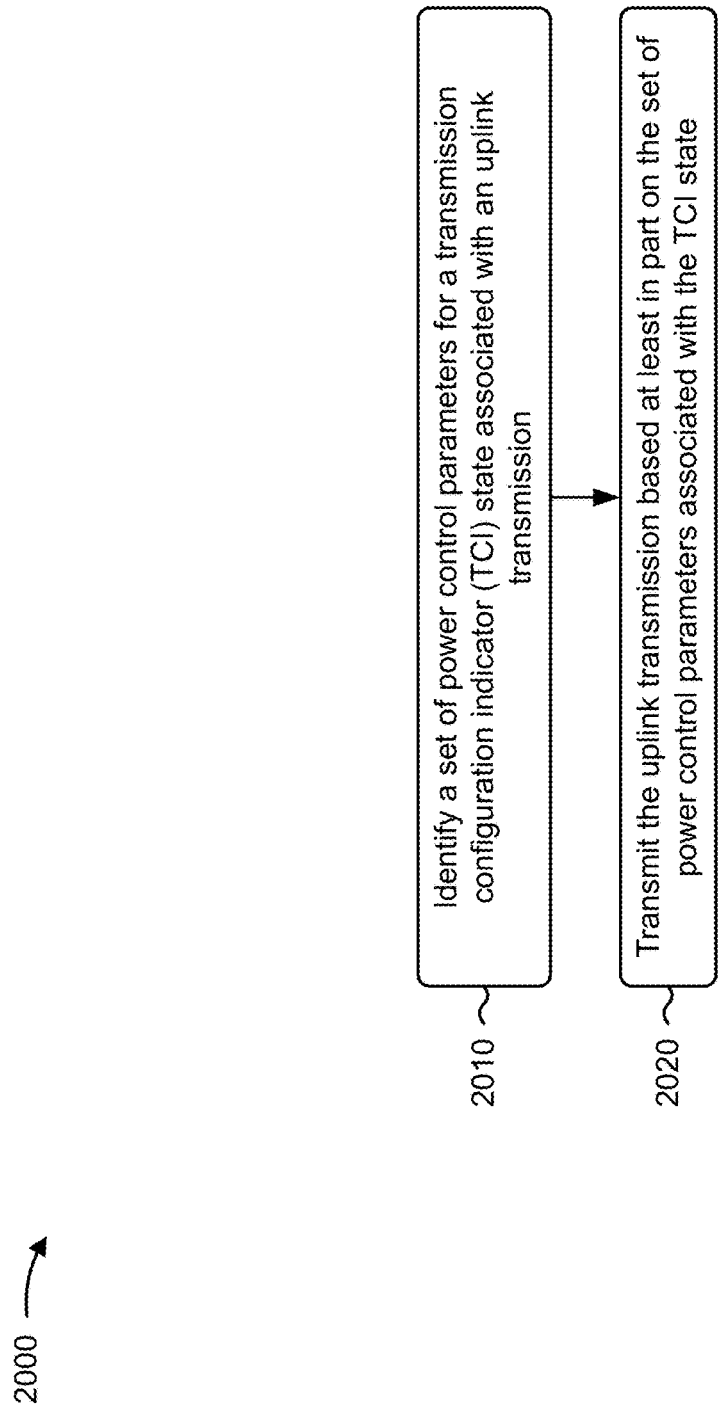

FIG. 20 is a diagram illustrating an example process 2000 performed, for example, by a UE, in accordance with the present disclosure. Example process 2000 is an example where the UE (e.g., UE 120) performs operations associated with techniques for enabling beam management radio resource control parameters.

As shown in FIG. 20, in some aspects, process 2000 may include identifying a set of power control parameters for a TCI state associated with an uplink transmission (block 2010). For example, the UE (e.g., using communication manager 140 and/or beam management component 2508, depicted in FIG. 25) may identify a set of power control parameters for a TCI state associated with an uplink transmission, as described above.

As further shown in FIG. 20, in some aspects, process 2000 may include transmitting the uplink transmission based at least in part on the set of power control parameters associated with the TCI state (block 2020). For example, the UE (e.g., using communication manager 140 and/or transmission component 2504, depicted in FIG. 25) may transmit the uplink transmission based at least in part on the set of power control parameters associated with the TCI state, as described above.

Process 2000 may include additional aspects, such as any single aspect or any combination of aspects described below and/or in connection with one or more other processes described elsewhere herein.

In a first aspect, the set of power control parameters is identified based at least in part on a configuration in an information element associated with the TCI state.

In a second aspect, alone or in combination with the first aspect, the set of power control parameters is identified based at least in part on an association with a TCI state identifier, corresponding to the TCI state, in a dedicated information element linking the set of power control parameters to the TCI state identifier.

In a third aspect, alone or in combination with one or more of the first and second aspects, the dedicated information element includes a group of TCI state identifiers and one or more groups of power control parameter set identifiers, wherein each group of power control parameter set identifiers of the one or more groups of power control parameter set identifiers is associated with a different uplink channel type.

In a fourth aspect, alone or in combination with one or more of the first through third aspects, the dedicated information element includes a group of entries, wherein each entry of the group of entries includes a TCI state identifier and associated power control parameter set identifiers for an uplink channel type.

In a fifth aspect, alone or in combination with one or more of the first through fourth aspects, the set of power control parameters is a TCI state independent set of power control parameters for an uplink channel type associated with the uplink transmission.

In a sixth aspect, alone or in combination with one or more of the first through fifth aspects, all TCI states, of a plurality of TCI states including the TCI state, are associated with a respective set of power control parameters.

In a seventh aspect, alone or in combination with one or more of the first through sixth aspects, all TCI states, of a plurality of TCI states including the TCI state, are not associated with a set of power control power control parameters.

In an eighth aspect, alone or in combination with one or more of the first through seventh aspects, the TCI state independent set of power control parameters is identified as the set of power control parameters based at least in part on the TCI state independent set of power control parameters being configured as a default set of power control parameters for TCI states that are not associated with any set of power control parameters.

In a ninth aspect, alone or in combination with one or more of the first through eighth aspects, the TCI state independent set of power control parameters is identified as the set of power control parameters based at least in part on a particular power control parameter set identifier being associated with the TCI state.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
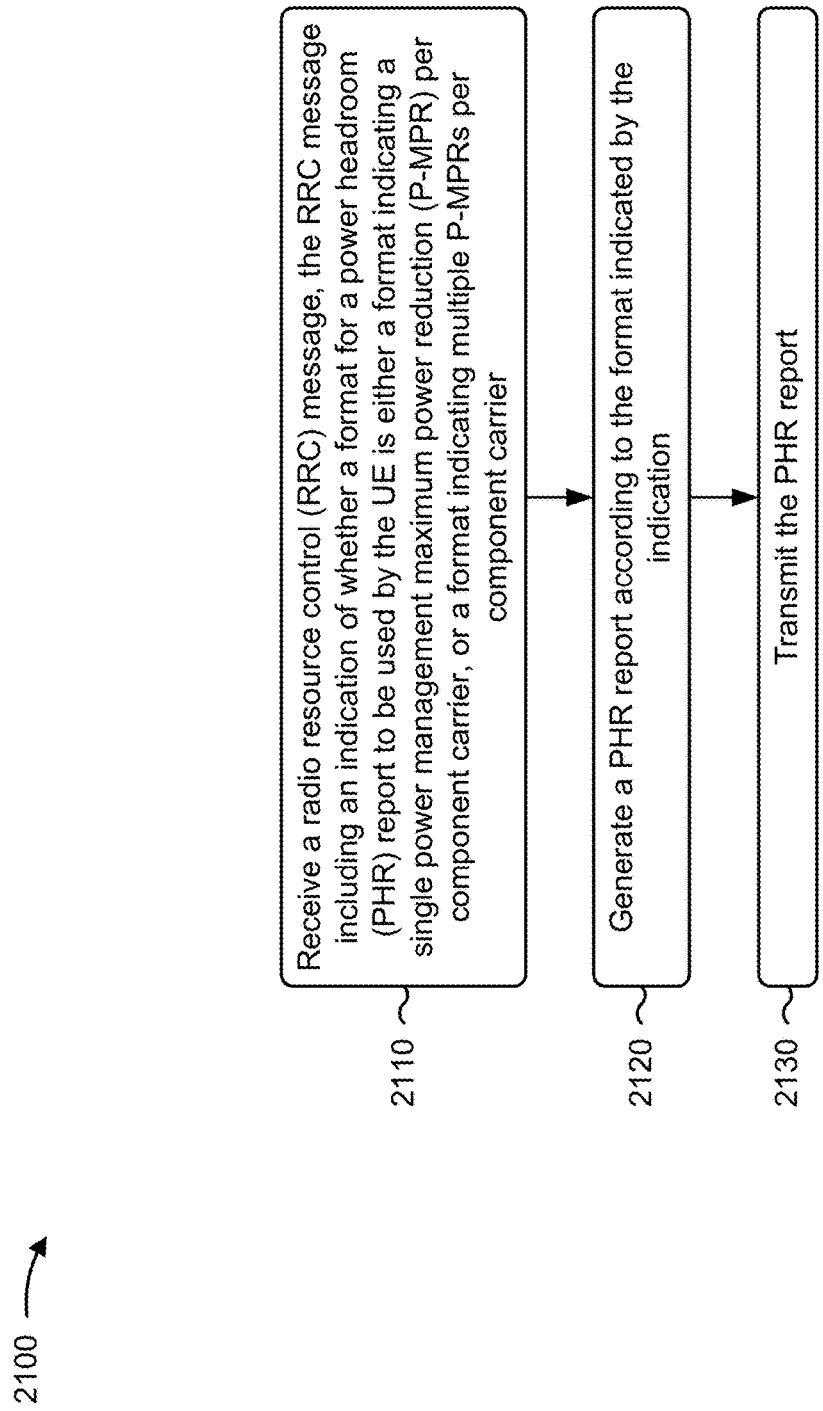

FIG. 21 is a diagram illustrating an example process 2100 performed, for example, by a UE, in accordance with the present disclosure. Example process 2100 is an example where the UE (e.g., UE 120) performs operations associated with techniques for enabling beam management radio resource control parameters.

As shown in FIG. 21, in some aspects, process 2100 may include receiving an RRC message, the RRC message including an indication of whether a format for a PHR report to be used by the UE is either: a format indicating a single P-MPR per component carrier, or a format indicating multiple P-MPRs per component carrier (block 2110). For example, the UE (e.g., using communication manager 140 and/or reception component 2502, depicted in FIG. 25) may receive an RRC message, the RRC message including an indication of whether a format for a PHR report to be used by the UE is either: a format indicating a single P-MPR per component carrier, or a format indicating multiple P-MPRs per component carrier, as described above.

As further shown in FIG. 21, in some aspects, process 2100 may include generating a PHR report according to the format indicated by the indication (block 2120). For example, the UE (e.g., using communication manager 140 and/or beam management component 2508, depicted in FIG. 25) may generate a PHR report according to the format indicated by the indication, as described above.

As further shown in FIG. 21, in some aspects, process 2100 may include transmitting the PHR report (block 2130). For example, the UE (e.g., using communication manager 140 and/or transmission component 2504, depicted in FIG. 25) may transmit the PHR report, as described above.

Process 2100 may include additional aspects, such as any single aspect or any combination of aspects described below and/or in connection with one or more other processes described elsewhere herein.

In a first aspect, one or more parameters associated with the format indicating multiple P-MPRs per component carrier are configured in an information element dedicated to configuring the format indicating multiple P-MPRs per component carrier.

In a second aspect, alone or in combination with the first aspect, the one or more parameters include at least one of a timer associated with prohibiting MPE reporting, a threshold associated with MPE reporting, a quantity of P-MPRs per component carrier, or a quantity of beam identifiers per reported P-MPR.

In a third aspect, alone or in combination with one or more of the first and second aspects, one or more parameters associated with the format indicating multiple P-MPRs per component carrier are identified based at least in part on a configuration for the format indicating the single P-MPR per component carrier.

In a fourth aspect, alone or in combination with one or more of the first through third aspects, the one or more parameters include at least one of a timer associated with prohibiting MPE reporting or a threshold associated with MPE reporting.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
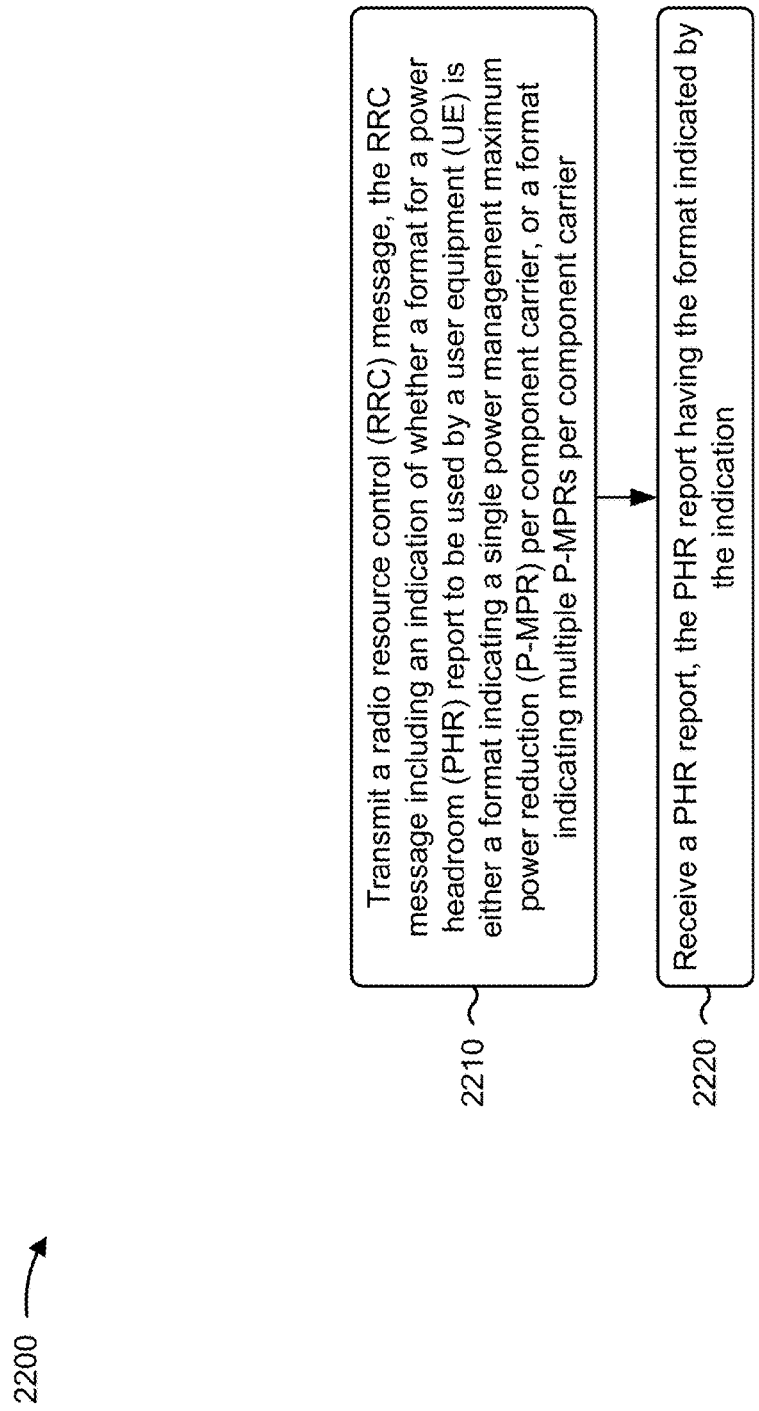

FIG. 22 is a diagram illustrating an example process 2200 performed, for example, by a base station, in accordance with the present disclosure. Example process 2200 is an example where the base station (e.g., base station 110) performs operations associated with techniques for enabling beam management radio resource control parameters.

As shown in FIG. 22, in some aspects, process 2200 may include transmitting an RRC message, the RRC message including an indication of whether a format for a PHR report to be used by a UE is either: a format indicating a single P-MPR per component carrier, or a format indicating multiple P-MPRs per component carrier (block 2210). For example, the base station (e.g., using communication manager 150 and/or transmission component 2604, depicted in FIG. 26) may transmit an RRC message, the RRC message including an indication of whether a format for a PHR report to be used by a UE is either: a format indicating a single P-MPR per component carrier, or a format indicating multiple P-MPRs per component carrier, as described above.

As further shown in FIG. 22, in some aspects, process 2200 may include receiving a PHR report, the PHR report having the format indicated by the indication (block 2220). For example, the base station (e.g., using communication manager 150 and/or reception component 2602, depicted in FIG. 26) may receive a PHR report, the PHR report having the format indicated by the indication, as described above.

Process 2200 may include additional aspects, such as any single aspect or any combination of aspects described below and/or in connection with one or more other processes described elsewhere herein.

In a first aspect, one or more parameters associated with the format indicating multiple P-MPRs per component carrier are configured in an information element dedicated to configuring the format indicating multiple P-MPRs per component carrier.

In a second aspect, alone or in combination with the first aspect, the one or more parameters include at least one of a timer associated with prohibiting MPE reporting, a threshold associated with MPE reporting, a quantity of P-MPRs per component carrier, or a quantity of beam identifiers per reported P-MPR.

In a third aspect, alone or in combination with one or more of the first and second aspects, one or more parameters associated with the format indicating multiple P-MPRs per component carrier are identified based at least in part on a configuration for the format indicating the single P-MPR per component carrier.

In a fourth aspect, alone or in combination with one or more of the first through third aspects, the one or more parameters include at least one of a timer associated with prohibiting MPE reporting or a threshold associated with MPE reporting.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

Figure 23:
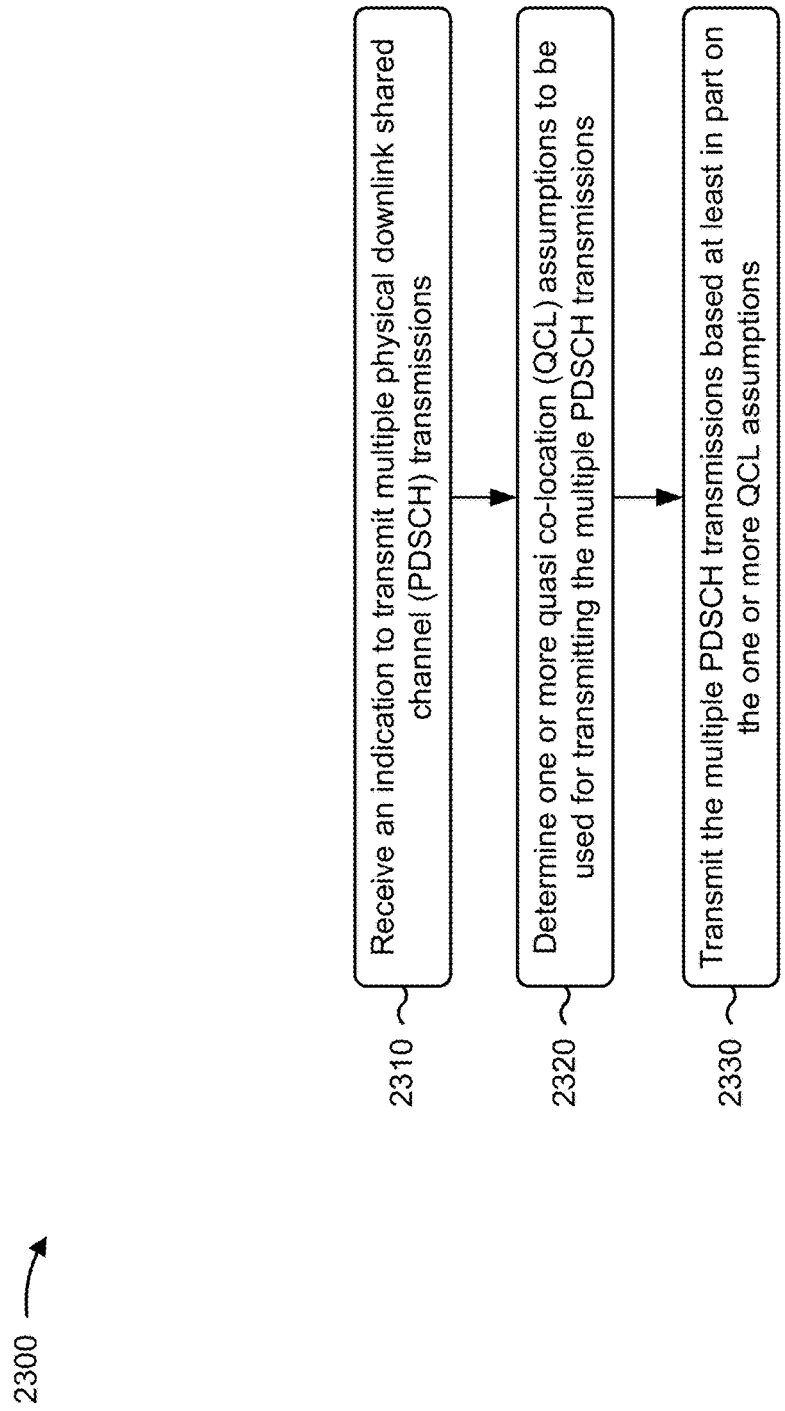

FIG. 23 is a diagram illustrating an example process 2300 performed, for example, by a UE, in accordance with the present disclosure. Example process 2300 is an example where the UE (e.g., UE 120) performs operations associated with techniques for enabling beam management radio resource control parameters.

As shown in FIG. 23, in some aspects, process 2300 may include receiving an indication to transmit multiple PDSCH transmissions (block 2310). For example, the UE (e.g., using communication manager 140 and/or reception component 2502, depicted in FIG. 25) may an indication to transmit multiple PDSCH transmissions, as described above.

As further shown in FIG. 23, in some aspects, process 2300 may include determining one or more QCL assumptions to be used for transmitting the multiple PDSCH transmissions (block 2320). For example, the UE (e.g., using communication manager 140 and/or beam management component 2508, depicted in FIG. 25) may determine one or more QCL assumptions to be used for transmitting the multiple PDSCH transmissions, as described above.

As further shown in FIG. 23, in some aspects, process 2300 may include transmitting the multiple PDSCH transmissions based at least in part on the one or more QCL assumptions (block 2330). For example, the UE (e.g., using communication manager 140 and/or transmission component 2504, depicted in FIG. 25) may transmit the multiple PDSCH transmissions based at least in part on the one or more QCL assumptions, as described above.

Process 2300 may include additional aspects, such as any single aspect or any combination of aspects described below and/or in connection with one or more other processes described elsewhere herein.

In a first aspect, the one or more QCL assumptions are determined based at least in part on a QCL rule indicating that a single QCL assumption is to be used for transmitting the multiple PDSCH transmissions.

In a second aspect, alone or in combination with the first aspect, the single QCL assumption is determined based on a QCL assumption for one of a CORESET with a lowest identifier, an activated PDSCH TCI state with a lowest identifier, or a TCI state indicated by a MAC control element.

In a third aspect, alone or in combination with one or more of the first and second aspects, the one or more QCL assumptions are determined based at least in part on a QCL rule indicating that multiple QCL assumptions are to be used for transmitting the multiple PDSCH transmissions.

In a fourth aspect, alone or in combination with one or more of the first through third aspects, a given QCL assumption of the multiple QCL assumptions is to be determined based on a default PDSCH beam rule.

In a fifth aspect, alone or in combination with one or more of the first through fourth aspects, the one or more QCL assumptions are determined based at least in part on a QCL rule indicated by a base station.

In a sixth aspect, alone or in combination with one or more of the first through fifth aspects, the QCL rule is indicated by the base station via an RRC message.

In a seventh aspect, alone or in combination with one or more of the first through sixth aspects, the indication includes DCI scheduling the multiple PDSCH transmissions.

In an eighth aspect, alone or in combination with one or more of the first through seventh aspects, the multiple PDSCH transmissions include a plurality of repetitions of a particular PDSCH transmission.

In a ninth aspect, alone or in combination with one or more of the first through eighth aspects, the plurality of repetitions is a plurality of slot-based repetitions.

In a tenth aspect, alone or in combination with one or more of the first through eighth aspects, the plurality of repetitions is a plurality of mini-slot-based repetitions.

Although FIG. 23 shows example blocks of process 2300, in some aspects, process 2300 may include additional blocks, fewer blocks, different blocks, or differently arranged blocks than those depicted in FIG. 23. Additionally, or alternatively, two or more of the blocks of process 2300 may be performed in parallel.

Figure 24:
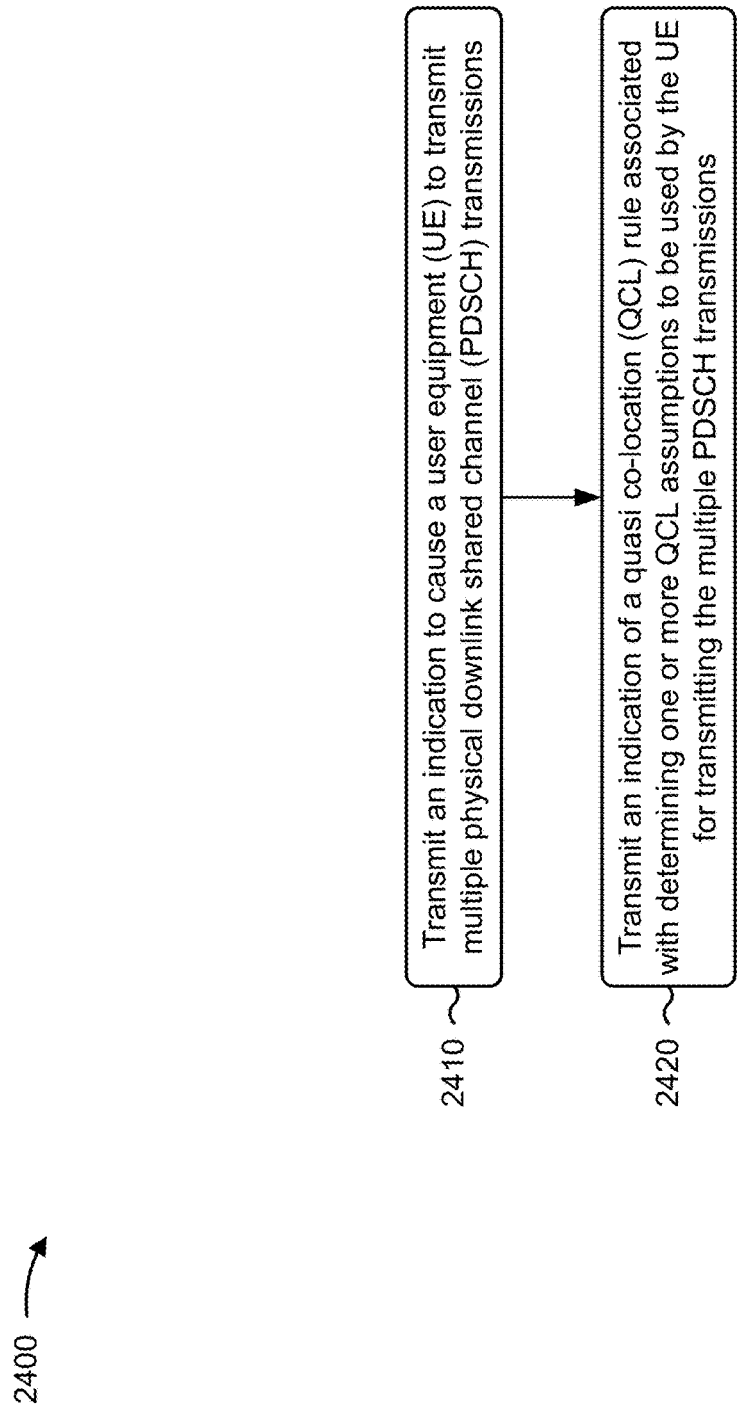

FIG. 24 is a diagram illustrating an example process 2400 performed, for example, by a base station, in accordance with the present disclosure. Example process 2400 is an example where the base station (e.g., base station 110) performs operations associated with techniques for enabling beam management radio resource control parameters.

As shown in FIG. 24, in some aspects, process 2400 may include transmitting an indication to cause a UE to transmit multiple PDSCH transmissions (block 2410). For example, the base station (e.g., using communication manager 150 and/or transmission component 2604, depicted in FIG. 26) may transmit an indication to cause a UE to transmit multiple PDSCH transmissions, as described above.

As further shown in FIG. 24, in some aspects, process 2400 may include transmitting an indication of a QCL rule associated with determining one or more QCL assumptions to be used by the UE for transmitting the multiple PDSCH transmissions (block 2420). For example, the base station (e.g., using communication manager 150 and/or transmission component 2604, depicted in FIG. 26) may transmit an indication of a QCL rule associated with determining one or more QCL assumptions to be used by the UE for transmitting the multiple PDSCH transmissions, as described above.

Process 2400 may include additional aspects, such as any single aspect or any combination of aspects described below and/or in connection with one or more other processes described elsewhere herein.

In a first aspect, the QCL rule indicates that a single QCL assumption is to be used by the UE for transmitting the multiple PDSCH transmissions.

In a second aspect, alone or in combination with the first aspect, the QCL rule indicates that multiple QCL assumptions are to be used by the UE for transmitting the multiple PDSCH transmissions.

In a third aspect, alone or in combination with one or more of the first and second aspects, the indication of the QCL rule is transmitted via an RRC message.

In a fourth aspect, alone or in combination with one or more of the first through third aspects, the indication includes DCI scheduling the multiple PDSCH transmissions.

In a fifth aspect, alone or in combination with one or more of the first through fourth aspects, the multiple PDSCH transmissions include a plurality of repetitions of a particular PDSCH transmission.

In a sixth aspect, alone or in combination with one or more of the first through fifth aspects, the plurality of repetitions is a plurality of slot-based repetitions.

In a seventh aspect, alone or in combination with one or more of the first through fifth aspects, the plurality of repetitions is a plurality of mini-slot-based repetitions.

Although FIG. 24 shows example blocks of process 2400, in some aspects, process 2400 may include additional blocks, fewer blocks, different blocks, or differently arranged blocks than those depicted in FIG. 24. Additionally, or alternatively, two or more of the blocks of process 2400 may be performed in parallel.

Figure 25:
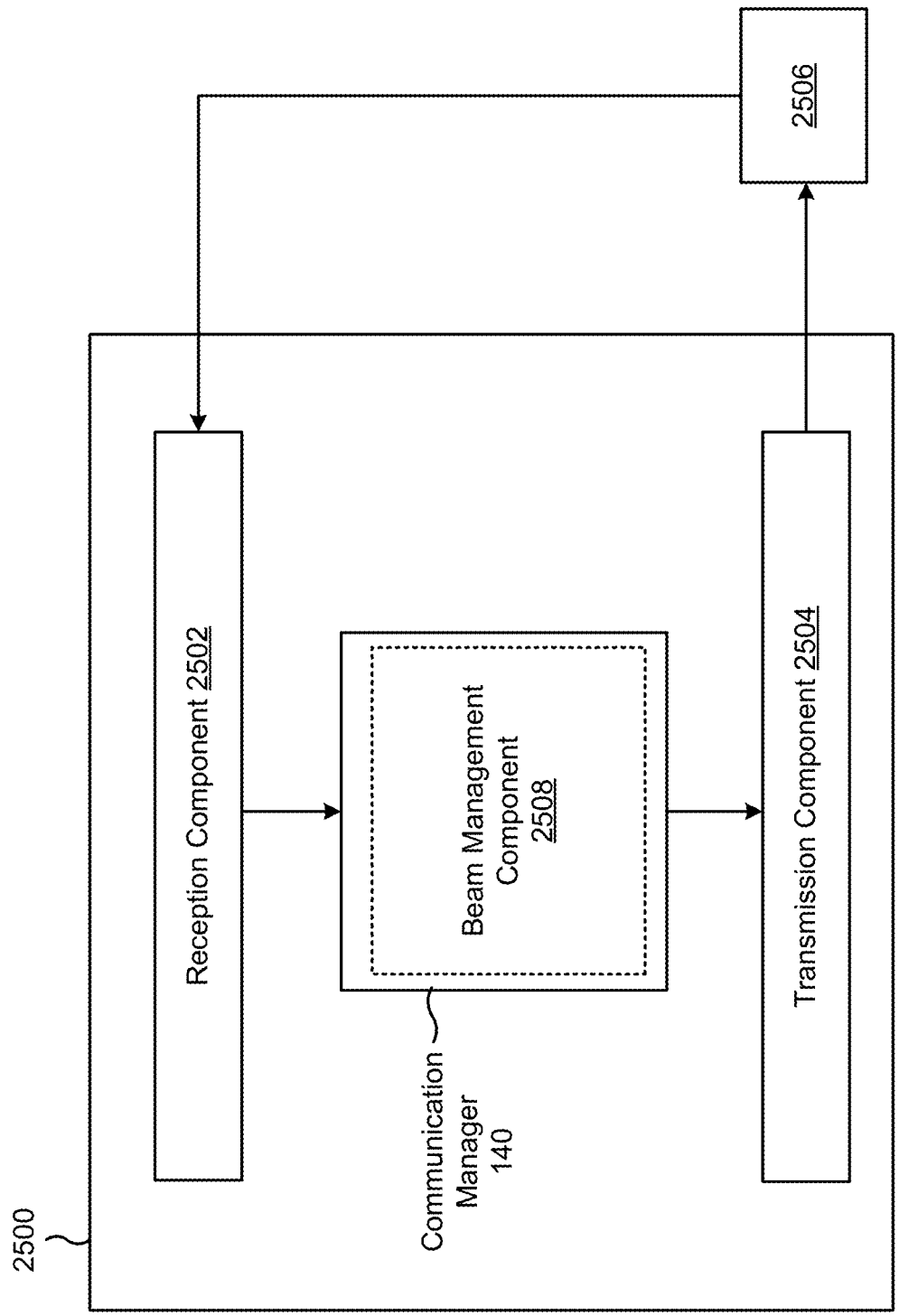
FIGS. 25 and 26 are diagrams of example apparatuses for wireless communication, in accordance with the present disclosure.

FIG. 25 is a diagram of an example apparatus 2500 for wireless communication. The apparatus 2500 may be a UE, or a UE may include the apparatus 2500. In some aspects, the apparatus 2500 includes a reception component 2502 and a transmission component 2504, which may be in communication with one another (for example, via one or more buses and/or one or more other components). As shown, the apparatus 2500 may communicate with another apparatus 2506 (such as a UE, a base station, or another wireless communication device) using the reception component 2502 and the transmission component 2504. As further shown, the apparatus 2500 may include the communication manager 140. The communication manager 140 may include a beam management component 2508, among other examples.

In some aspects, the apparatus 2500 may be configured to perform one or more operations described herein in connection with FIG. 5-11 or 27. Additionally, or alternatively, the apparatus 2500 may be configured to perform one or more processes described herein. In some aspects, the apparatus 2500 and/or one or more components shown in FIG. 25 may include one or more components of the UE described in connection with FIG. 2. Additionally, or alternatively, one or more components shown in FIG. 25 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2502 may receive communications, such as reference signals, control information, data communications, or a combination thereof, from the apparatus 2506. The reception component 2502 may provide received communications to one or more other components of the apparatus 2500. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2500. In some aspects, the reception component 2502 may include one or more antennas, a modem, a demodulator, a MIMO detector, a receive processor, a controller/processor, a memory, or a combination thereof, of the UE described in connection with FIG. 2.

The transmission component 2504 may transmit communications, such as reference signals, control information, data communications, or a combination thereof, to the apparatus 2506. In some aspects, one or more other components of the apparatus 2500 may generate communications and may provide the generated communications to the transmission component 2504 for transmission to the apparatus 2506. In some aspects, the transmission component 2504 may perform signal processing on the generated communications (such as filtering, amplification, modulation, digital-to-analog conversion, multiplexing, interleaving, mapping, or encoding, among other examples), and may transmit the processed signals to the apparatus 2506. In some aspects, the transmission component 2504 may include one or more antennas, a modem, a modulator, a transmit MIMO processor, a transmit processor, a controller/processor, a memory, or a combination thereof, of the UE described in connection with FIG. 2. In some aspects, the transmission component 2504 may be co-located with the reception component 2502 in a transceiver.

The reception component 2502 may receive an RRC message, the RRC message including an indication of whether group-based beam reporting is enabled for the UE. The transmission component 2504 may transmit a group-based beam report based at least in part on the indication that the group-based beam reporting is enabled for the UE. The reception component 2502 may receive a configuration indicating a quantity of beam groups to be reported by the UE in the group-based beam report. The transmission component 2504 may transmit UE capability information indicating a maximum quantity of beam groups that can be reported by the UE in the group-based beam report.

The reception component 2502 may receive a CMR set configuration associated with group-based beam reporting wherein the CMR set configuration configures at least two CMR sets. The beam management component 2508 may generate a group-based beam report based at least in part on the CMR set configuration. The transmission component 2504 may transmit the group-based beam report.

The beam management component 2508 may measure a signal strength of a BFD RS, the BFD RS being included in a BFD RS set that corresponds to a TRP of a plurality of TRPs. The beam management component 2508 may identify a BFD threshold associated with the TRP. The beam management component 2508 may detect a beam failure instance associated with the TRP based at least in part on a determination that the signal strength of the BFD RS satisfies the BFD threshold. The beam management component 2508 may provide an indication of the beam failure instance associated with the TRP.

The beam management component 2508 may measure a signal strength of a candidate beam RS, the candidate beam RS being included in a set of candidate beam RSs that corresponds to a TRP of a plurality of TRPs. The beam management component 2508 may identify a candidate beam threshold associated with the TRP. The beam management component 2508 may select a candidate beam corresponding to the candidate beam RS for beam failure recovery based at least in part on a determination that the signal strength of the candidate beam RS satisfies the candidate beam threshold. The transmission component 2504 may transmit a BFR report including an indication of the candidate beam. The reception component 2502 may receive a configuration associated with a plurality of sets of candidate beam RSs, wherein each set of candidate beam RSs of the plurality of sets of candidate beam RSs corresponds to a different TRP of the plurality of TRPs.

The beam management component 2508 may identify a set of power control parameters for a TCI state associated with an uplink transmission. The transmission component 2504 may transmit the uplink transmission based at least in part on the set of power control parameters associated with the TCI state.

The reception component 2502 may receive an RRC message, the RRC message including an indication of whether a format for a PHR report to be used by the UE is either a format indicating a single P-MPR per component carrier, or a format indicating multiple P-MPRs per component carrier. The beam management component 2508 may generate a PHR report according to the format indicated by the indication. The transmission component 2504 may transmit the PHR report.

The reception component 2502 may receive an indication to transmit multiple PDSCH transmissions. The beam management component 2508 may determine one or more QCL assumptions to be used for transmitting the multiple PDSCH transmissions. The transmission component 2504 may transmit the multiple PDSCH transmissions based at least in part on the one or more QCL assumptions.

The reception component 2502 may receive at least one RRC message, the at least one RRC message including an indication of whether beam-report-based implicit beam updating is enabled for the UE. The beam management component 2508 may perform an implicit beam update based at least in part on the indication indicating that the beam-report-based implicit beam updating is enabled for the UE.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of (one or more) components shown in FIG. 25 may perform one or more functions described as being performed by another set of components shown in FIG. 25.

Figure 26:
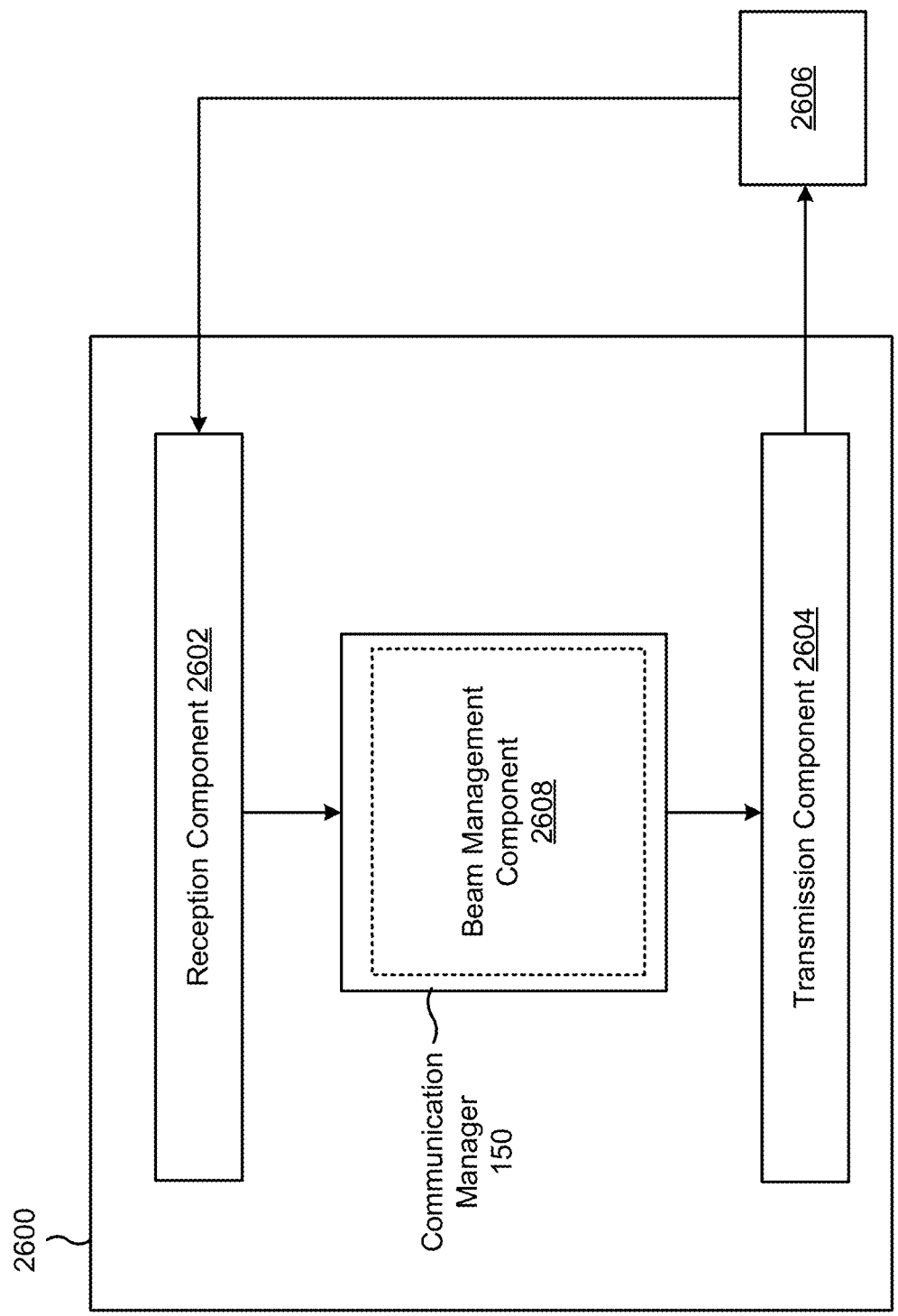

FIG. 26 is a diagram of an example apparatus 2600 for wireless communication. The apparatus 2600 may be a base station, or a base station may include the apparatus 2600. In some aspects, the apparatus 2600 includes a reception component 2602 and a transmission component 2604, which may be in communication with one another (for example, via one or more buses and/or one or more other components). As shown, the apparatus 2600 may communicate with another apparatus 2606 (such as a UE, a base station, or another wireless communication device) using the reception component 2602 and the transmission component 2604. As further shown, the apparatus 2600 may include the communication manager 150. The communication manager 150 may include a beam management component 2608, among other examples.

In some aspects, the apparatus 2600 may be configured to perform one or more operations described herein in connection with FIG. 5-11 or 27. Additionally, or alternatively, the apparatus 2600 may be configured to perform one or more processes described herein. In some aspects, the apparatus 2600 and/or one or more components shown in FIG. 26 may include one or more components of the base station described in connection with FIG. 2. Additionally, or alternatively, one or more components shown in FIG. 26 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2602 may receive communications, such as reference signals, control information, data communications, or a combination thereof, from the apparatus 2606. The reception component 2602 may provide received communications to one or more other components of the apparatus 2600. In some aspects, the reception component 2602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2600. In some aspects, the reception component 2602 may include one or more antennas, a modem, a demodulator, a MIMO detector, a receive processor, a controller/processor, a memory, or a combination thereof, of the base station described in connection with FIG. 2.

The transmission component 2604 may transmit communications, such as reference signals, control information, data communications, or a combination thereof, to the apparatus 2606. In some aspects, one or more other components of the apparatus 2600 may generate communications and may provide the generated communications to the transmission component 2604 for transmission to the apparatus 2606. In some aspects, the transmission component 2604 may perform signal processing on the generated communications (such as filtering, amplification, modulation, digital-to-analog conversion, multiplexing, interleaving, mapping, or encoding, among other examples), and may transmit the processed signals to the apparatus 2606. In some aspects, the transmission component 2604 may include one or more antennas, a modem, a modulator, a transmit MIMO processor, a transmit processor, a controller/processor, a memory, or a combination thereof, of the base station described in connection with FIG. 2. In some aspects, the transmission component 2604 may be co-located with the reception component 2602 in a transceiver.

The transmission component 2604 may transmit an RRC message, the RRC message including an indication of whether group-based beam reporting is enabled for a UE. The reception component 2602 may receive a group-based beam report based at least in part on transmitting the indication to indicate that the group-based beam reporting is enabled for the UE. The transmission component 2604 may transmit a configuration indicating a quantity of beam groups to be reported by the UE in the group-based beam report. The reception component 2602 may receive UE capability information indicating a maximum quantity of beam groups that can be reported by the UE in the group-based beam report.

The transmission component 2604 may transmit a CMR set configuration associated with group-based beam reporting wherein the CMR set configuration configures at least two CMR sets. The reception component 2602 may receive a group-based beam report, the group-based beam report having been generated based at least in part on the CMR set configuration.

The beam management component 2608 may identify a BFD threshold for a TRP of a plurality of TRPs of a UE. The transmission component 2604 may transmit, to the UE, a configuration indicating the BFD threshold.

The beam management component 2608 may identify a candidate beam threshold for a TRP of a plurality of TRPs of a UE. The transmission component 2604 may transmit, to the UE, a configuration indicating the candidate beam threshold. The transmission component 2604 may transmit a configuration associated with a plurality of sets of candidate beam RSs, wherein each set of candidate beam RSs of the plurality of sets of candidate beam RSs corresponds to a different TRP of the plurality of TRPs.

The transmission component 2604 may transmit an RRC message, the RRC message including an indication of whether a format for a PHR report to be used by a UE is either a format indicating a single P-MPR per component carrier, or a format indicating multiple P-MPRs per component carrier. The reception component 2602 may receive a PHR report, the PHR report having the format indicated by the indication.

The transmission component 2604 may transmit an indication to cause a UE to transmit multiple PDSCH transmissions. The transmission component 2604 may transmit an indication of a QCL rule associated with determining one or more QCL assumptions to be used by the UE for transmitting the multiple PDSCH transmissions.

The transmission component 2604 may transmit at least one RRC message, the at least one RRC message including an indication of whether beam-report-based implicit beam updating is enabled for a UE 120. The beam management component 2608 may perform an implicit beam update based at least in part on transmitting the indication to indicate that the beam-report-based implicit beam updating is enabled for the UE.

The number and arrangement of components shown in FIG. 26 are provided as an example. In practice, there may be additional components, fewer components, different components, or differently arranged components than those shown in FIG. 26. Furthermore, two or more components shown in FIG. 26 may be implemented within a single component, or a single component shown in FIG. 26 may be implemented as multiple, distributed components. Additionally, or alternatively, a set of (one or more) components shown in FIG. 26 may perform one or more functions described as being performed by another set of components shown in FIG. 26.

Figure 27:
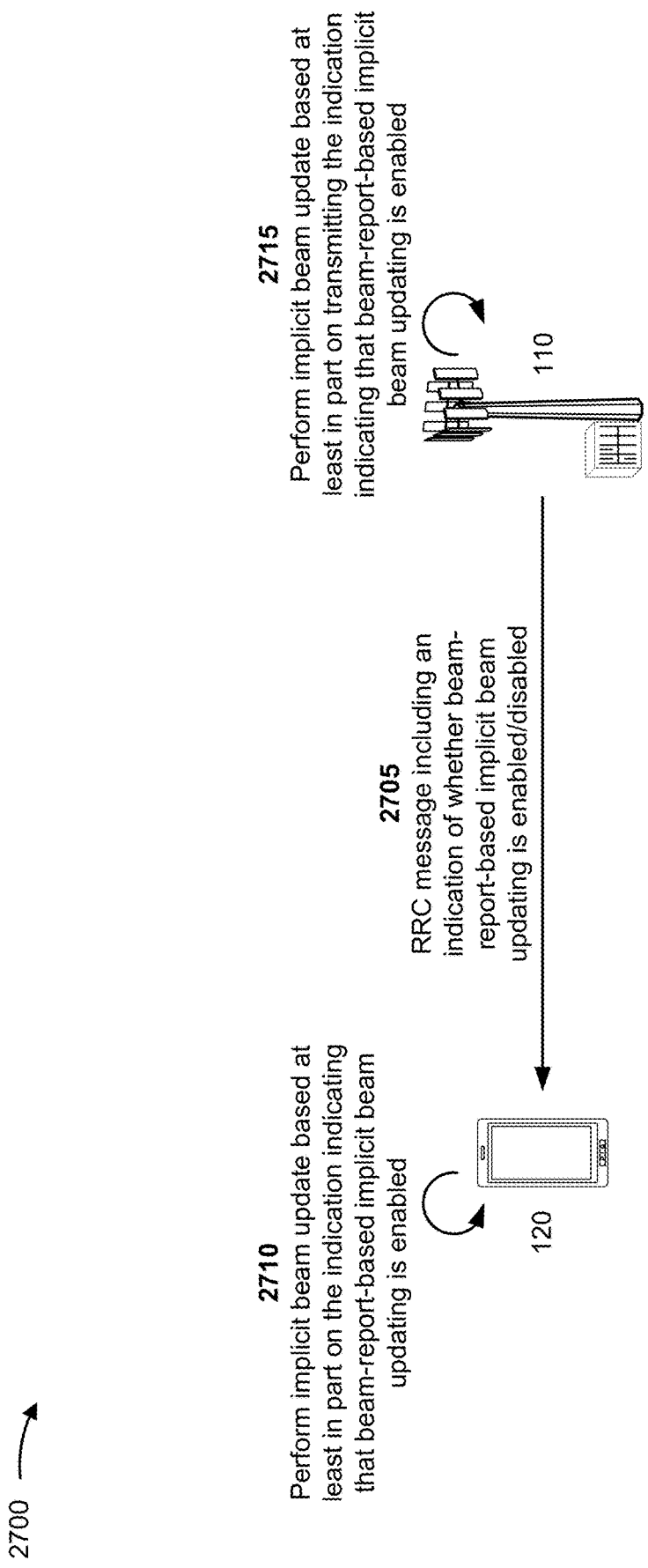
FIG. 27 is a diagram illustrating another example associated with enabling beam management RRC parameters, in accordance with the present disclosure.

FIG. 27 is a diagram illustrating an example 2700 associated with an RRC message for enabling or disabling beam-report-based implicit beam updating.

As shown by reference 2705, the base station 110 may transmit, and the UE 120 may receive, at least one RRC message including an indication of whether beam-report-based implicit beam updating is enabled for the UE 120. For example, the at least one RRC message may include an RRC message that may indicate that beam-report-based implicit beam updating is enabled for the UE 120, or may indicate that beam-report-based implicit beam updating is disabled (i.e., not enabled) for the UE 120.

In some aspects, beam-report-based implicit beam updating is a configuration that, when enabled on the UE 120, permits the UE 120 to autonomously (i.e., without intervention from the base station 110) perform a beam update (e.g., a beam switch, a TCI state change, or the like) based at least in part on a beam report. For example, when beam-report-based implicit beam updating is enabled, the UE 120 may be triggered to generate a beam report and, based at least in part on the beam report, the UE 120 may perform a beam update without any indication to perform the beam update being received from the base station 110. As a particular example, the UE 120 may autonomously perform a beam update when a beam currently used by the UE 120 is worse (e.g., has a lower signal strength) than a beam reported in the beam report. In some aspects, by reducing or eliminating signaling associated with triggering a beam update, beam-report-based implicit beam updating reduces overhead or latency associated with performing a beam update.

In some aspects, the at least one RRC message includes an RRC message that indicates that beam-report-based implicit beam updating for network scheduled beam reports is enabled for the UE 120. That is, in some aspects, the at least one RRC message may include an RRC message indicating that the UE 120 is permitted to perform beam-report-based implicit beam updating based at least in part on beam reports that are scheduled by the network (e.g., by the base station 110).

In some aspects, the at least one RRC message includes an RRC message that indicates that beam-report-based implicit beam updating for UE initiated or UE event driven beam reports is enabled for the UE 120. That is, in some aspects, the at least one RRC message may include an RRC message indicating that the UE 120 is permitted to perform beam-report-based implicit beam updating based at least in part on beam reports that are initiated by the UE 120 in response to a condition or event (e.g., rather than being scheduled by the base station 110).

In some aspects, the at least one RRC message includes an RRC message indicating whether multiple types of beam-report-based implicit beam updating are enabled for the UE 120. For example, a single RRC message may be used to enable/disable both beam-report-based implicit beam updating for network scheduled beam reports and beam-report-based implicit beam updating for UE initiated or UE event driven beam reports.

In some aspects, the at least one RRC message includes a first RRC message indicating whether a first type of beam-report-based implicit beam updating is enabled for the UE and a second RRC message indicating whether a second type of beam-report-based implicit beam updating is enabled for the UE 120. For example, a first RRC message may be used to enable/disable beam-report-based implicit beam updating for network scheduled beam reports, while a second RRC message may be used to enable/disable beam-report-based implicit beam updating for UE initiated or UE event driven beam reports.

As shown by reference 2710, the UE 120 may in some aspects perform an implicit beam update. For example, the UE 120 may perform an implicit beam update based at least in part on the indication in the RRC message indicating that the beam-report-based implicit beam updating is enabled for the UE 120 and based at least in part on generating or transmitting a beam report. Alternatively, the UE 120 may refrain from performing an implicit beam update based at least in part on the indication in the RRC message indicating that the beam-report-based implicit beam updating is disabled for the UE 120.

In some aspects, the UE 120 may perform the implicit beam update based at least in part on a network scheduled beam report being transmitted by the UE 120. For example, the at least one RRC message may indicate that beam-report-based implicit beam updating for network scheduled beam reports is enabled for the UE 120. Here, the UE 120 may receive, from the base station 110, signaling scheduling a beam report for the UE 120 (e.g., such that the UE 120 generates and transmits a beam report). The UE 120 may then perform the implicit beam update based at least in part on the network scheduled beam report. For example, when performing the implicit beam update, the UE 120 may select or activate (for a set of applicable channels or reference signals) a joint downlink/uplink, a downlink-only, or an uplink-only TCI state whose QCL-TypeD reference signal or spatial relation reference signal is a reported downlink reference signal in the network scheduled beam report with a layer 1 (L1) metric (e.g., L1-RSRP, L1-SINR, or the like). Notably, the beam update is performed by the UE 120 without a network selection/activation command to perform a beam update being received from the base station 110.

In some aspects, the UE 120 may perform the implicit beam update based at least in part on a UE initiated or UE event driven beam report being transmitted by the UE 120. For example, the at least one RRC message may indicate that beam-report-based implicit beam updating for UE initiated or UE event driven beam reports is enabled for the UE 120. Here, the UE 120 may initiate a beam report or detect an event that triggers a beam report, and may transmit a beam report to the base station 110 (e.g., in pre-configured PUCCH resources, in resources of a configured grant, or in a MAC control element carried in an uplink grant issued based at least in part on a scheduling request transmitted by the UE 120). The UE 120 may then perform the implicit beam update based at least in part on the UE initiated or UE event driven beam report. For example, when performing the implicit beam update, the UE 120 may select or activate (for a set of applicable channels or reference signals) a joint downlink/uplink, a downlink-only, or an uplink-only TCI state whose QCL-TypeD reference signal or spatial relation reference signal is a reported downlink reference signal in the network scheduled beam report with an L1 metric (e.g., L1-RSRP, L1-SINR, or the like). Notably, the beam update is performed by the UE 120 without a network selection/activation command to perform a beam update being received from the base station 110.

As shown by reference 2715, the base station 110 may in some aspects perform an implicit beam update. For example, the base station 110 may perform an implicit beam update based at least in part on transmitting the indication in the RRC message indicating that the beam-report-based implicit beam updating is enabled for the UE 120 and based at least in part on receiving a beam report from the UE 120. Alternatively, the base station 110 may refrain from performing an implicit beam update based at least in part on the indication in the RRC message indicating that the beam-report-based implicit beam updating is enabled for the UE 120.

In some aspects, the base station 110 may perform the implicit beam update based at least in part on a network scheduled beam report being received from the UE 120. In some aspects, the base station 110 may perform the implicit beam update based at least in part on a UE initiated or UE event driven beam report being received by the base station 110. In some aspects, the base station 110 may perform the implicit beam update in a manner similar to that described above in association with reference 2710.

As indicated above, FIG. 27 is provided as an example. Other examples may differ from what is described with respect to FIG. 27.

Figure 28:
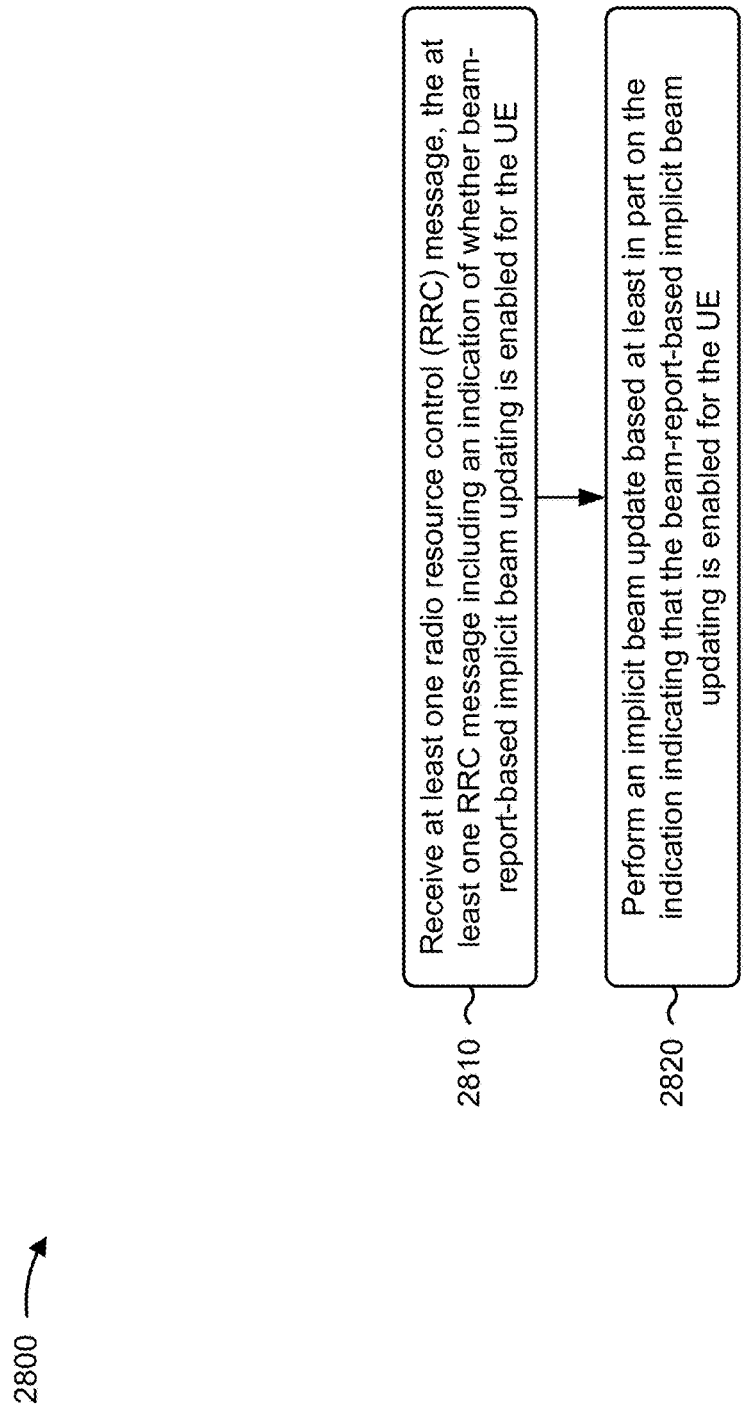
FIGS. 28 and 29 are diagrams illustrating further example processes associated with enabling beam management RRC parameters, in accordance with the present disclosure.

FIG. 28 is a diagram illustrating an example process 2800 performed, for example, by a UE, in accordance with the present disclosure. Example process 2800 is an example where the UE (e.g., UE 120) performs operations associated with techniques for enabling beam management radio resource control parameters.

As shown in FIG. 28, in some aspects, process 2800 may include receiving at least one RRC message, the at least one RRC message including an indication of whether beam-report-based implicit beam updating is enabled for the UE (block 2810). For example, the UE (e.g., using communication manager 140 and/or reception component 2502, depicted in FIG. 25) may receive at least one RRC message, the at least one RRC message including an indication of whether beam-report-based implicit beam updating is enabled for the UE, as described above.

As further shown in FIG. 28, in some aspects, process 2800 may include performing an implicit beam update based at least in part on the indication indicating that the beam-report-based implicit beam updating is enabled for the UE (block 2820). For example, the UE (e.g., using communication manager 140 and/or performing beam management component 2508, depicted in FIG. 25) may perform an implicit beam update based at least in part on the indication indicating that the beam-report-based implicit beam updating is enabled for the UE, as described above.

Process 2800 may include additional aspects, such as any single aspect or any combination of aspects described below and/or in connection with one or more other processes described elsewhere herein.

In a first aspect, the at least one RRC message includes an RRC message that indicates that beam-report-based implicit beam updating for network scheduled beam reports is enabled for the UE.

In a second aspect, alone or in combination with the first aspect, the implicit beam update is performed based at least in part on a network scheduled beam report being transmitted by the UE.

In a third aspect, alone or in combination with one or more of the first and second aspects, the at least one RRC message includes an RRC message that indicates that beam-report-based implicit beam updating for UE initiated or UE event driven beam reports is enabled for the UE.

In a fourth aspect, alone or in combination with one or more of the first through third aspects, the implicit beam update is performed based at least in part on a UE initiated or UE event driven beam report being transmitted by the UE.

In a fifth aspect, alone or in combination with one or more of the first through fourth aspects, the at least one RRC message includes an RRC message indicating whether multiple types of beam-report-based implicit beam updating are enabled for the UE.

In a sixth aspect, alone or in combination with one or more of the first through fifth aspects, the at least one RRC message includes a first RRC message indicating whether a first type of beam-report-based implicit beam updating is enabled for the UE and a second RRC message indicating whether a second type of beam-report-based implicit beam updating is enabled for the UE.

Although FIG. 28 shows example blocks of process 2800, in some aspects, process 2800 may include additional blocks, fewer blocks, different blocks, or differently arranged blocks than those depicted in FIG. 28. Additionally, or alternatively, two or more of the blocks of process 2800 may be performed in parallel.

Figure 29:
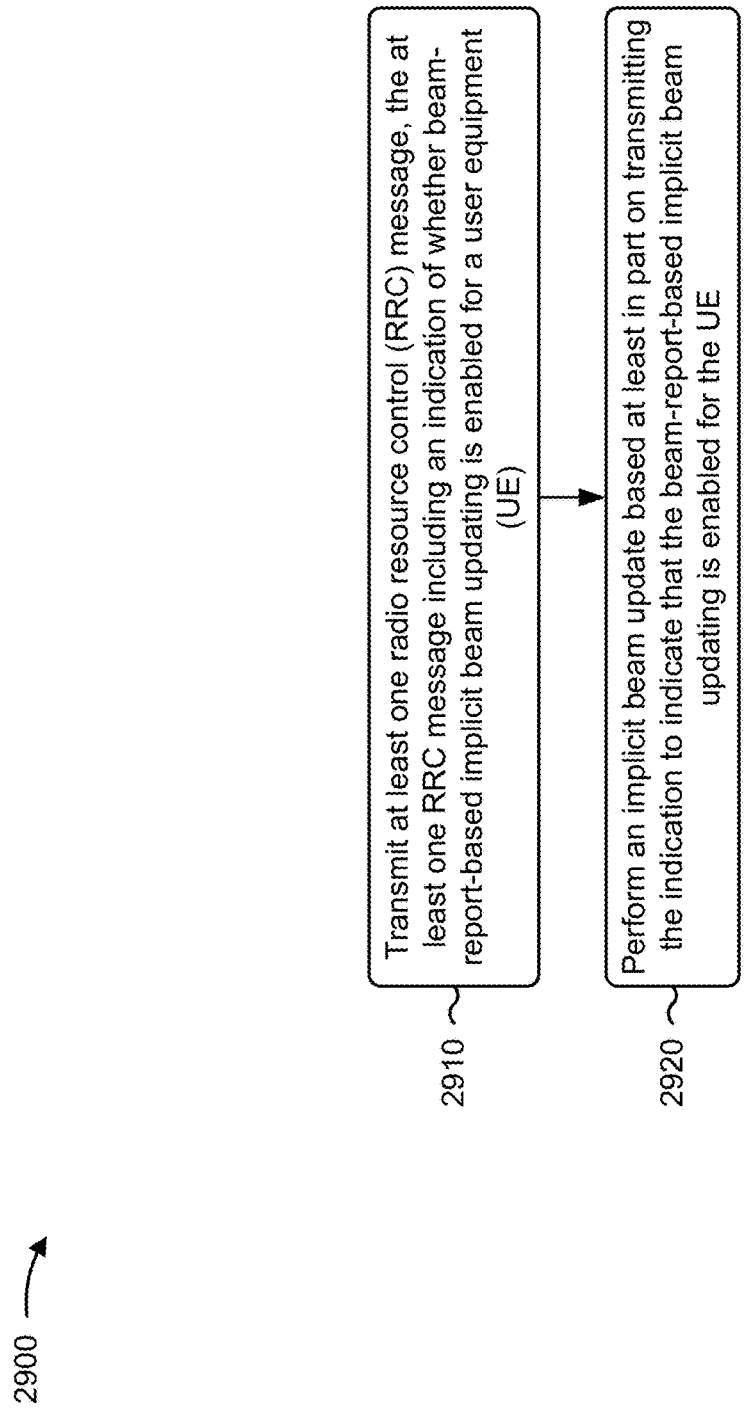

FIG. 29 is a diagram illustrating an example process 2900 performed, for example, by a base station, in accordance with the present disclosure. Example process 2900 is an example where the base station (e.g., base station 110) performs operations associated with techniques for enabling beam management radio resource control parameters.

As shown in FIG. 29, in some aspects, process 2900 may include transmitting at least one RRC message, the at least one RRC message including an indication of whether beam-report-based implicit beam updating is enabled for a UE (block 2910). For example, the base station (e.g., using communication manager 150 and/or transmission component 2604, depicted in FIG. 26) may transmit at least one RRC message, the at least one RRC message including an indication of whether beam-report-based implicit beam updating is enabled for a UE, as described above.

As further shown in FIG. 29, in some aspects, process 2900 may include performing an implicit beam update based at least in part on transmitting the indication to indicate that the beam-report-based implicit beam updating is enabled for the UE (block 2920). For example, the base station (e.g., using communication manager 150 and/or beam management component 2608, depicted in FIG. 26) may perform an implicit beam update based at least in part on transmitting the indication to indicate that the beam-report-based implicit beam updating is enabled for the UE, as described above.

Process 2900 may include additional aspects, such as any single aspect or any combination of aspects described below and/or in connection with one or more other processes described elsewhere herein.

In a first aspect, the at least one RRC message includes an RRC message that indicates that beam-report-based implicit beam updating for network scheduled beam reports is enabled for the UE.

In a second aspect, alone or in combination with the first aspect, the implicit beam update is performed based at least in part on a network scheduled beam report being received from the UE.

In a third aspect, alone or in combination with one or more of the first and second aspects, the at least one RRC message includes an RRC message that indicates that beam-report-based implicit beam updating for UE initiated or UE event driven beam reports is enabled for the UE.

In a fourth aspect, alone or in combination with one or more of the first through third aspects, the implicit beam update is performed based at least in part on a UE initiated or UE event driven beam report being received from the UE.

In a fifth aspect, alone or in combination with one or more of the first through fourth aspects, the at least one RRC message includes an RRC message indicating whether multiple types of beam-report-based implicit beam updating are enabled for the UE.

In a sixth aspect, alone or in combination with one or more of the first through fifth aspects, the at least one RRC message includes a first RRC message indicating whether a first type of beam-report-based implicit beam updating is enabled for the UE and a second RRC message indicating whether a second type of beam-report-based implicit beam updating is enabled for the UE.

Although FIG. 29 shows example blocks of process 2900, in some aspects, process 2900 may include additional blocks, fewer blocks, different blocks, or differently arranged blocks than those depicted in FIG. 29. Additionally, or alternatively, two or more of the blocks of process 2900 may be performed in parallel.

The following provides an overview of some Aspects of the present disclosure:

Aspect 1: A method of wireless communication performed by a UE, comprising: receiving an RRC message, the RRC message including an indication of whether group-based beam reporting is enabled for the UE; and transmitting a group-based beam report based at least in part on the indication that the group-based beam reporting is enabled for the UE.

Aspect 2: The method of Aspect 1, wherein the group-based beam report comprises information that identifies at least one group of beams that can be received simultaneously at the UE, wherein the at least one group of beams includes a first beam associated with a first CMR set that corresponds to a first TRP and includes a second beam associated with a second CMR set that corresponds to a second TRP.

Aspect 3: The method of any of Aspects 1-2, further comprising receiving a configuration indicating a quantity of beam groups to be reported by the UE in the group-based beam report.

Aspect 4: The method of any of Aspects 1-3, further comprising transmitting UE capability information indicating a maximum quantity of beam groups that can be reported by the UE in the group-based beam report.

Aspect 5: A method of wireless communication performed by a base station, comprising: transmitting an RRC message, the RRC message including an indication of whether group-based beam reporting is enabled for a UE; and receiving a group-based beam report based at least in part on transmitting the indication to indicate that the group-based beam reporting is enabled for the UE.

Aspect 6: The method of Aspect 5, wherein the group-based beam report comprises information that identifies at least one group of beams that can be received simultaneously at the UE, wherein the at least one group of beams includes a first beam associated with a first CMR set that corresponds to a first TRP and includes a second beam associated with a second CMR set that corresponds to a second TRP.

Aspect 7: The method of any of Aspects 5-6, further comprising transmitting a configuration indicating a quantity of beam groups to be reported by the UE in the group-based beam report.

Aspect 8: The method of any of Aspects 5-7, further comprising receiving UE capability information indicating a maximum quantity of beam groups that can be reported by the UE in the group-based beam report.

Aspect 9: A method of wireless communication performed by a UE, comprising: receiving a CMR set configuration associated with group-based beam reporting, wherein the CMR set configuration configures at least two CMR sets; generating a group-based beam report based at least in part on the CMR set configuration; and transmitting the group-based beam report.

Aspect 10: The method of Aspect 9, wherein a resource type associated with the CMR set configuration is semi-persistent or periodic.

Aspect 11: The method of any of Aspects 9-10, wherein the CMR set configuration identifies a CSI resource configuration associated with a CMR set list that includes the at least two resource sets.

Aspect 12: The method of any of Aspects 9-11, wherein the CMR set configuration identifies a first CSI resource configuration associated with a first CMR set of the least two CMR sets and identifies a second CSI resource configuration associated with a second CMR set of the at least two CMR sets.

Aspect 13: The method of Aspect 12, wherein the first CSI resource configuration is associated with a first ZP-IMR set and a first NZP-IMR set, and the second CSI resource configuration is associated with a second ZP-IMR set and a second NZP-IMR set.

Aspect 14: A method of wireless communication performed by a base station, comprising: transmitting a CMR set configuration associated with group-based beam reporting, wherein the CMR set configuration configures at least two CMR sets; and receiving a group-based beam report, the group-based beam report having been generated based at least in part on the CMR set configuration.

Aspect 15: The method of Aspect 14, wherein a resource type associated with the CMR set configuration is semi-persistent or periodic.

Aspect 16: The method of any of Aspects 14-15, wherein the CMR set configuration identifies a CSI resource configuration associated with a CMR set list that includes the at least two resource sets.

Aspect 17: The method of any of Aspects 14-16, wherein the CMR set configuration identifies a first CSI resource configuration associated with a first CMR set of the least two CMR sets and identifies a second CSI resource configuration associated with a second CMR set of the at least two CMR sets.

Aspect 18: The method of Aspect 17, wherein the first CSI resource configuration is associated with a first ZP-IMR set and a first NZP-IMR set, and the second CSI resource configuration is associated with a second ZP-IMR set and a second NZP-IMR set.

Aspect 19: A method of wireless communication performed by a UE, comprising: measuring a signal strength of a BFD RS, the BFD RS being included in a BFD RS set that corresponds to a TRP of a plurality of TRPs; identifying a BFD threshold associated with the TRP; detecting a beam failure instance associated with the TRP based at least in part on a determination that the signal strength of the BFD RS satisfies the BFD threshold; and providing an indication of the beam failure instance associated with the TRP.

Aspect 20: The method of Aspect 19, wherein the BFD threshold is a BLER threshold.

Aspect 21: The method of any of Aspects 19-20, wherein the BFD threshold is identified based at least in part on a default value for the BFD threshold.

Aspect 22: The method of any of Aspects 19-21, wherein the BFD threshold is identified based at least in part on a TRP-specific BFR value for the BFD threshold.

Aspect 23: The method of any of Aspects 19-22, wherein the BFD threshold is identified based at least in part on receiving RRC signaling that indicates a value for the BFD threshold.

Aspect 24: The method of any of Aspects 19-23, wherein the BFD threshold is a common BFD threshold associated with the plurality of TRPs.

Aspect 25: The method of any of Aspects 19-23, wherein the BFD threshold is a TRP-specific threshold associated with the TRP.

Aspect 26: The method of any of Aspects 19-25, wherein the BFD threshold is associated with a particular component carrier.

Aspect 27: The method of any of Aspects 19-26, wherein the BFD threshold is configured on the UE based at least in part on TRP-specific beam failure reporting being configured for a component carrier associated with the TRP.

Aspect 28: A method of wireless communication performed by a base station, comprising: identifying a BFD threshold for a TRP of a plurality of TRPs of a UE; and transmitting, to the UE, a configuration indicating the BFD threshold.

Aspect 29: The method of Aspect 28, wherein the BFD threshold is a BLER threshold.

Aspect 30: The method of any of Aspects 28-29, wherein the BFD threshold is identified based at least in part on a default value for the BFD threshold.

Aspect 31: The method of any of Aspects 28-30, wherein the BFD threshold is identified based at least in part on a TRP-specific BFR value for the BFD threshold.

Aspect 32: The method of any of Aspects 28-31, wherein the BFD threshold is identified via RRC signaling that indicates a value for the BFD threshold.

Aspect 33: The method of any of Aspects 28-32, wherein the BFD threshold is a common BFD threshold associated with the plurality of TRPs.

Aspect 34: The method of any of Aspects 28-32, wherein the BFD threshold is a TRP-specific threshold associated with the TRP.

Aspect 35: The method of any of Aspects 28-34, wherein the BFD threshold is associated with a particular component carrier.

Aspect 36: The method of any of Aspects 28-35, wherein the BFD threshold is configured on the UE based at least in part on TRP-specific beam failure reporting being configured for a component carrier associated with the TRP.

Aspect 37: A method of wireless communication performed by a UE, comprising: measuring a signal strength of a candidate beam RS, the candidate beam RS being included in a set of candidate beam RSs that corresponds to a TRP of a plurality of TRPs; identifying a candidate beam threshold associated with the TRP; selecting a candidate beam corresponding to the candidate beam RS for beam failure recovery based at least in part on a determination that the signal strength of the candidate beam RS satisfies the candidate beam threshold; and transmitting a beam failure recovery (BFR) report including an indication of the candidate beam.

Aspect 38: The method of Aspect 37, wherein the candidate beam threshold is identified based at least in part on a default value for an SSB threshold or default value for a BFR threshold.

Aspect 39: The method of any of Aspects 37-38, wherein the candidate beam threshold is identified based at least in part on a TRP-specific BFR reporting value for an SSB threshold or a TRP-specific BFR reporting value for a BFR threshold.

Aspect 40: The method of any of Aspects 37-39, wherein the candidate beam threshold is identified based at least in part on an SSB threshold based at least in part on a cell associated with the TRP being a secondary primary cell.

Aspect 41: The method of any of Aspects 37-39, wherein the candidate beam threshold is identified based at least in part on a BFR threshold based at least in part on a cell associated with the TRP being a secondary cell.

Aspect 42: The method of any of Aspects 37-39, wherein the candidate beam threshold is identified based at least in part on a BFR threshold regardless of a type of a cell associated with the TRP.

Aspect 43: The method of any of Aspects 37-39, wherein the candidate beam threshold is identified based at least in part on an SSB threshold regardless of a type of a cell associated with the TRP.

Aspect 44: The method any of Aspects 37-43, wherein the candidate beam threshold is a common candidate beam threshold associated with the plurality of TRPs.

Aspect 45: The method of any of Aspects 37-43, wherein the candidate beam threshold is a TRP-specific threshold associated with the TRP.

Aspect 46: The method of any of Aspects 37-45, wherein the candidate beam threshold is associated with a particular component carrier.

Aspect 47: The method of any of Aspects 37-46, wherein the candidate beam threshold is configured on the UE based at least in part on TRP-specific beam failure reporting being configured for a component carrier associated with the TRP.

Aspect 48: The method of any of Aspects 37-47, wherein the BFR report is transmitted in a set of PUCCH resources corresponding to an SR, the SR being one of a plurality of SRs configured for requesting TRP-specific BFRs for a cell group.

Aspect 49: The method of Aspect 48, wherein at least two sets of PUCCH resources, of a plurality of sets of PUCCH resources associated with the plurality of SRs, are in a same PUCCH cell of the cell group.

Aspect 50: The method of any of Aspects 48-49, wherein at least two sets PUCCH resources, of a plurality of sets of PUCCH resources associated with the plurality of SRs, are in different PUCCH cells of the cell group.

Aspect 51: The method of any of Aspects 37-50, further comprising receiving a configuration associated with a plurality of sets of candidate beam RSs, wherein each set of candidate beam RSs of the plurality of sets of candidate beam RSs corresponds to a different TRP of the plurality of TRPs.

Aspect 52: The method of any of Aspects 37-51, wherein the candidate beam RS is an SSB or a CSI-RS.

Aspect 53: A method of wireless communication performed by a base station, comprising: identifying a candidate beam threshold for a TRP of a plurality of TRPs of a UE; and transmitting, to the UE, a configuration indicating the candidate beam threshold.

Aspect 54: The method of Aspect 53, wherein the candidate beam threshold is identified based at least in part on a default value for an SSB threshold or default value for a BFR threshold.

Aspect 55: The method of any of Aspects 53-54, wherein the candidate beam threshold is identified based at least in part on a TRP-specific BFR reporting value for an SSB threshold or a TRP-specific BFR reporting value for a BFR threshold.

Aspect 56: The method of any of Aspects 53-55, wherein the candidate beam threshold is identified based at least in part on an SSB threshold based at least in part on a cell associated with the TRP being a secondary primary cell.

Aspect 57: The method of any of Aspects 53-55, wherein the candidate beam threshold is identified based at least in part on a BFR threshold based at least in part on a cell associated with the TRP being a secondary cell.

Aspect 58: The method of any of Aspects 53-55, wherein the candidate beam threshold is identified based at least in part on a BFR threshold regardless of a type of a cell associated with the TRP.

Aspect 59: The method of any of Aspects 53-55, wherein the candidate beam threshold is identified based at least in part on an SSB threshold regardless of a type of a cell associated with the TRP.

Aspect 60: The method of any of Aspects 53-59, wherein the candidate beam threshold is a common candidate beam threshold associated with the plurality of TRPs.

Aspect 61: The method of any of Aspects 53-59, wherein the candidate beam threshold is a TRP-specific threshold associated with the TRP.

Aspect 62: The method of any of Aspects 53-61, wherein the candidate beam threshold is associated with a particular component carrier.

Aspect 63: The method of any of Aspects 53-62, wherein the candidate beam threshold is configured on the UE based at least in part on TRP-specific beam failure reporting being configured for a component carrier associated with the TRP.

Aspect 64: The method of any of Aspects 53-63, wherein the BFR report is received in a set of PUCCH resources corresponding to an SR, the SR being one of a plurality of SRs configured for requesting TRP-specific BFRs for a cell group.

Aspect 65: The method of Aspect 64, wherein at least two sets of PUCCH resources, of a plurality of sets of PUCCH resources associated with the plurality of SRs, are in a same PUCCH cell of the cell group.

Aspect 66: The method of any of Aspects 64-65, wherein at least two sets PUCCH resources, of a plurality of sets of PUCCH resources associated with the plurality of SRs, are in different PUCCH cells of the cell group.

Aspect 67: The method of any of Aspects 53-66, further comprising transmitting a configuration associated with a plurality of sets of candidate beam reference signals (RSs), wherein each set of candidate beam RSs of the plurality of sets of candidate beam RSs corresponds to a different TRP of the plurality of TRPs.

Aspect 68: A method of wireless communication performed by a UE, comprising: identifying a set of power control parameters for a TCI state associated with an uplink transmission; and transmit the uplink transmission based at least in part on the set of power control parameters associated with the TCI state.

Aspect 69: The method of Aspect 68, wherein the set of power control parameters is identified based at least in part on a configuration in an information element associated with the TCI state.

Aspect 70: The method of any of Aspects 68-69, wherein the set of power control parameters is identified based at least in part on an association with a TCI state identifier, corresponding to the TCI state, in a dedicated information element linking the set of power control parameters to the TCI state identifier.

Aspect 71: The method of Aspect 70, wherein the dedicated information element includes a group of TCI state identifiers and one or more groups of power control parameter set identifiers, wherein each group of power control parameter set identifiers of the one or more groups of power control parameter set identifiers is associated with a different uplink channel type.

Aspect 72: The method of Aspect 70, wherein the dedicated information element includes a group of entries, wherein each entry of the group of entries includes a TCI state identifier and associated power control parameter set identifiers for an uplink channel type.

Aspect 73: The method of any of Aspects 68-69, wherein the set of power control parameters is a TCI state independent set of power control parameters for an uplink channel type associated with the uplink transmission.

Aspect 74: The method of Aspect 73, wherein all TCI states, of plurality of TCI states including the TCI state, are associated with a respective set of power control parameters.

Aspect 75: The method of Aspect 73, wherein all TCI states, of plurality of TCI states including the TCI state, are not associated with a set of power control power control parameters.

Aspect 76: The method of Aspect 73, wherein the TCI state independent set of power control parameter is identified as the set of power control parameters based at least in part on the TCI state independent set of power control parameters being configured as a default set of power control parameters for TCI states that are not associated with any set of power control parameters.

Aspect 77: The method of Aspect 73, wherein the TCI state independent set of power control parameters is identified as the set of power control parameters based at least in part on a particular power control parameter set identifier being associated with the TCI state.

Aspect 78: A method of wireless communication performed by a UE, comprising: receiving an RRC message, the RRC message including an indication of whether a format for a PHR report to be used by the UE is either: a format indicating a single P-MPR per component carrier, or a format indicating multiple P-MPRs per component carrier; generating a PHR report according to the format indicated by the indication; and transmitting the PHR report.

Aspect 79: The method of Aspect 78, wherein one or more parameters associated with the format indicating multiple P-MPRs per component carrier are configured in an information element dedicated to configuring the format indicating multiple P-MPRs per component carrier.

Aspect 80: The method of Aspect 79, wherein the one or more parameters include at least one of a timer associated with prohibiting MPE reporting, a threshold associated with MPE reporting, a quantity of P-MPRs per component carrier, or a quantity of beam identifiers per reported P-MPR.

Aspect 81: The method of Aspect 78, wherein one or more parameters associated with the format indicating multiple P-MPRs per component carrier are identified based at least in part on a configuration for the format indicating the single P-MPR per component carrier.

Aspect 82: The method of Aspect 81, wherein the one or more parameters include at least one of a timer associated with prohibiting MPE reporting or a threshold associated with MPE reporting.

Aspect 83: A method of wireless communication performed by a base station, comprising: transmitting a RRC message, the RRC message including an indication of whether a format for a PHR report to be used by a UE is either: a format indicating a single P-MPR per component carrier, or a format indicating multiple P-MPRs per component carrier; receiving a PHR report, the PHR report having the format indicated by the indication.

Aspect 84: The method of Aspect 83, wherein one or more parameters associated with the format indicating multiple P-MPRs per component carrier are configured in an information element dedicated to configuring the format indicating multiple P-MPRs per component carrier.

Aspect 85: The method of Aspect 84, wherein the one or more parameters include at least one of a timer associated with prohibiting maximum MPE reporting, a threshold associated with MPE reporting, a quantity of P-MPRs per component carrier, or a quantity of beam identifiers per reported P-MPR.

Aspect 86: The method of Aspect 83, wherein one or more parameters associated with the format indicating multiple P-MPRs per component carrier are identified based at least in part on a configuration for the format indicating the single P-MPR per component carrier.

Aspect 87: The method of Aspect 86, wherein the one or more parameters include at least one of a timer associated with prohibiting MPE reporting or a threshold associated with MPE reporting.

Aspect 88: A method of wireless communication performed by a UE, comprising: receiving an indication to transmit multiple PDSCH transmissions; determining one or more QCL assumptions to be used for transmitting the multiple PDSCH transmissions; and transmitting the multiple PDSCH transmissions based at least in part on the one or more QCL assumptions.

Aspect 89: The method of Aspect 88, wherein the one or more QCL assumptions are determined based at least in part on a QCL rule indicating that a single QCL assumption is to be used for transmitting the multiple PDSCH transmissions.

Aspect 90: The method of Aspect 89, wherein the single QCL assumption is determined based on a QCL assumption for one of a CORESET with a lowest identifier, an activated PDSCH TCI state with a lowest identifier, or a TCI state indicated by a MAC control element.

Aspect 91: The method of Aspect 88, wherein the one or more QCL assumptions are determined based at least in part on a QCL rule indicating that multiple QCL assumptions are to be used for transmitting the multiple PDSCH transmissions.

Aspect 92: The method of Aspect 91, wherein a given QCL assumption of the multiple QCL assumptions is to be determined based on a default PDSCH beam rule.

Aspect 93: The method of any of Aspects 88-92, wherein the one or more QCL assumptions are determined based at least in part on a QCL rule indicated by a base station.

Aspect 94: The method of Aspect 93, wherein the QCL rule is indicated by the base station via an RRC message.

Aspect 95: The method of any of Aspects 88-94, wherein the indication includes DCI scheduling the multiple PDSCH transmissions.

Aspect 96: The method of any of Aspects 88-95, wherein the multiple PDSCH transmissions include a plurality of repetitions of a particular PDSCH transmission.

Aspect 97: The method of Aspect 96, wherein the plurality of repetitions is a plurality of slot-based repetitions.

Aspect 98: The method of Aspect 96, wherein the plurality of repetitions is a plurality of mini-slot-based repetitions.

Aspect 99: A method of wireless communication performed by a base station, comprising: transmitting an indication to cause a UE to transmit multiple PDSCH transmissions; and transmitting an indication of a QCL rule associated with determining one or more QCL assumptions to be used by the UE for transmitting the multiple PDSCH transmissions.

Aspect 100: The method of Aspect 99, wherein the QCL rule indicates that a single QCL assumption is to be used by the UE for transmitting the multiple PDSCH transmissions.

Aspect 101 The method of Aspect 99, wherein the QCL rule indicates that multiple QCL assumptions are to be used by the UE for transmitting the multiple PDSCH transmissions.

Aspect 102: The method of any of Aspects 99-101, wherein the indication of the QCL rule is transmitted via an RRC message.

Aspect 103: The method of any of Aspects 99-102, wherein the indication includes DCI scheduling the multiple PDSCH transmissions.

Aspect 104: The method of any of Aspects 99-103, wherein the multiple PDSCH transmissions include a plurality of repetitions of a particular PDSCH transmission.

Aspect 105: The method of Aspect 104, wherein the plurality of repetitions is a plurality of slot-based repetitions.

Aspect 106: The method of Aspect 104, wherein the plurality of repetitions is a plurality of mini-slot-based repetitions.

Aspect 107: A method of wireless communication performed by a UE, comprising: receiving at least one RRC message, the at least one RRC message including an indication of whether beam-report-based implicit beam updating is enabled for the UE; and performing an implicit beam update based at least in part on the indication indicating that the beam-report-based implicit beam updating is enabled for the UE.

Aspect 108: The method of Aspect 107, wherein the at least one RRC message includes an RRC message that indicates that beam-report-based implicit beam updating for network scheduled beam reports is enabled for the UE.

Aspect 109: The method of Aspect 108, wherein the implicit beam update is performed based at least in part on a network scheduled beam report being transmitted by the UE.

Aspect 110: The method of any of Aspects 107-109, wherein the at least one RRC message includes an RRC message that indicates that beam-report-based implicit beam updating for UE initiated or UE event driven beam reports is enabled for the UE.

Aspect 111: The method of Aspect 110, wherein the implicit beam update is performed based at least in part on a UE initiated or UE event driven beam report being transmitted by the UE.

Aspect 112: The method of any of Aspects 107-111, wherein the at least one RRC message includes an RRC message indicating whether multiple types of beam-report-based implicit beam updating are enabled for the UE.

Aspect 113: The method any of Aspects 107-112, wherein the at least one RRC message includes a first RRC message indicating whether a first type of beam-report-based implicit beam updating is enabled for the UE and a second RRC message indicating whether a second type of beam-report-based implicit beam updating is enabled for the UE.

Aspect 114: A method of wireless communication performed by a base station, comprising: transmitting at least one RRC message, the at least one RRC message including an indication of whether beam-report-based implicit beam updating is enabled for a UE; and performing an implicit beam update based at least in part on transmitting the indication to indicate that the beam-report-based implicit beam updating is enabled for the UE.

Aspect 115: The method of Aspect 114, wherein the at least one RRC message includes an RRC message that indicates that beam-report-based implicit beam updating for network scheduled beam reports is enabled for the UE.

Aspect 116: The method of Aspect 115, wherein the implicit beam update is performed based at least in part on a network scheduled beam report being received from the UE.

Aspect 117: The method of any of Aspects 114-116, wherein the at least one RRC message includes an RRC message that indicates that beam-report-based implicit beam updating for UE initiated or UE event driven beam reports is enabled for the UE.

Aspect 118: The method of Aspect 117, wherein the implicit beam update is performed based at least in part on a UE initiated or UE event driven beam report being received from the UE.

Aspect 119: The method of any of Aspects 114-118, wherein the at least one RRC message includes an RRC message indicating whether multiple types of beam-report-based implicit beam updating are enabled for the UE.

Aspect 120: The method of any of Aspects 114-119, wherein the at least one RRC message includes a first RRC message indicating whether a first type of beam-report-based implicit beam updating is enabled for the UE and a second RRC message indicating whether a second type of beam-report-based implicit beam updating is enabled for the UE.

Aspect 121: An apparatus for wireless communication at a device, comprising a processor; memory coupled with the processor; and instructions stored in the memory and executable by the processor to cause the apparatus to perform the method of one or more of Aspects 1-4.

Aspect 122: A device for wireless communication, comprising a memory and one or more processors coupled to the memory, the one or more processors configured to perform the method of one or more of Aspects 1-4.

Aspect 123: An apparatus for wireless communication, comprising at least one means for performing the method of one or more of Aspects 1-4.

Aspect 124: A non-transitory computer-readable medium storing code for wireless communication, the code comprising instructions executable by a processor to perform the method of one or more of Aspects 1-4.

Aspect 125: A non-transitory computer-readable medium storing a set of instructions for wireless communication, the set of instructions comprising one or more instructions that, when executed by one or more processors of a device, cause the device to perform the method of one or more of Aspects 1-4.

Aspect 126: An apparatus for wireless communication at a device, comprising a processor; memory coupled with the processor; and instructions stored in the memory and executable by the processor to cause the apparatus to perform the method of one or more of Aspects 5-8.

Aspect 127: A device for wireless communication, comprising a memory and one or more processors coupled to the memory, the one or more processors configured to perform the method of one or more of Aspects 5-8.

Aspect 128: An apparatus for wireless communication, comprising at least one means for performing the method of one or more of Aspects 5-8.

Aspect 129: A non-transitory computer-readable medium storing code for wireless communication, the code comprising instructions executable by a processor to perform the method of one or more of Aspects 5-8.

Aspect 130: A non-transitory computer-readable medium storing a set of instructions for wireless communication, the set of instructions comprising one or more instructions that, when executed by one or more processors of a device, cause the device to perform the method of one or more of Aspects 5-8.

Aspect 131: An apparatus for wireless communication at a device, comprising a processor; memory coupled with the processor; and instructions stored in the memory and executable by the processor to cause the apparatus to perform the method of one or more of Aspects 9-13.

Aspect 132: A device for wireless communication, comprising a memory and one or more processors coupled to the memory, the one or more processors configured to perform the method of one or more of Aspects 9-13.

Aspect 133: An apparatus for wireless communication, comprising at least one means for performing the method of one or more of Aspects 9-13.

Aspect 134: A non-transitory computer-readable medium storing code for wireless communication, the code comprising instructions executable by a processor to perform the method of one or more of Aspects 9-13.

Aspect 135: A non-transitory computer-readable medium storing a set of instructions for wireless communication, the set of instructions comprising one or more instructions that, when executed by one or more processors of a device, cause the device to perform the method of one or more of Aspects 9-13.

Aspect 136: An apparatus for wireless communication at a device, comprising a processor; memory coupled with the processor; and instructions stored in the memory and executable by the processor to cause the apparatus to perform the method of one or more of Aspects 14-18.

Aspect 137: A device for wireless communication, comprising a memory and one or more processors coupled to the memory, the one or more processors configured to perform the method of one or more of Aspects 14-18.

Aspect 138: An apparatus for wireless communication, comprising at least one means for performing the method of one or more of Aspects 14-18.

Aspect 139: A non-transitory computer-readable medium storing code for wireless communication, the code comprising instructions executable by a processor to perform the method of one or more of Aspects 14-18.

Aspect 140: A non-transitory computer-readable medium storing a set of instructions for wireless communication, the set of instructions comprising one or more instructions that, when executed by one or more processors of a device, cause the device to perform the method of one or more of Aspects 14-18.

Aspect 141: An apparatus for wireless communication at a device, comprising a processor; memory coupled with the processor; and instructions stored in the memory and executable by the processor to cause the apparatus to perform the method of one or more of Aspects 19-27.

Aspect 142: A device for wireless communication, comprising a memory and one or more processors coupled to the memory, the one or more processors configured to perform the method of one or more of Aspects 19-27.

Aspect 143: An apparatus for wireless communication, comprising at least one means for performing the method of one or more of Aspects 19-27.

Aspect 144: A non-transitory computer-readable medium storing code for wireless communication, the code comprising instructions executable by a processor to perform the method of one or more of Aspects 19-27.

Aspect 145: A non-transitory computer-readable medium storing a set of instructions for wireless communication, the set of instructions comprising one or more instructions that, when executed by one or more processors of a device, cause the device to perform the method of one or more of Aspects 19-27.

Aspect 146: An apparatus for wireless communication at a device, comprising a processor; memory coupled with the processor; and instructions stored in the memory and executable by the processor to cause the apparatus to perform the method of one or more of Aspects 28-36.

Aspect 147: A device for wireless communication, comprising a memory and one or more processors coupled to the memory, the one or more processors configured to perform the method of one or more of Aspects 28-36.

Aspect 148: An apparatus for wireless communication, comprising at least one means for performing the method of one or more of Aspects 28-36.

Aspect 149: A non-transitory computer-readable medium storing code for wireless communication, the code comprising instructions executable by a processor to perform the method of one or more of Aspects 28-36.

Aspect 150: A non-transitory computer-readable medium storing a set of instructions for wireless communication, the set of instructions comprising one or more instructions that, when executed by one or more processors of a device, cause the device to perform the method of one or more of Aspects 28-36.

Aspect 151: An apparatus for wireless communication at a device, comprising a processor; memory coupled with the processor; and instructions stored in the memory and executable by the processor to cause the apparatus to perform the method of one or more of Aspects 37-52.

Aspect 152: A device for wireless communication, comprising a memory and one or more processors coupled to the memory, the one or more processors configured to perform the method of one or more of Aspects 37-52.

Aspect 153: An apparatus for wireless communication, comprising at least one means for performing the method of one or more of Aspects 37-52.

Aspect 154: A non-transitory computer-readable medium storing code for wireless communication, the code comprising instructions executable by a processor to perform the method of one or more of Aspects 37-52.

Aspect 155: A non-transitory computer-readable medium storing a set of instructions for wireless communication, the set of instructions comprising one or more instructions that, when executed by one or more processors of a device, cause the device to perform the method of one or more of Aspects 37-52.

Aspect 156: An apparatus for wireless communication at a device, comprising a processor; memory coupled with the processor; and instructions stored in the memory and executable by the processor to cause the apparatus to perform the method of one or more of Aspects 53-67.

Aspect 157: A device for wireless communication, comprising a memory and one or more processors coupled to the memory, the one or more processors configured to perform the method of one or more of Aspects 53-67.

Aspect 158: An apparatus for wireless communication, comprising at least one means for performing the method of one or more of Aspects 53-67.

Aspect 159: A non-transitory computer-readable medium storing code for wireless communication, the code comprising instructions executable by a processor to perform the method of one or more of Aspects 53-67.

Aspect 160: A non-transitory computer-readable medium storing a set of instructions for wireless communication, the set of instructions comprising one or more instructions that, when executed by one or more processors of a device, cause the device to perform the method of one or more of Aspects 53-67.

Aspect 161: An apparatus for wireless communication at a device, comprising a processor; memory coupled with the processor; and instructions stored in the memory and executable by the processor to cause the apparatus to perform the method of one or more of Aspects 68-77.

Aspect 162: A device for wireless communication, comprising a memory and one or more processors coupled to the memory, the one or more processors configured to perform the method of one or more of Aspects 68-77.

Aspect 163: An apparatus for wireless communication, comprising at least one means for performing the method of one or more of Aspects 68-77.

Aspect 164: A non-transitory computer-readable medium storing code for wireless communication, the code comprising instructions executable by a processor to perform the method of one or more of Aspects 68-77.

Aspect 165: A non-transitory computer-readable medium storing a set of instructions for wireless communication, the set of instructions comprising one or more instructions that, when executed by one or more processors of a device, cause the device to perform the method of one or more of Aspects 68-77.

Aspect 166: An apparatus for wireless communication at a device, comprising a processor; memory coupled with the processor; and instructions stored in the memory and executable by the processor to cause the apparatus to perform the method of one or more of Aspects 78-82.

Aspect 167: A device for wireless communication, comprising a memory and one or more processors coupled to the memory, the one or more processors configured to perform the method of one or more of Aspects 78-82.

Aspect 168: An apparatus for wireless communication, comprising at least one means for performing the method of one or more of Aspects 78-82.

Aspect 169: A non-transitory computer-readable medium storing code for wireless communication, the code comprising instructions executable by a processor to perform the method of one or more of Aspects 78-82.

Aspect 170: A non-transitory computer-readable medium storing a set of instructions for wireless communication, the set of instructions comprising one or more instructions that, when executed by one or more processors of a device, cause the device to perform the method of one or more of Aspects 78-82.

Aspect 171: An apparatus for wireless communication at a device, comprising a processor; memory coupled with the processor; and instructions stored in the memory and executable by the processor to cause the apparatus to perform the method of one or more of Aspects 83-87.

Aspect 172: A device for wireless communication, comprising a memory and one or more processors coupled to the memory, the one or more processors configured to perform the method of one or more of Aspects 83-87.

Aspect 173: An apparatus for wireless communication, comprising at least one means for performing the method of one or more of Aspects 83-87.

Aspect 174: A non-transitory computer-readable medium storing code for wireless communication, the code comprising instructions executable by a processor to perform the method of one or more of Aspects 83-87.

Aspect 175: A non-transitory computer-readable medium storing a set of instructions for wireless communication, the set of instructions comprising one or more instructions that, when executed by one or more processors of a device, cause the device to perform the method of one or more of Aspects 83-87.

Aspect 176: An apparatus for wireless communication at a device, comprising a processor; memory coupled with the processor; and instructions stored in the memory and executable by the processor to cause the apparatus to perform the method of one or more of Aspects 88-98.

Aspect 177: A device for wireless communication, comprising a memory and one or more processors coupled to the memory, the one or more processors configured to perform the method of one or more of Aspects 88-98.

Aspect 178: An apparatus for wireless communication, comprising at least one means for performing the method of one or more of Aspects 88-98.

Aspect 179: A non-transitory computer-readable medium storing code for wireless communication, the code comprising instructions executable by a processor to perform the method of one or more of Aspects 88-98.

Aspect 180: A non-transitory computer-readable medium storing a set of instructions for wireless communication, the set of instructions comprising one or more instructions that, when executed by one or more processors of a device, cause the device to perform the method of one or more of Aspects 88-98.

Aspect 181: An apparatus for wireless communication at a device, comprising a processor; memory coupled with the processor; and instructions stored in the memory and executable by the processor to cause the apparatus to perform the method of one or more of Aspects 99-106.

Aspect 182: A device for wireless communication, comprising a memory and one or more processors coupled to the memory, the one or more processors configured to perform the method of one or more of Aspects 99-106.

Aspect 183: An apparatus for wireless communication, comprising at least one means for performing the method of one or more of Aspects 99-106.

Aspect 184: A non-transitory computer-readable medium storing code for wireless communication, the code comprising instructions executable by a processor to perform the method of one or more of Aspects 99-106.

Aspect 185: A non-transitory computer-readable medium storing a set of instructions for wireless communication, the set of instructions comprising one or more instructions that, when executed by one or more processors of a device, cause the device to perform the method of one or more of Aspects 99-106.

Aspect 186: An apparatus for wireless communication at a device, comprising a processor; memory coupled with the processor; and instructions stored in the memory and executable by the processor to cause the apparatus to perform the method of one or more of Aspects 107-113.

Aspect 187: A device for wireless communication, comprising a memory and one or more processors coupled to the memory, the one or more processors configured to perform the method of one or more of Aspects 107-113.

Aspect 188: An apparatus for wireless communication, comprising at least one means for performing the method of one or more of Aspects 107-113.

Aspect 189: A non-transitory computer-readable medium storing code for wireless communication, the code comprising instructions executable by a processor to perform the method of one or more of Aspects 107-113.

Aspect 190: A non-transitory computer-readable medium storing a set of instructions for wireless communication, the set of instructions comprising one or more instructions that, when executed by one or more processors of a device, cause the device to perform the method of one or more of Aspects 107-113.

Aspect 191: An apparatus for wireless communication at a device, comprising a processor; memory coupled with the processor; and instructions stored in the memory and executable by the processor to cause the apparatus to perform the method of one or more of Aspects 114-120.

Aspect 192: A device for wireless communication, comprising a memory and one or more processors coupled to the memory, the one or more processors configured to perform the method of one or more of Aspects 114-120.

Aspect 193: An apparatus for wireless communication, comprising at least one means for performing the method of one or more of Aspects 114-120.

Aspect 194: A non-transitory computer-readable medium storing code for wireless communication, the code comprising instructions executable by a processor to perform the method of one or more of Aspects 114-120.

Aspect 195: A non-transitory computer-readable medium storing a set of instructions for wireless communication, the set of instructions comprising one or more instructions that, when executed by one or more processors of a device, cause the device to perform the method of one or more of Aspects 114-120.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    measuring a signal strength of a beam failure detection (BFD) reference signal (RS), the BFD RS being included in a BFD RS set that corresponds to a transmission reception point (TRP) of a plurality of TRPs;
    identifying a BFD threshold associated with the TRP;
    detecting a beam failure instance associated with the TRP based at least in part on a determination that the signal strength of the BFD RS satisfies the BFD threshold; and
    providing an indication of the beam failure instance associated with the TRP.

2. The method of claim 1, wherein the BFD threshold is a block error rate (BLER) threshold.

3. The method of claim 1, wherein the BFD threshold is identified based at least in part on a default value for the BFD threshold.

4. The method of claim 1, wherein the BFD threshold is identified based at least in part on a TRP-specific beam failure recovery (BFR) value for the BFD threshold.

5. The method of claim 1, wherein the BFD threshold is identified based at least in part on receiving radio resource control (RRC) signaling that indicates a value for the BFD threshold.

6. The method of claim 1, wherein the BFD threshold is a common BFD threshold associated with the plurality of TRPs.

7. The method of claim 1, wherein the BFD threshold is a TRP-specific threshold associated with the TRP.

8. The method of claim 1, wherein the BFD threshold is associated with a particular component carrier.

9. The method of claim 1, wherein the BFD threshold is configured on the UE based at least in part on TRP-specific beam failure reporting being configured for a component carrier associated with the TRP.

10. A method of wireless communication performed by a user equipment (UE), comprising:
   measuring a signal strength of a candidate beam reference signal (RS), the candidate beam RS being included in a set of candidate beam RSs that corresponds to a transmission reception point (TRP) of a plurality of TRPs;
   identifying a candidate beam threshold associated with the TRP;
   selecting a candidate beam corresponding to the candidate beam RS for beam failure recovery based at least in part on a determination that the signal strength of the candidate beam RS satisfies the candidate beam threshold; and
   transmitting a beam failure recovery (BFR) report including an indication of the candidate beam.

11. The method of claim 10, wherein the candidate beam threshold is identified based at least in part on a default value for a synchronization signal block (SSB) threshold or default value for a BFR threshold.

12. The method of claim 10, wherein the candidate beam threshold is identified based at least in part on a TRP-specific BFR reporting value for a synchronization signal block (SSB) threshold or a TRP-specific BFR reporting value for a BFR threshold.

13. The method of claim 10, wherein the candidate beam threshold is identified based at least in part on a synchronization signal block (SSB) threshold based at least in part on a cell associated with the TRP being a secondary primary cell.

14. The method of claim 10, wherein the candidate beam threshold is identified based at least in part on a BFR threshold based at least in part on a cell associated with the TRP being a secondary cell.

15. The method of claim 10, wherein the candidate beam threshold is identified based at least in part on a BFR threshold regardless of a type of a cell associated with the TRP.

16. The method of claim 10, wherein the candidate beam threshold is identified based at least in part on a synchronization signal block (SSB) threshold regardless of a type of a cell associated with the TRP.

17. The method of claim 10, wherein the candidate beam threshold is a common candidate beam threshold associated with the plurality of TRPs.

18. The method of claim 10, wherein the candidate beam threshold is a TRP-specific threshold associated with the TRP.

19. The method of claim 10, wherein the candidate beam threshold is associated with a particular component carrier.

20. The method of claim 10, wherein the candidate beam threshold is configured on the UE based at least in part on TRP-specific beam failure reporting being configured for a component carrier associated with the TRP.

21. The method of claim 10, wherein the BFR report is transmitted in a set of physical uplink control channel (PUCCH) resources corresponding to a scheduling request (SR), the SR being one of a plurality of SRs configured for requesting TRP-specific BFRs for a cell group.

22. The method of claim 21, wherein at least two sets of PUCCH resources, of a plurality of sets of PUCCH resources associated with the plurality of SRs, are in a same PUCCH cell of the cell group.

23. The method of claim 21, wherein at least two sets PUCCH resources, of a plurality of sets of PUCCH resources associated with the plurality of SRs, are in different PUCCH cells of the cell group.

24. The method of claim 10, further comprising receiving a configuration associated with a plurality of sets of candidate beam RSs, wherein each set of candidate beam RSs of the plurality of sets of candidate beam RSs corresponds to a different TRP of the plurality of TRPs.

25. The method of claim 10, wherein the candidate beam RS is a synchronization signal block (SSB) or a channel state information RS (CSI-RS).

* * * * *